United States Patent
McCluney et al.

(10) Patent No.: US 9,341,842 B2
(45) Date of Patent: May 17, 2016

(54) OPTICAL DISTRIBUTOR FOR ROOM LIGHTING

(71) Applicant: SUNFLOWER CORPORATION, Boulder, CO (US)

(72) Inventors: William Ross McCluney, Cape Canaveral, FL (US); Peter John Novak, Longmont, CO (US)

(73) Assignee: Sunflower Corporation, Boulder, CO (US)

( * ) Notice: Subject to any disclaimer, the term of this patent is extended or adjusted under 35 U.S.C. 154(b) by 0 days.

(21) Appl. No.: 14/833,279

(22) Filed: Aug. 24, 2015

(65) Prior Publication Data

US 2015/0362726 A1 Dec. 17, 2015

Related U.S. Application Data

(63) Continuation of application No. 13/879,601, filed as application No. PCT/US2011/056595 on Oct. 17, 2011, now Pat. No. 9,116,326.

(60) Provisional application No. 61/393,684, filed on Oct. 15, 2010.

(51) Int. Cl.
| | |
|---|---|
| *G02B 27/00* | (2006.01) |
| *F21V 7/04* | (2006.01) |
| *F21S 11/00* | (2006.01) |
| *F21S 19/00* | (2006.01) |
| *F21V 7/00* | (2006.01) |

(Continued)

(52) U.S. Cl.
CPC .............. *G02B 27/0012* (2013.01); *F21S 11/00* (2013.01); *F21S 11/007* (2013.01); *F21S 19/005* (2013.01); *F21V 7/0025* (2013.01); *F21V 7/041* (2013.01); *F21V 7/09* (2013.01); *G02B 19/0019* (2013.01); *G02B 19/0028* (2013.01)

(58) Field of Classification Search
CPC ........... G02B 27/0012; G02B 19/0019; G02B 19/0042; F21V 7/041; F21V 7/048
USPC ....................... 362/1, 558, 241, 243; 359/597
See application file for complete search history.

(56) References Cited

U.S. PATENT DOCUMENTS

| | | |
|---|---|---|
| 550,376 A | 11/1895 | Lugrin |
| 585,770 A | 7/1897 | Lugrin |

(Continued)

OTHER PUBLICATIONS

Prosecution Document, "PCT International Search Report and Written Opinion dated Apr. 3, 2012", PCT Application No. PCT/US2011/056595, filed Oct. 17, 2011, 12 pages.

*Primary Examiner* — Christ Mahoney
(74) *Attorney, Agent, or Firm* — Dorsey & Whitney LLP

(57) ABSTRACT

An optical distributor (10) is formed as a reflector with one or more sloping surfaces. The sloping surfaces have varying angles of inclination from a bottom edge (20) to a top edge of the reflector. The sloping surfaces may form a substantially pyramidal or conical frustum-shaped surface. The sloping surfaces may additionally or alternatively form a band of adjacent or contiguous faceted surfaces. The reflector is configured to receive light rays through an opening (32) in a first plane (30) and reflect light rays radially outward and upward at varying angles of reflection (8B) to a bottom surface of the first plane (30) in a manner that illuminates both the bottom surface of the first plane (30) and an area (40) below the first plane (30). The reflected light may illuminate the first plane (30) and the area (40) below in a substantially uniform manner.

1 Claim, 44 Drawing Sheets

(51) Int. Cl.
*F21V 7/09* (2006.01)
*G02B 19/00* (2006.01)

(56) References Cited

U.S. PATENT DOCUMENTS

| | | |
|---|---|---|
| 3,392,277 A | 7/1968 | Dawson |
| 3,562,513 A | 2/1971 | Jaffe, Jr. |
| 4,297,000 A | 10/1981 | Fries |
| 4,600,267 A | 7/1986 | Yamasaki et al. |
| 4,796,169 A | 1/1989 | Shemitz |
| 5,816,737 A | 10/1998 | Siblik |
| 6,350,044 B1 | 2/2002 | Lea |
| 6,363,667 B2 | 4/2002 | O'Neill |
| 7,639,423 B2 | 12/2009 | Kinney et al. |
| 7,982,956 B2 | 7/2011 | Kinney |
| 8,098,433 B2 | 1/2012 | Rillie et al. |
| 2007/0159696 A1 | 7/2007 | Koizumi et al. |
| 2010/0067114 A1 | 3/2010 | Kinney et al. |
| 2015/0127304 A1* | 5/2015 | Cassarly ............ G02B 27/0012 703/1 |

* cited by examiner

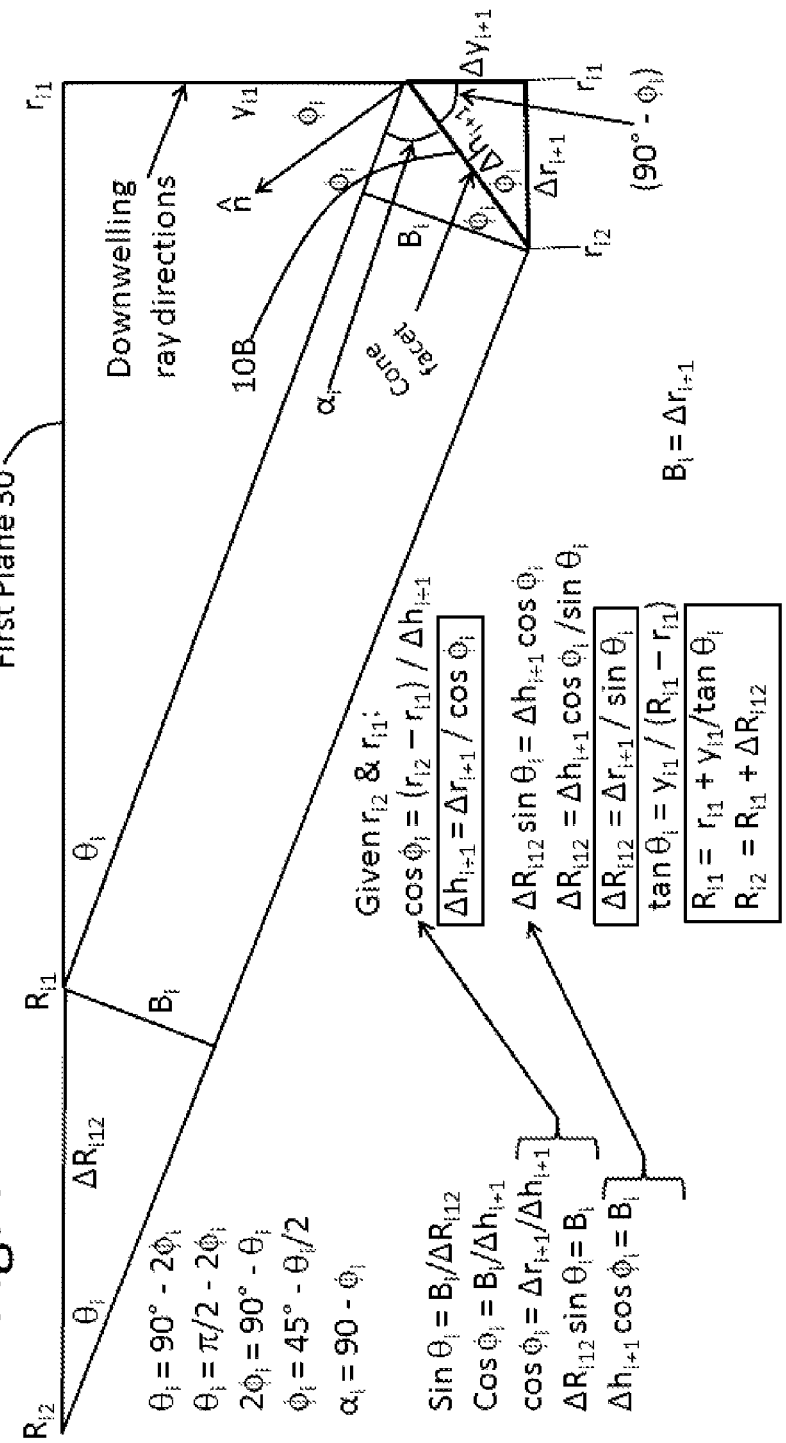

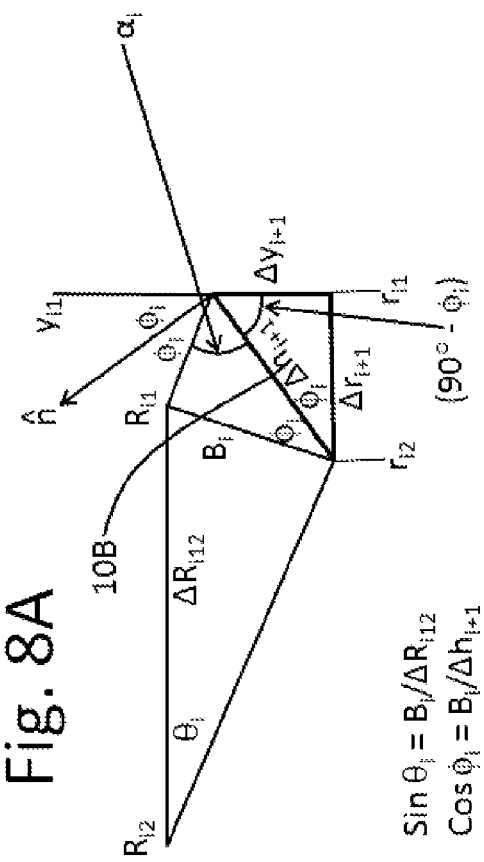

Fig. 8A

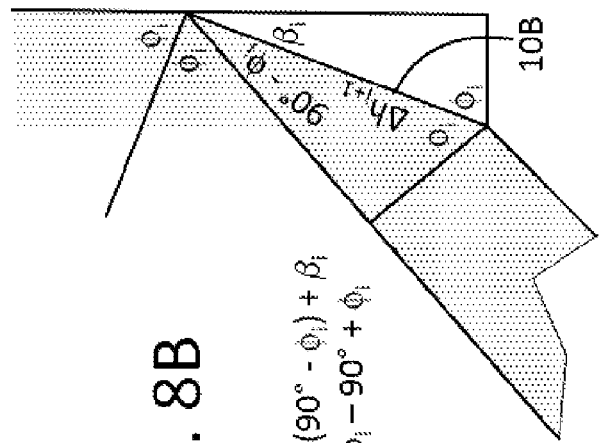

Fig. 8B $180° = 2\phi_i + (90° - \phi_i) + \beta_i$
$\beta_i = 180° - 2\phi_i - 90° + \phi_i$
$\beta_i = 90° - \phi_i$ $\sin\theta_i = B_i/\Delta R_{i12}$
$\cos\theta_i = B_i/\Delta h_{i+1}$
$\cos\phi_i = \Delta r_{i+1}/\Delta h_{i+1}$
$\sin\phi_i = \Delta y_{i+1}/\Delta h_{i+1}$
$\Delta R_{i12} = \Delta h_{i+1} \cos\phi_i / \sin\theta_i$
$\Delta R_{i12} = \Delta r_{i+1} \cos\phi_i / \cos\phi_i \sin\theta_i$
$\Delta R_{i12} = \Delta r_{i+1} / \sin\theta_i$ $\tan\phi_i = \Delta y_{i+1}/\Delta r_{i+1}$
$\Delta y_{i+1} = \Delta r_{i+1} \tan\phi_i$ $\Delta h_{i+1} = (\Delta r_{i+1}^2 + \Delta y_{i+1}^2)^{1/2}$

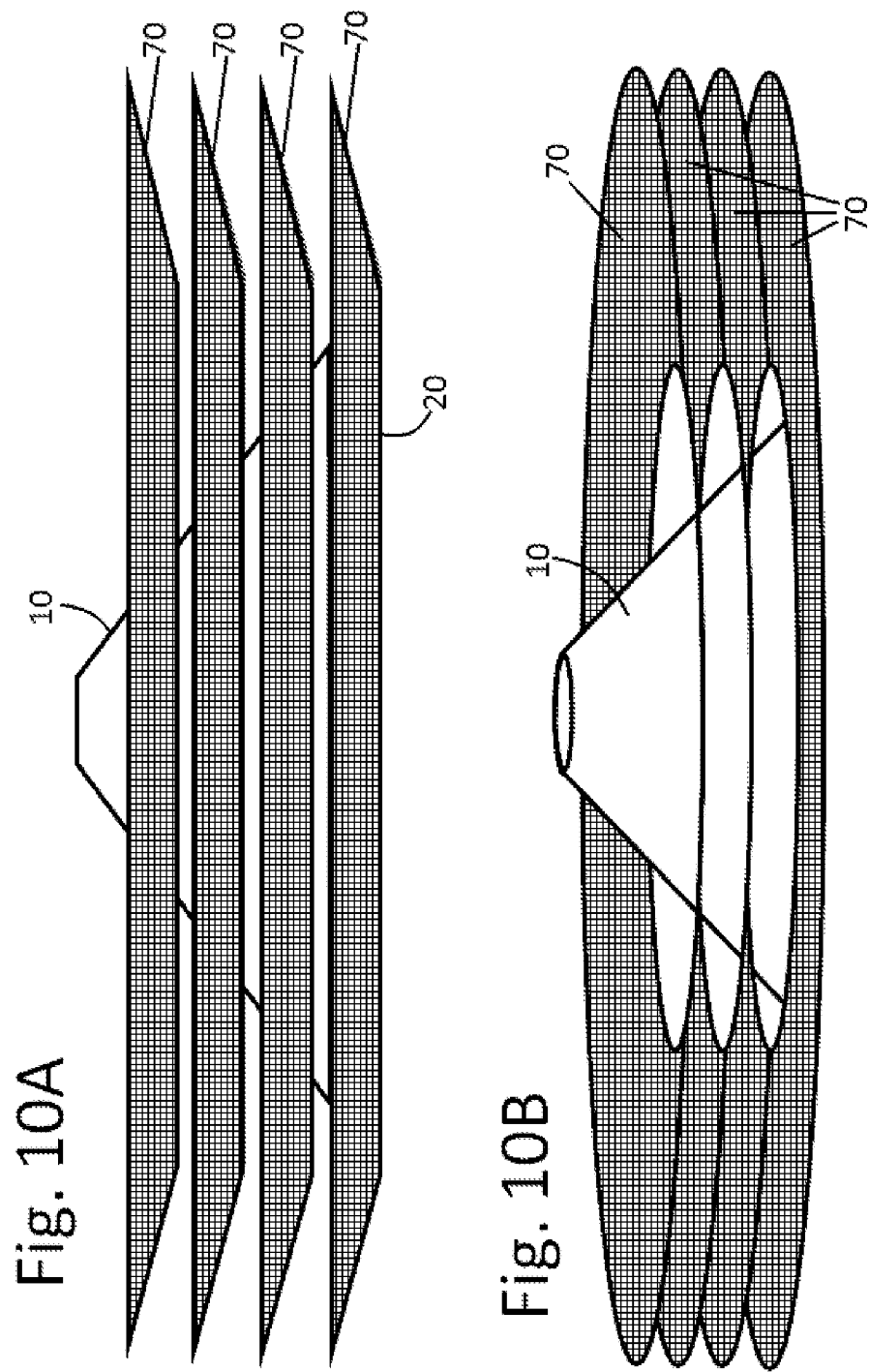

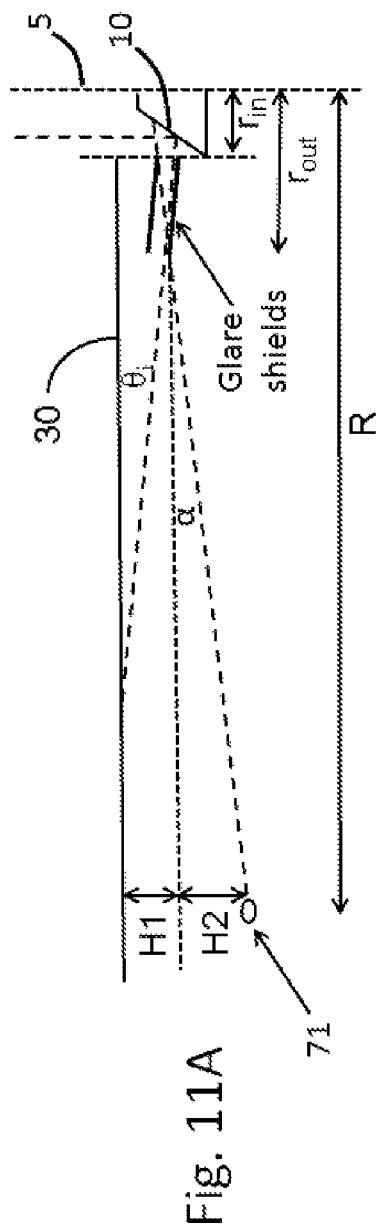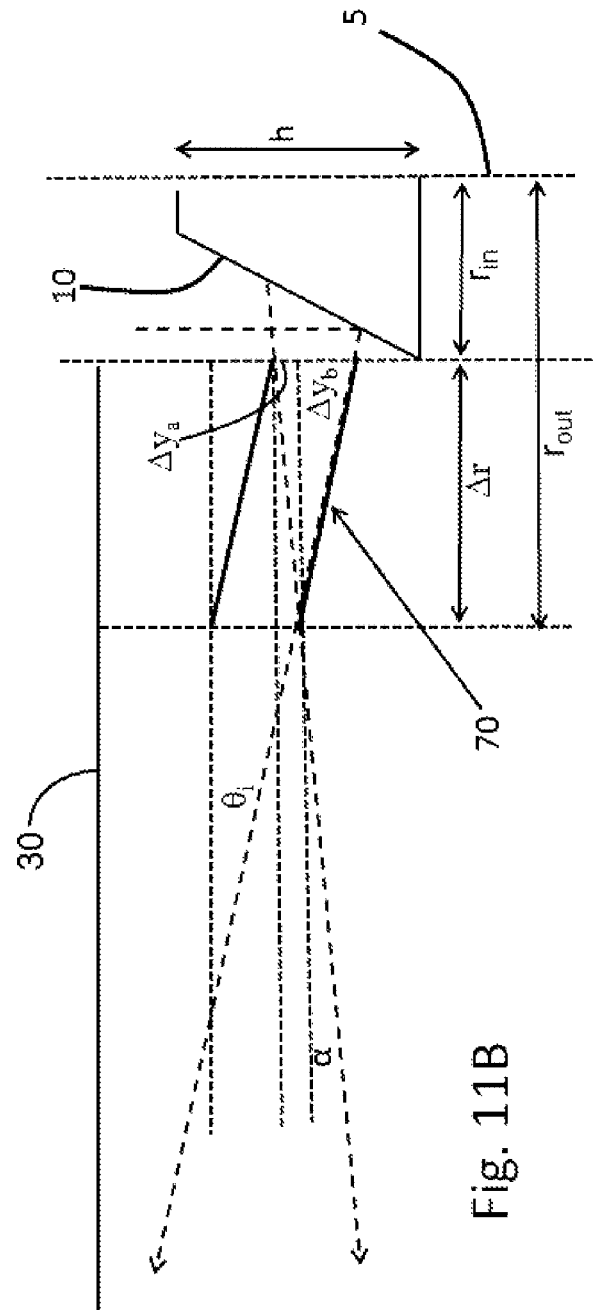
Fig. 11A
Fig. 11B

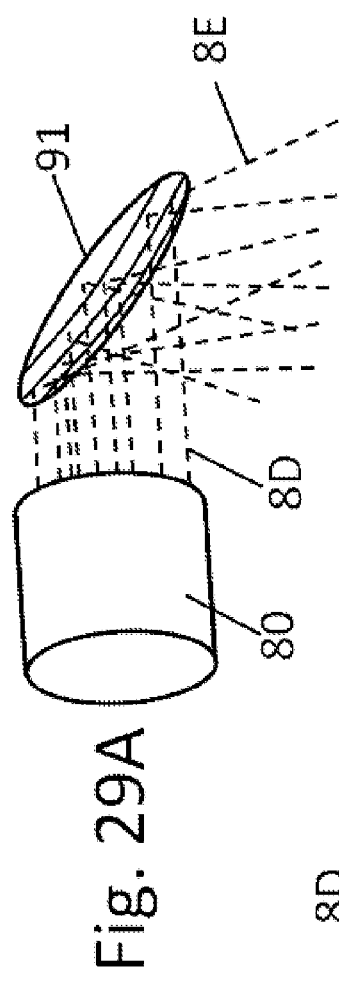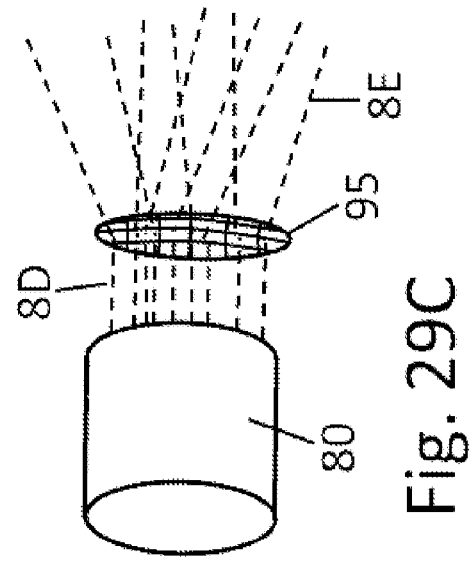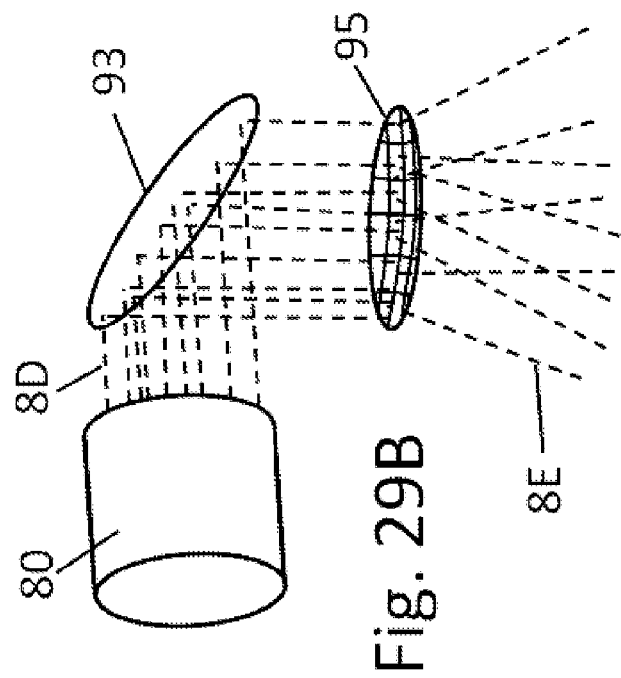

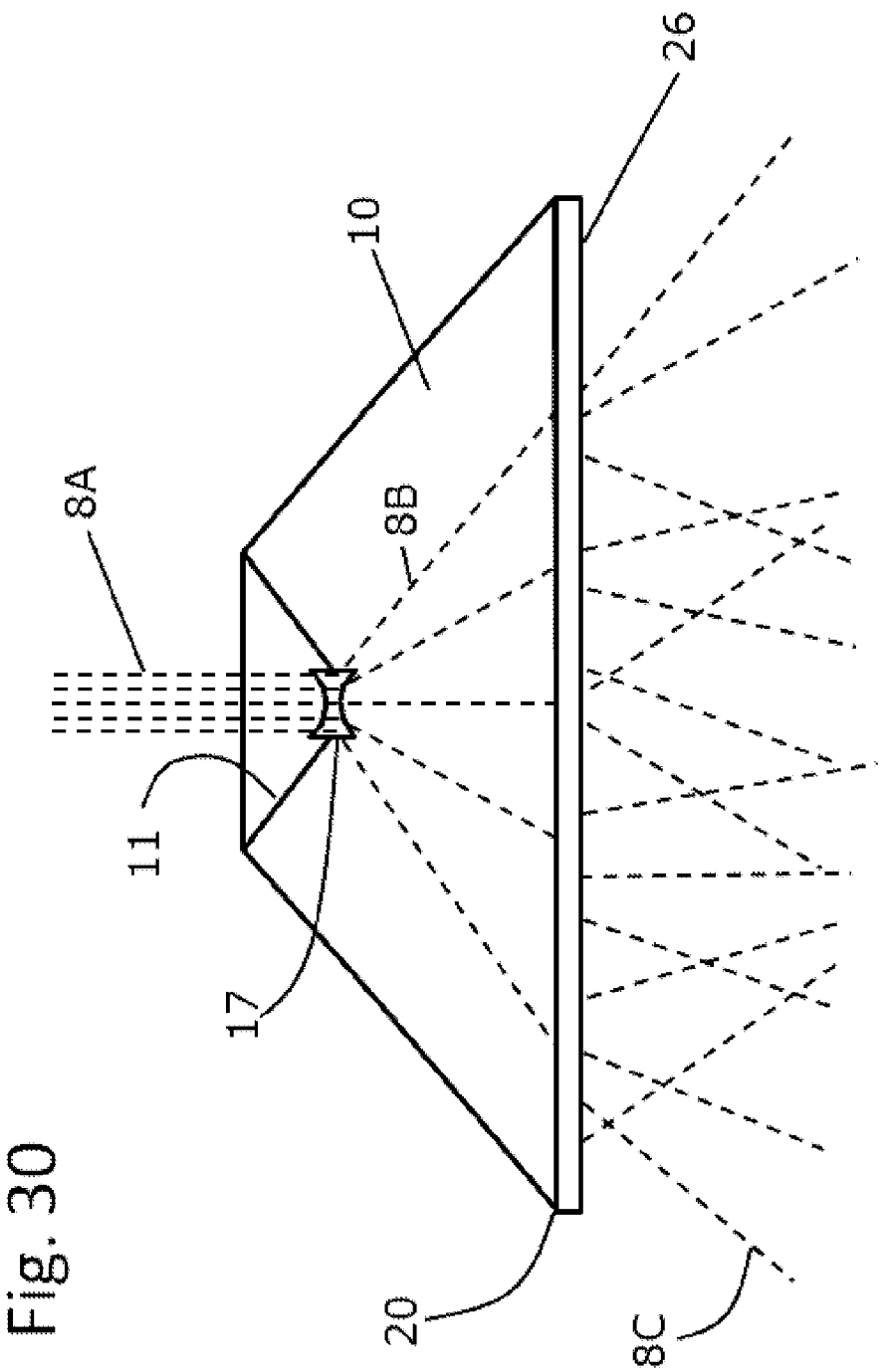

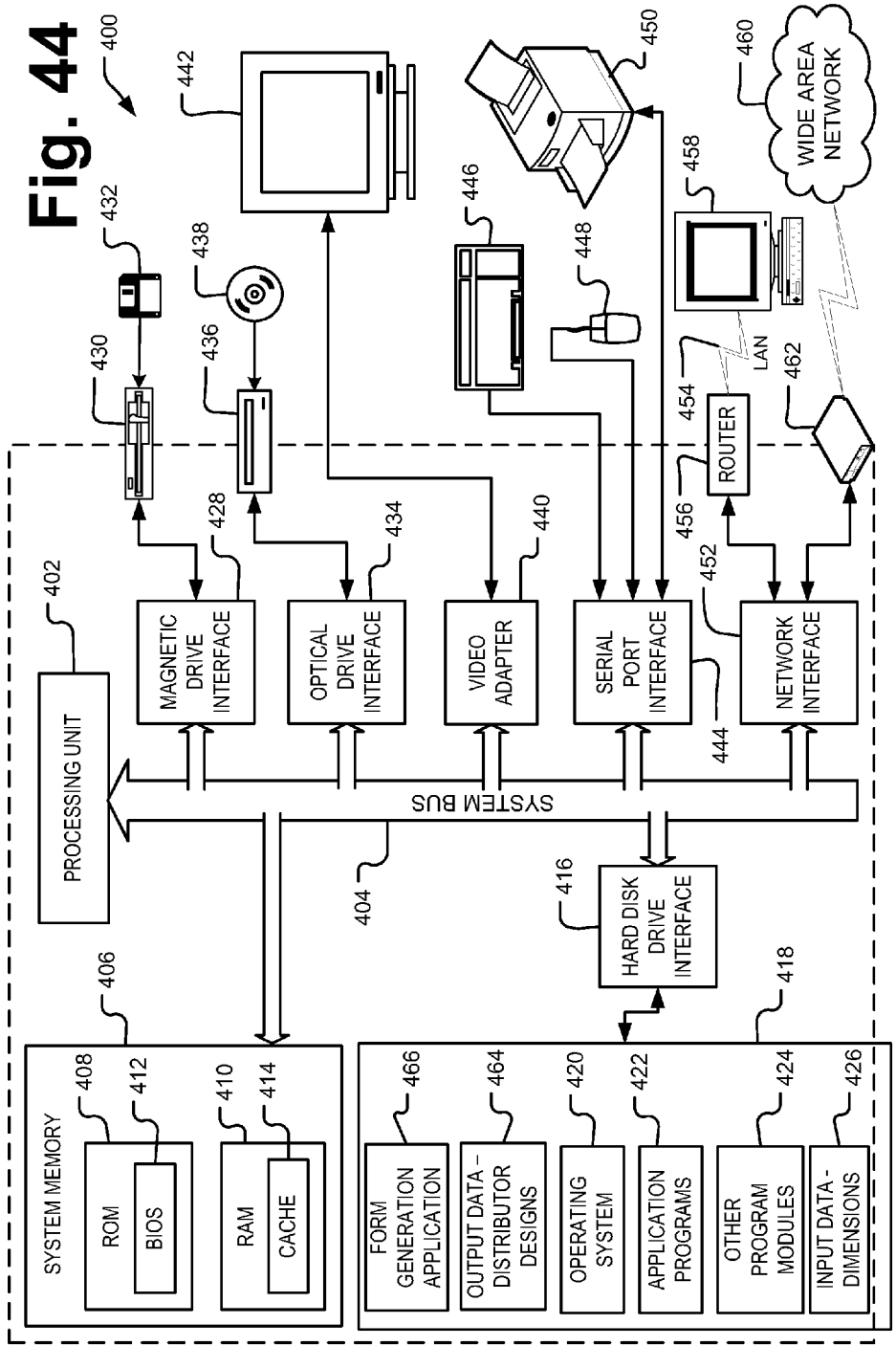

OPTICAL DISTRIBUTOR FOR ROOM LIGHTING

CROSS-REFERENCE TO RELATED APPLICATIONS

This application claims the benefit of U.S. Nonprovisional application Ser. No. 13/879,601 having a national stage entry date of 15 Apr. 2013 entitled "Optical Distributor for Room Lighting," which is a national stage entry under 35 U.S.C. §371(c) of PCT/US2011/056595 filed on 17 Oct. 2011 entitled "Radial Optical Distributor for Room Lighting," which claims the benefit of U.S. Provisional Application No. 61/393,684 filed 15 Oct. 2010 entitled "A method, an apparatus, and a computer program product for an optical distributor," each of which is hereby incorporated herein by reference in its entirety.

TECHNICAL FIELD

The subject matter described herein relates to optical distributors, and more specifically to optical distributors for distributing rays of light.

BACKGROUND

Some optical reflectors are conical and include a 45 degree reflecting cone, which reflects light rays from a collimated or quasi-collimated downwelling beam through a 90 degree angle, spreading the light laterally and equally through a horizontal angle of 360 degrees to the walls of the room. Such reflectors, however, may only illuminate the walls and corners of the room, leaving the central area of the room dark, and may produce a glare condition if the reflected light enters the eyes of occupants or if light scattered from its surface toward the eyes of occupants is too bright. If a single conical reflector's angle of reflection is tilted upward somewhat, so as to spread the light over the ceiling rather than on the wall, the light may be better distributed over the whole room area. The tilting, however, may induce a ring of reflected light on the ceiling which, following its diffuse reflection downward to a task plane, still may not produce a generally uniform illumination of the illuminated space.

The information included in this Background section of the specification, including any references cited herein and any description or discussion thereof, is included for technical reference purposes only and is not to be regarded subject matter by which the scope of the invention as defined in the claims is to be bound.

SUMMARY

The various embodiments of optical distributors described herein allow light rays from a light source, such as a solar light source, to be reflected and propagated onto one or more areas to be illuminated. In some of the embodiments of an optical distributor described herein, one or more faceted surfaces may reflect the light rays in a manner to illuminate an area in one or more rooms or provide general illumination of a whole room or multiple rooms in an approximately uniform manner. In some embodiments, the faceted surfaces may be frustum-shaped or they may be polygonal or circular in shape and form the exterior surface of the optical distributor. In other embodiments, the faceted surfaces may extend in only one direction and may be substantially rectangular shaped in the other two directions. Still other embodiments are described below.

In some embodiments, the optical distributor may include a crater portion and in some embodiments may further include a cone-shaped insert within the crater portion. In some embodiments, the optical distributor may be pyramidal-shaped, cone-shaped, frustum-shaped, dual intersecting planar-shaped, trough shaped, and so forth.

Various embodiments, as described in more detail below, may include and incorporate none, one, or several of the following: blocking rings, glare shields, optical elements (such as a lens or a diffusing sheet), light pipes, and so forth.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

BRIEF DESCRIPTION OF THE DRAWINGS

FIG. 7 is a schematic diagram of a portion of one embodiment of an optical distributor showing further geometrical relationships of components.

FIGS. 8A and 8B are schematic diagrams of portions of one embodiment of an optical distributor showing further geometrical relationships of components.

FIG. 10A is a schematic side plan view of one embodiment of an optical distributor with glare shields.

FIG. 10B is a schematic isometric view of one embodiment of an optical distributor with glare shields.

FIGS. 11A and 11B are schematic diagrams of portions of one embodiment of a glare shield for an optical distributor showing certain geometrical relationships of components.

FIG. 29A is a schematic isometric view of portions of one embodiment of an optical distributor.

FIG. 29B is a schematic isometric view of portions of one embodiment of an optical distributor.

FIG. 29C is a schematic isometric view of portions of one embodiment of an optical distributor.

FIG. 30 is a schematic cross-section view of one embodiment of an optical distributor.

FIG. 44 is a schematic diagram of a specifically configured computer device for generating size, angle, and form specifications for an optical distributor.

DETAILED DESCRIPTION

Figure 1:
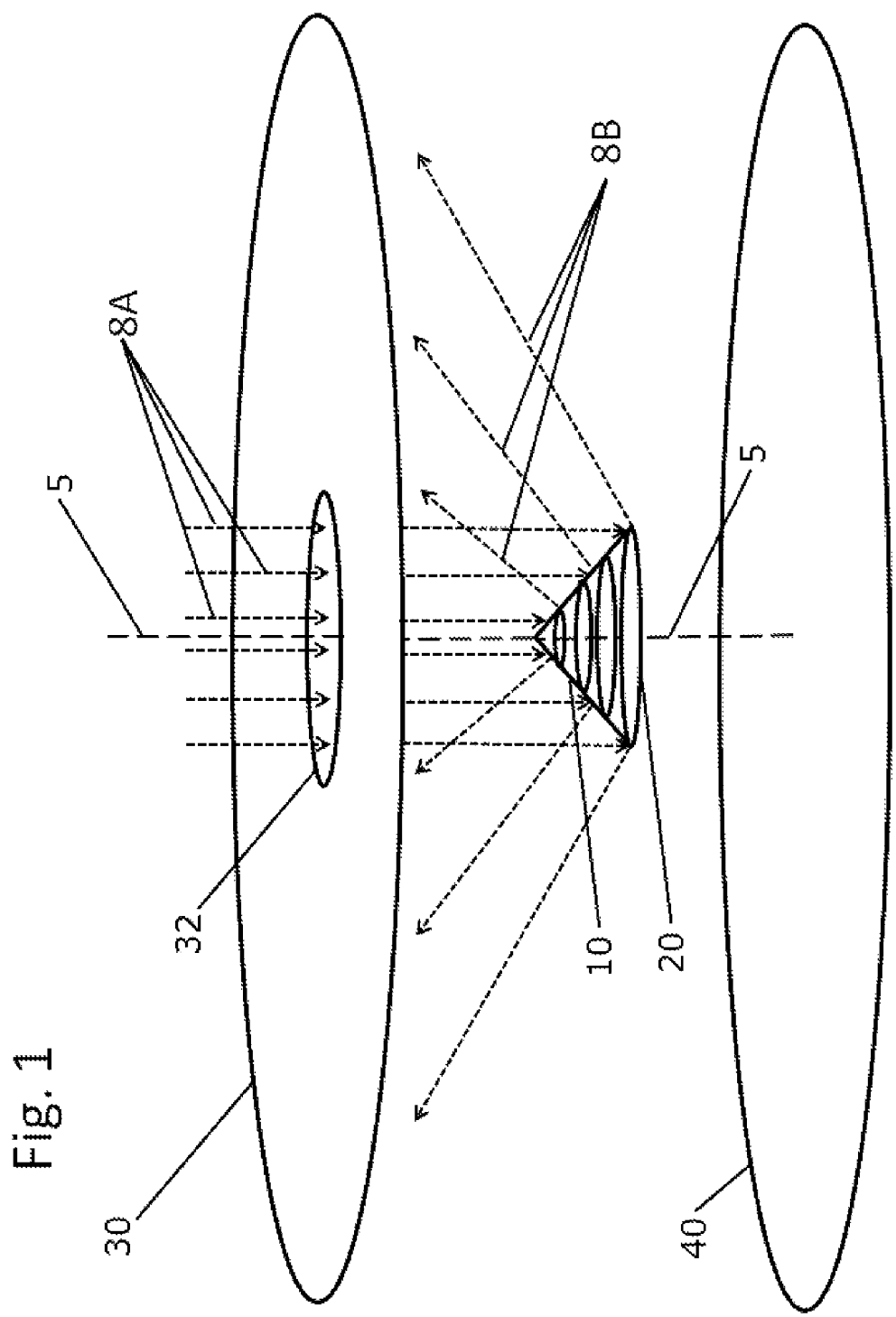
FIG. 1 is a schematic view of one embodiment of an optical distributor.
Figure 21:
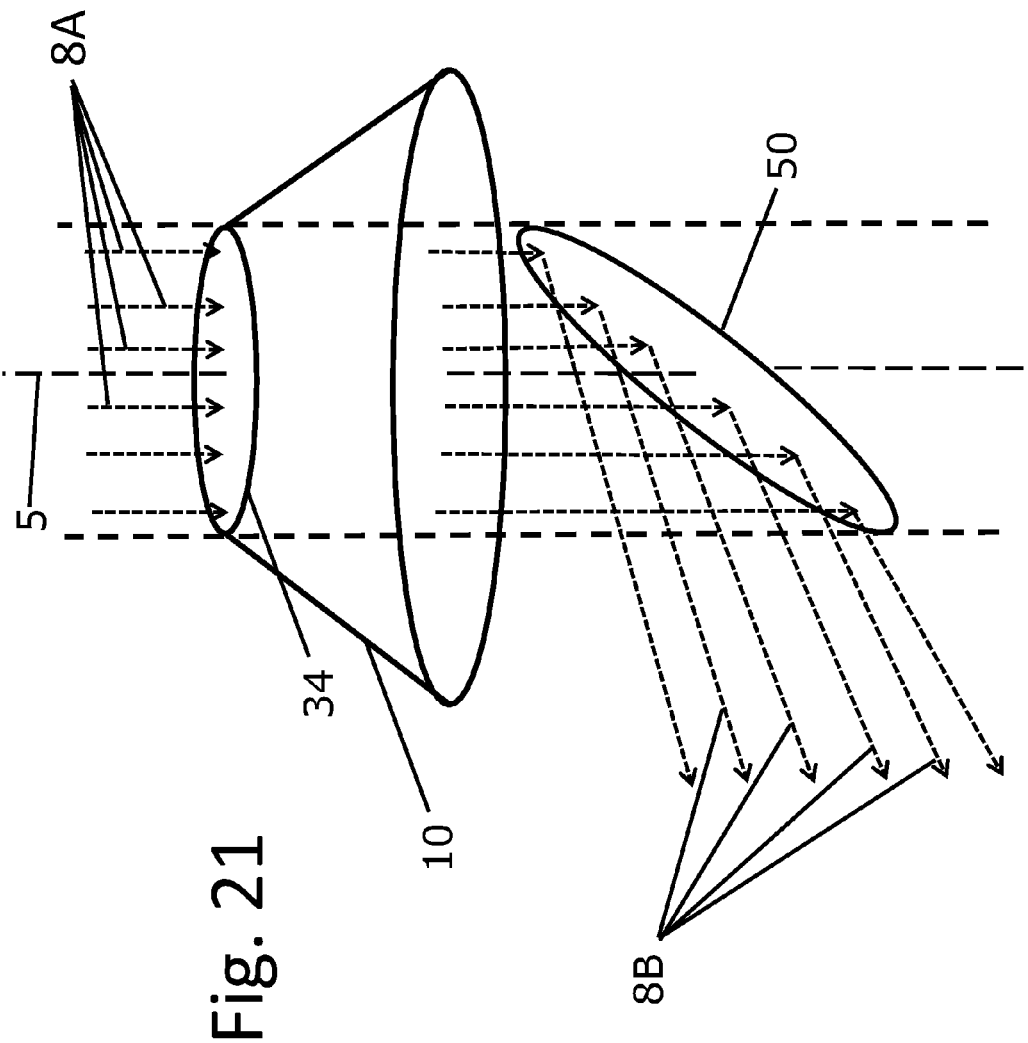
FIG. 21 is a schematic view of portions of one embodiment of an optical distributor.
Figure 24:
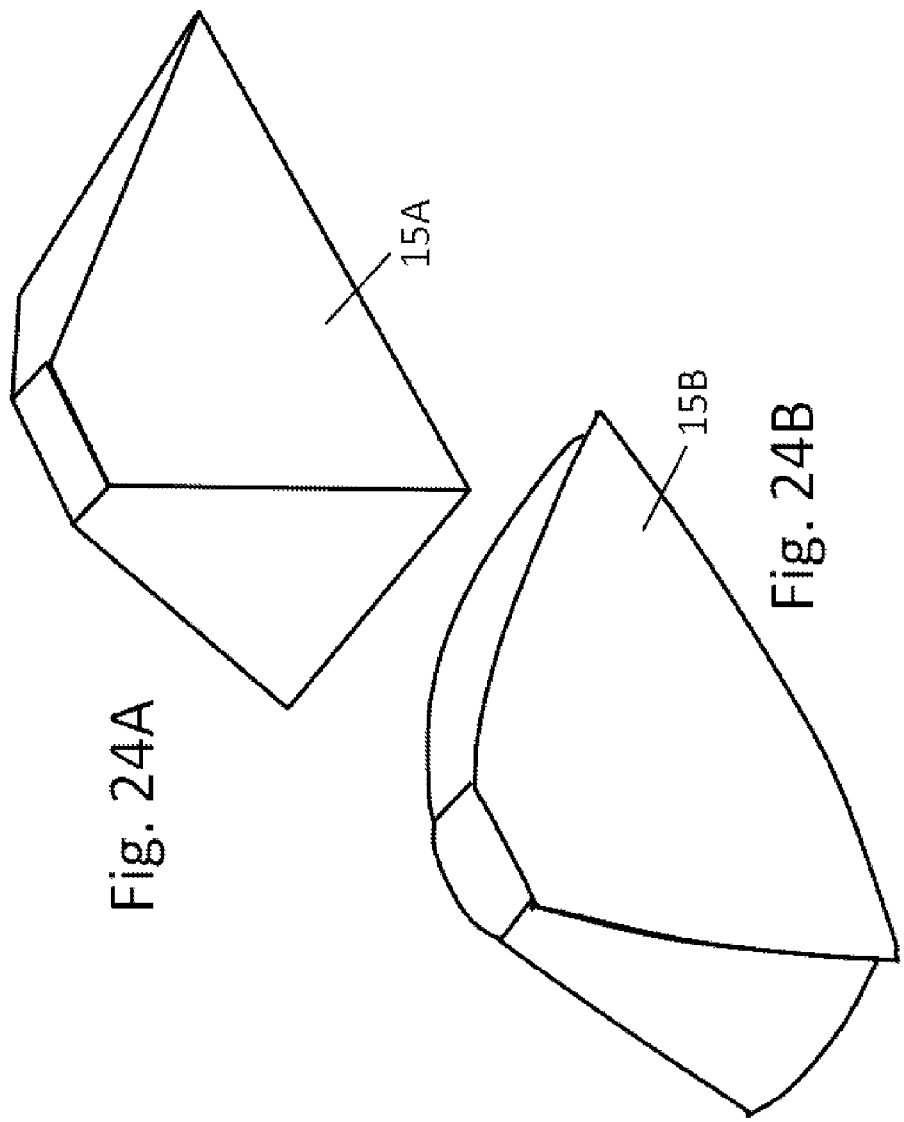
FIG. 24A is a schematic view of one embodiment of an optical distributor.
FIG. 24B is a schematic view of one embodiment of an optical distributor.
Figure 33:
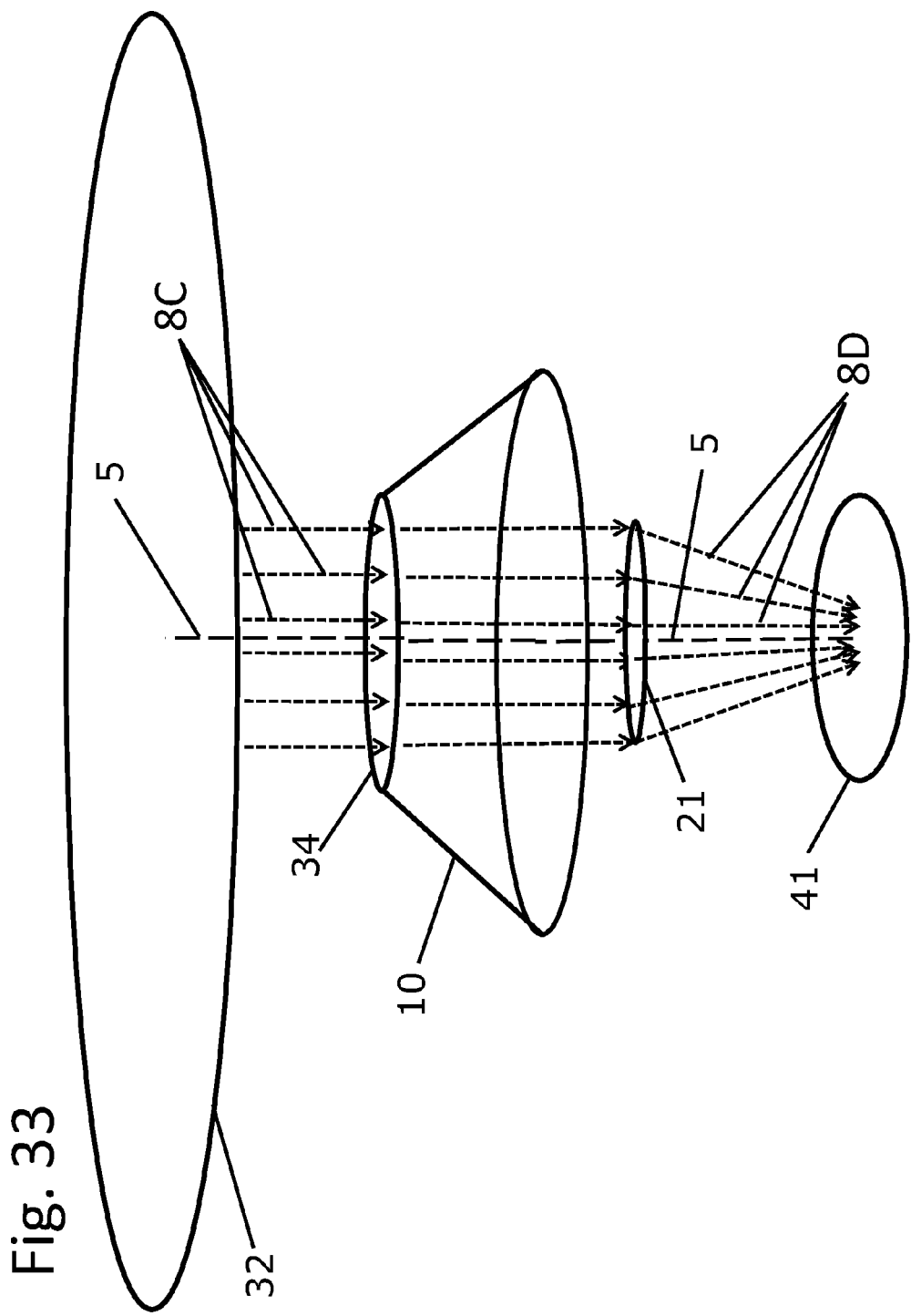
FIG. 33 is a schematic isometric view of portions of one embodiment of an optical distributor.
Figure 37:
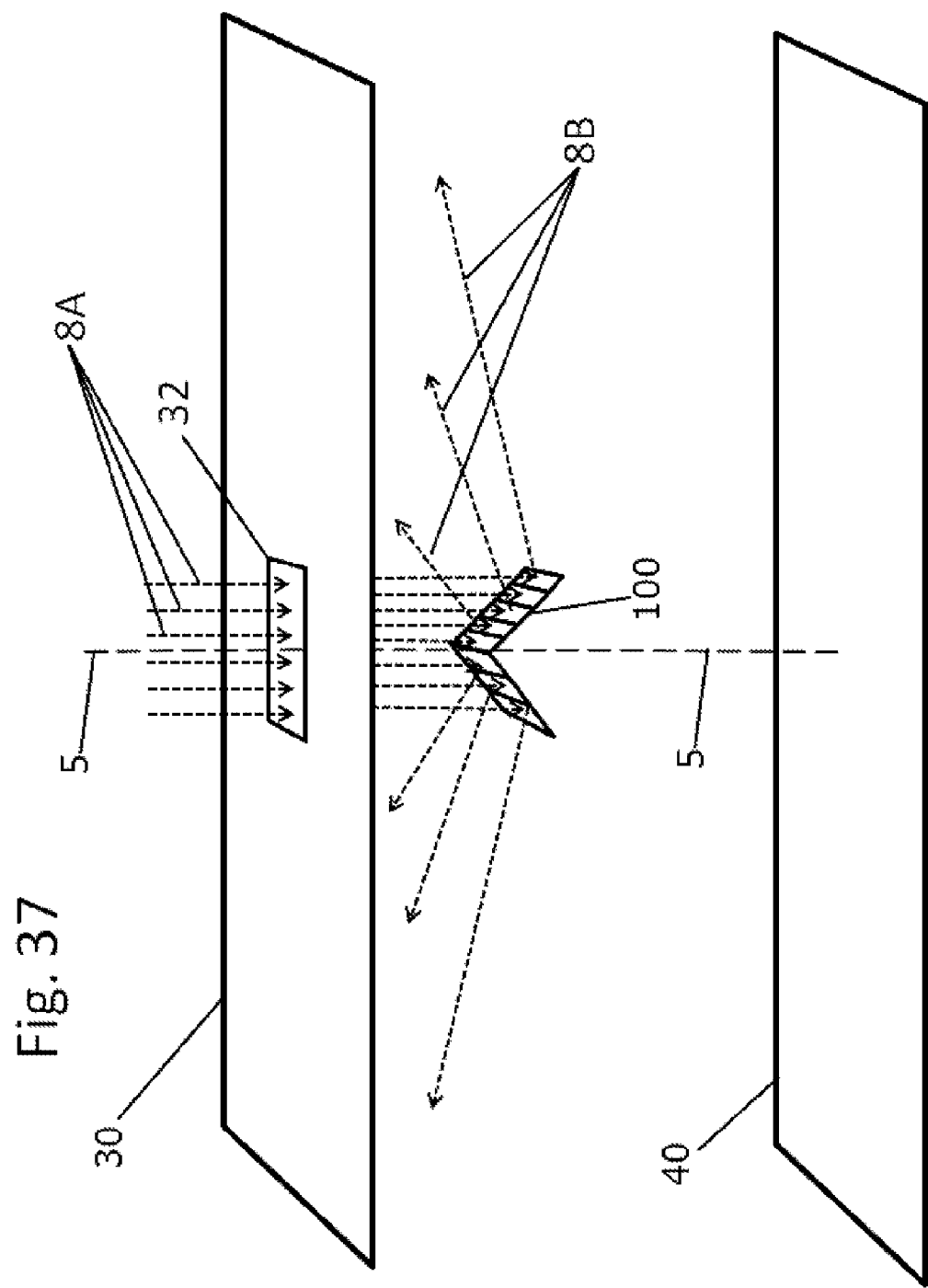
FIG. 37 is a schematic view of one embodiment of an optical distributor.

In general, an optical distributor, which may also be referred to as a radial optical distributor, a distributing reflector, an apparatus, a cone, a conical reflector, a reflector, a distributor, a linear optical distributor, a polygonal optical distributor, an optical element, and so forth, may be referred to herein simply as an optical distributor may take many different forms, some of which may depend on the environment or room or apparatus in which the optical distributor is to be used. Multiple embodiments of optical distributors are described herein. For example, FIG. 1 depicts a radial optical distributor 10; FIG. 21 depicts a quasi-planar reflector 50 as an optical distributor; FIG. 24A depicts a pyramidal, frustum-shaped optical distributor 15A; FIG. 24B depicts a curved surface version of FIG. 24A; FIG. 33 depicts an optical distributor including a refractive lens element 21; FIG. 37 depicts a linear optical distributor 100; and so forth.

Though the primary use intended for this technology is for solar lighting of interior spaces of buildings or other structures, it may have use in a variety of other applications, from scientific instruments to electric lighting to medical devices to industrial process heating, etc. Thus, the word "light" as used in this application and the claims below is intended to include both visible and invisible radiation over other parts of the electromagnetic spectrum, including the visible portion normally called light. The use of the term "light" herein shall not be construed to exclude the use of this technology for other applications using predominantly UV, infrared, or other invisible radiation. The use of the term "illuminate" herein is intended to include radiation in all portions of the electromagnetic spectrum, not just in the visible portion thereof.

Methods for determining appropriate design parameters (e.g., dimensions, angles of incidence, etc.) for the multiple general types of optical distributors and several variations on the optical distributors and methods are also described herein. It should be noted that the various methods for determining design parameters, as well as the variations on the optical distributors and other discussion of the optical distributors contained herein may in some cases apply, with appropriate modifications (if any), to more than the specific type of optical distributor with reference to which the method or variation is specifically described. For example, the various mathematical operations described in connection with FIGS. 6 through 8 may apply, with appropriate modifications (if any), in some cases to both a radial-type optical distributor and a linear-type optical distributor, as well as other types of optical distributors. For purposes of brevity, however, the methods and modifications described with respect to one type of distributor may not necessarily be repeated with respect to another type of distributor, even though such methods and modifications may be equally applicable to both.

It should be noted that both radial and linear optical distributors are generally specularly reflecting, without significant diffuse reflection, while the under or lower side of a reflecting plane (e.g., a ceiling) are generally diffusely reflecting, and these conditions are generally the intent in subsequent descriptions of this technology. However, these limitations are not generally required for the efficacy of this technology. For example, an optical distributor may work well even when the distributors have substantial diffuse components to their reflectance property.

In an in initial example, FIG. 1 shows an isometric view of a radial-type optical distributor 10 that may distribute light initially propagating in a cylindrical, collimated beam of light rays 8A, by reflecting the beam of light rays 8A towards a bottom surface of a first plane 30 (which may in some embodiments be a nominally circular diffusing plane). The optical distributor 10 may in some embodiments be faceted, conical, reflective, radial, etc., and the beam of light rays 8A may propagated to the optical distributor 10 by passing through a circular or polygonal opening or hole 32 in the first plane 30 (such as a ceiling). In this description and those that follow for various embodiments, the collimated beam of rays 8A may come from an electric light source system or from a solar collecting and concentrating system. In both cases, the rays 8A in the beam may be well-collimated (i.e., varying little from being parallel to optical axis 5) or they may be "quasi-collimated" (meaning that they vary from a small angle, e.g., 0.5 degree up to approximately 5 or 10 degrees from the direction of the optical axis 5).

For incident beams of this kind having an ever greater spread or divergence from the direction of the optical axis 5, the various embodiments described below may or may not perform less well, but may still be efficacious for certain applications. In the following description, the word "collimated" is used to include well- and quasi-collimated beams. However, the technology can certainly be used with incident beams having greater divergence than suggested above. In FIG. 1, only a portion of the light rays filling the collimated cylindrical beam are depicted as dashed arrows 8A lying in a plane through a diameter of aperture 32 in plane 30. That drawing convention is followed in the figures to represent the full complement of flux contained in the cylindrical beam passing through aperture 32.

In some embodiments, a substantially collimated beam of light 8A may be used to illuminate the optical distributor 10 because the collimated beam of rays 8A may allow for a more controlled distribution of the rays. In other words, because the orientation of the rays 8A may be generally parallel (e.g., collimated), an optical distributor may in some instances be used to control the distribution of the rays across an area to be illuminated. On the other hand, rays that are not collimated (or at least quasi-collimated) may be more difficult to control via an optical distributor because of the lack of uniformity of the orientation of the light rays. In some embodiments, however, rays that are not collimated may be efficacious for the intended application.

Returning to FIG. 1, the radiant flux diffusely reflected from the first plane 30 may subsequently be approximately uniformly distributed (e.g., with approximately constant irradiance or illuminance) through control of the shape of the optical distributor 10 across a second plane 40, with the second plane 40 being not far below the first plane 30 in some embodiments, or the illumination distribution following reflection from plane 30 may be substantially varying, with higher illuminance or irradiance values in one or more portions of plane 40, and less in others. Control of the shape of the specular reflectors forming the optical distributor 10 can be used to direct the reflected radiation in any of a variety of ways toward a variety of targets surrounding the optical distributor 10. In other embodiments, the second plane 40 may be far below the first plane 30. The second plane 40 may be parallel, and may be, for example, the floor or task plane (e.g., desk or counter height) of a space to be illuminated, but it may alternatively be any target to be illuminated or irradiated.

The optical distributor 10 may thus redirect or distribute light from the collimated beam into other directions in a controlled manner. By shaping the optical distributor 10 into a stack of rings shaped as frustrums of right circular cones of different inclination angles and increasing the number of rings of reflected flux, and when used with a source such as a solar disk that may have a small natural angular spread, the individual rings of light on the first plane 30 may be broadened by the slight angular spreading and fill the target area of the first plane 30 more uniformly. As such, the radial optical distributor 10 may illuminate some, most, or all of the second plane 40 in an approximately uniform manner. Also, the illumination of the first plane 30 may be substantially discontinuous, but the rings may be sufficient in number as not to be overly discontinuous or too bright at any particular location as a result of the optical distributor 10 redirecting the light rays. It may be desirable to prevent the smaller area of plane 30, which is immediately above and hence closer to the optical distributor 10, from being excessively brighter than areas of plane 30 radially further outward, which may then be too dim, by varying the quantity of flux distributed to plane 30 so that most of the flux fills the greater areas around the outer perimeter of plane 30.

In some embodiments, the optical distributor 10 may include one or more segments of one or more circular conical facets (or sections or frustums), some or all of which may have a slightly different angle from a vertical line through the center of the optical distributor, which may be the axis 5 of optical distributor 10. The facets or faceted surfaces (or the segments thereof) of the optical distributor 10 may further have slightly altered widths and tilts so that the illuminance or irradiance within all of the reflected rings of light onto the first plane 30 may be, on average, approximately the same, thereby distributing the light across the second plane 40 somewhat evenly.

In other embodiments, the optical distributor 10 may be formed as a smooth and quasi-conical reflective surface with a continuously changing slope. The surface may re-direct or distribute a portion of a downwelling collimated cylindrical beam of light rays 8A back upward and radially outward onto a first plane 30, in such a manner that the light from the optical distributor that is subsequently reflected diffusely from the first plane 30 may thereafter be generally uniformly distributed over a second plane 40 below the optical distributor 10. The optical distributor 10 in this embodiment is the natural result of taking the number of frustum rings to an upper limit and fitting a continuous curve to the points on the boundaries between each of the frustum rings.

Many variations of the radial optical distributor 10 shown in FIG. 1 are possible. For example, the first plane 30 may have a lower surface that is diffusely reflecting, and the surface may have any perimeter, shape, width, etc. The first plane 30 may have a circular or polygonal opening 32 in its center, may be centered around the optical axis 5 of the optical distributor 10 (as illustrated in FIG. 1). Furthermore, the top or peak of the radial optical distributor 10 may be located at any distance below the first plane 30 and may or may not be truncated at the top, leaving a hole in its center through which incident flux can pass. As described below in more detail, some embodiments of the radial optical distributor 10 may be low-profile in order to reduce the distance that the optical distributor 10 extends below the first plane 30. In other embodiments, which are described in more detail below, a stack of shallow conical glare shields may surround at least a portion of the optical distributor. Still other embodiments, as described below, include one or more tilted reflective mirrors that may be elliptically, rectangularly, or trapezoidally shaped and which may reflect a portion of the vertical downwelling collimated beam of light rays radially outward from the central axis of the beam, while spreading the light rays laterally and optionally in the perpendicular direction as well, to illuminate one or more limited portions of the surrounding space with controlled levels of illumination.

Although the nominal shape of the incident beam of light rays 8A shown in FIG. 1 is approximately cylindrical and may result in approximately uniform irradiance or illuminance in the reflected light when used with a radial optical distributor 10, other shapes of incident light beams and/or other shapes of optical distributors are possible. Incident light rays may form a rectangular beam, a polygonal beam, an elliptical beam, or any other type of beam, including a beam with an irregular cross section. The optical distributor 10 may be appropriately modified for differing incident beam shapes. For example, in the case of an elliptical light beam, the optical distributor may be deformed to have a matching elliptical base perimeter.

The optical distributor 10 may in some cases be used to illuminate a room or a portion thereof using solar light collected by a light gathering system. In some embodiments, the light gathering system may be located on a rooftop and may deliver a generally fixed, nominally cylindrical beam of light downward through the roof and ceiling and onto the optical distributor using a single roof penetration.

Figure 2:
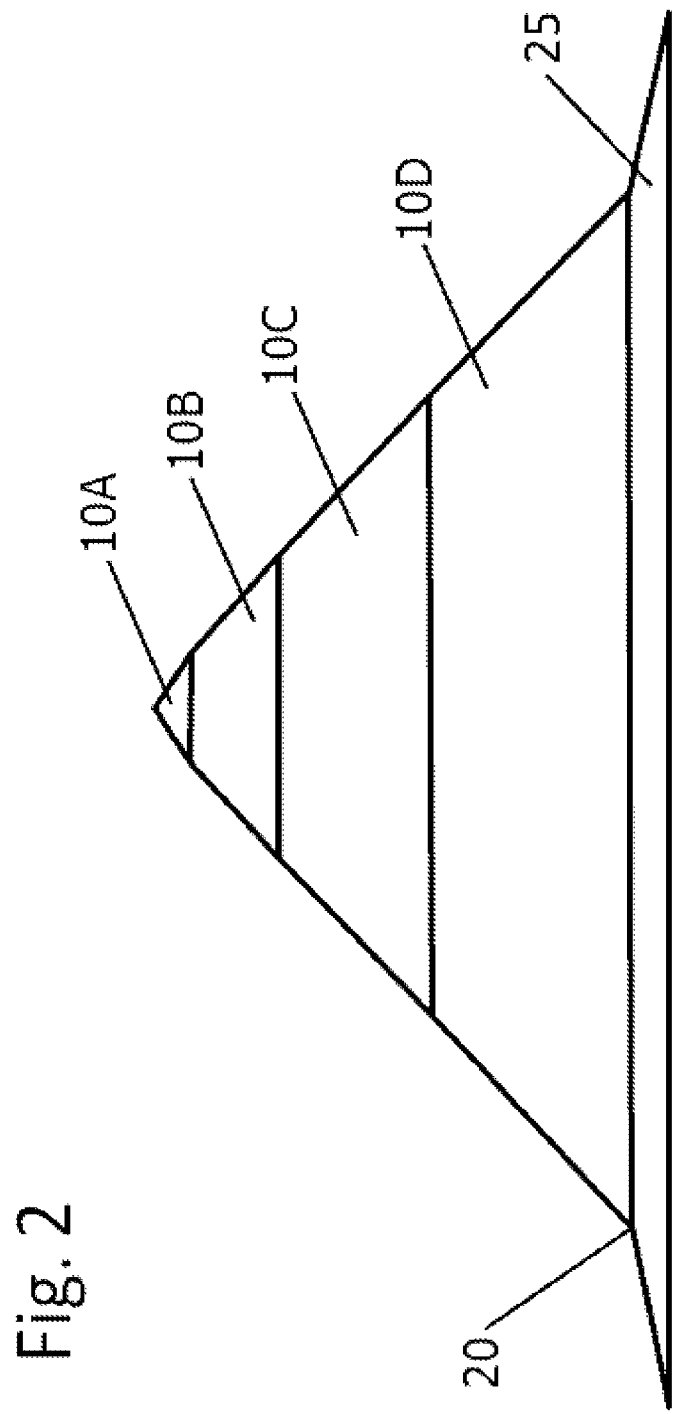
FIG. 2 is a schematic side plan view of one embodiment of an optical distributor.

FIG. 2 shows a side plan view of a reflecting optical distributor 10 with four faceted surfaces (10A, 10B, 10C, and 10D) and a stray rays blocking ring 25 (which may also referred to as a reflective ring or blocking edge). The blocking ring 25 may, in some embodiments, be opaque, absorbing, reflecting, and/or diffusely reflecting or transmitting, and may be located around the base 20 of the optical distributor 10 and extend some distance radially outward beyond the base 20 of the optical distributor 10. The blocking ring 25 may redirect stray flux from the incident beam of light rays 8A and propagate them radially outward beyond the perimeter of the base 20 of the optical distributor 10 and thence upward onto first plane 30, which flux might otherwise cause a glare or stray light condition. Many variations on the blocking ring 25 shown in FIG. 2 are possible. In some embodiments an optical diffusing sheet 26 (as shown, for example, in FIG. 30, but which should be extended radially beyond the distributor 10 to intercept downwelling rays which may miss that distributing reflector) may be used in conjunction with or in place of the blocking ring 25.

Figure 3:
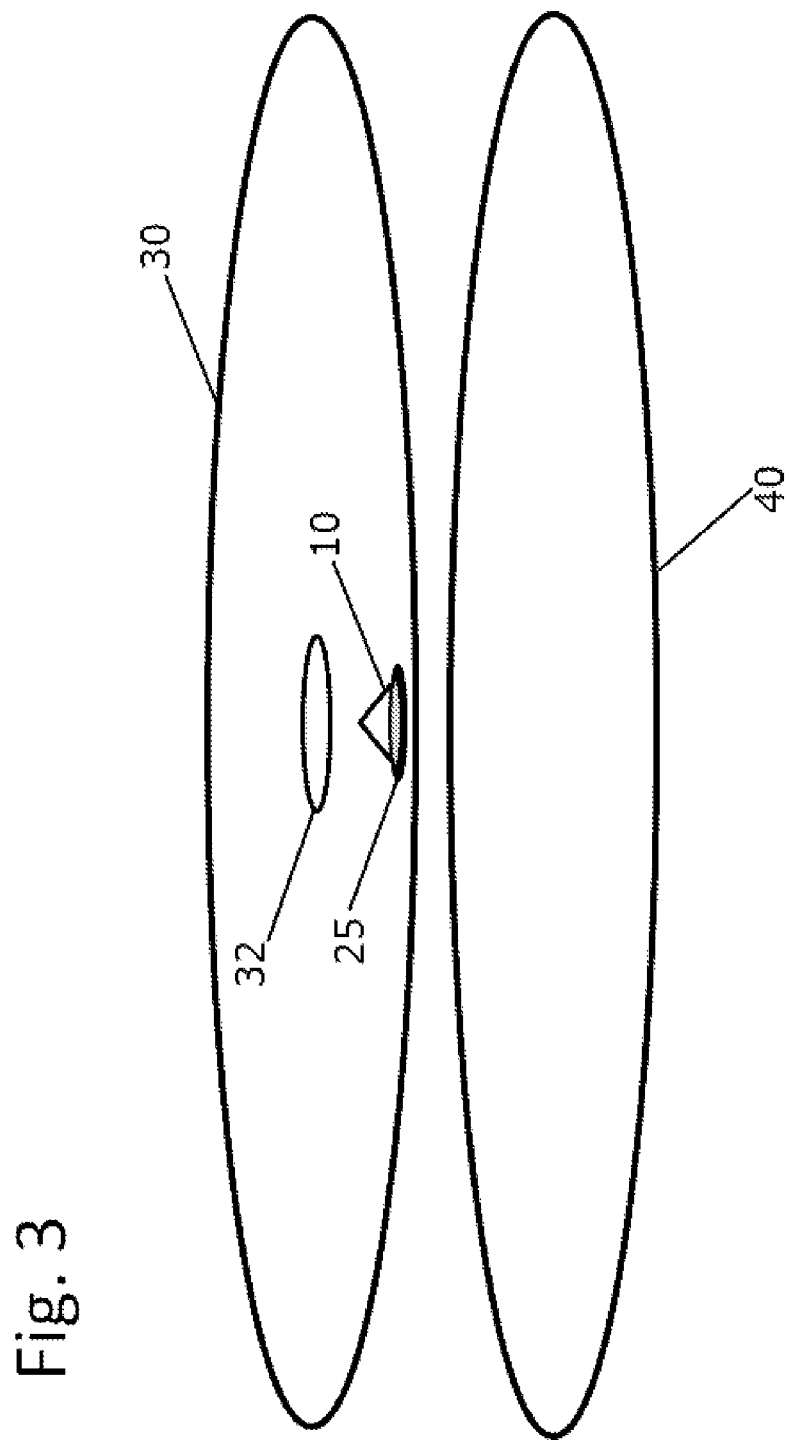
FIG. 3 is a schematic view of one embodiment of an optical distributor.

FIG. 3 depicts an optical distributor 10 with a blocking ring 25 positioned between a first plane 30 and a second plane 40. The first plane 30 shown in FIG. 3 has a circular opening 32 through which a beam of light rays may pass to reach the optical distributor 10 and from there, be reflected onto a bottom surface of the first plane 30.

Figure 4:
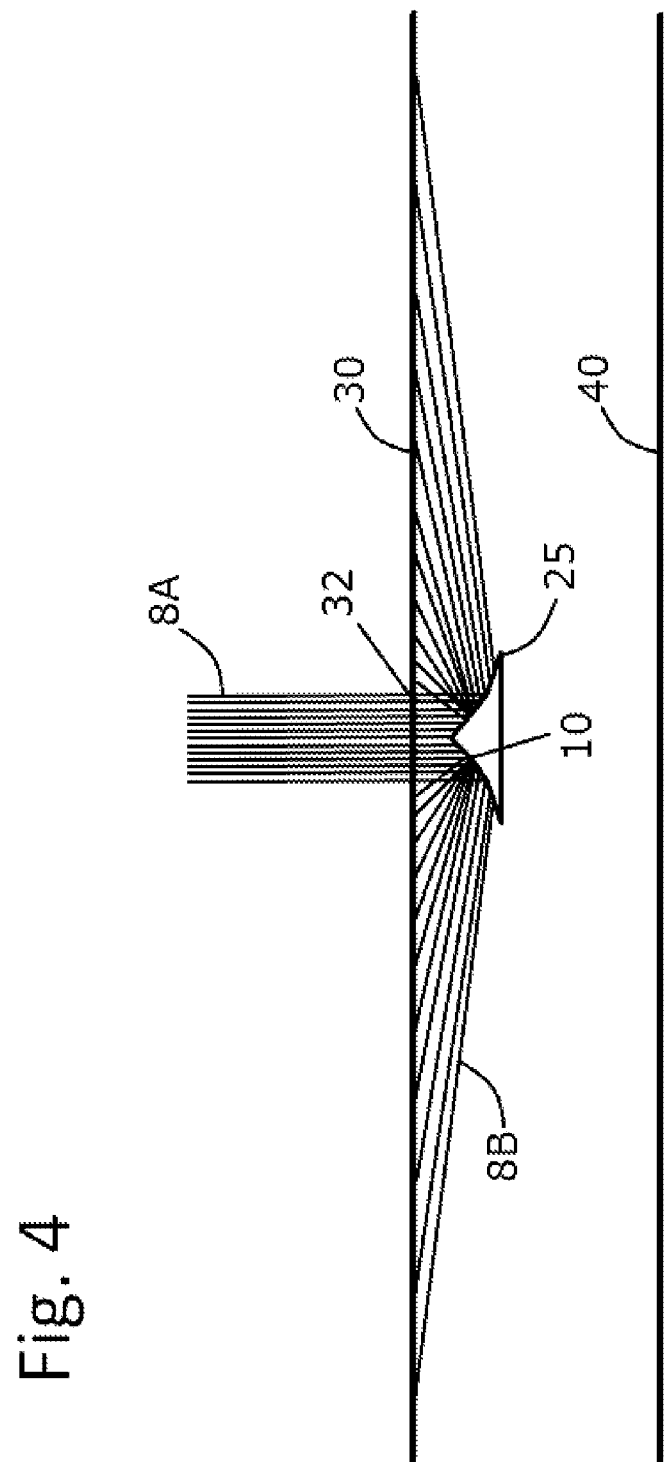
FIG. 4 is a schematic side plan view of one embodiment of an optical distributor showing the reflection of rays from a reflector 1.

FIG. 4 shows a side plan view of an optical distributor 10, and also shows the approximate paths of optical rays initially contained within the incident cylindrical beam 8A propagating downward through the opening 32 in the first plane 30 onto the optical distributor 10 with a blocking ring 25 around it and thence as rays 8B upward and outward onto the bottom surface of the first plane 30.

Figure 5:
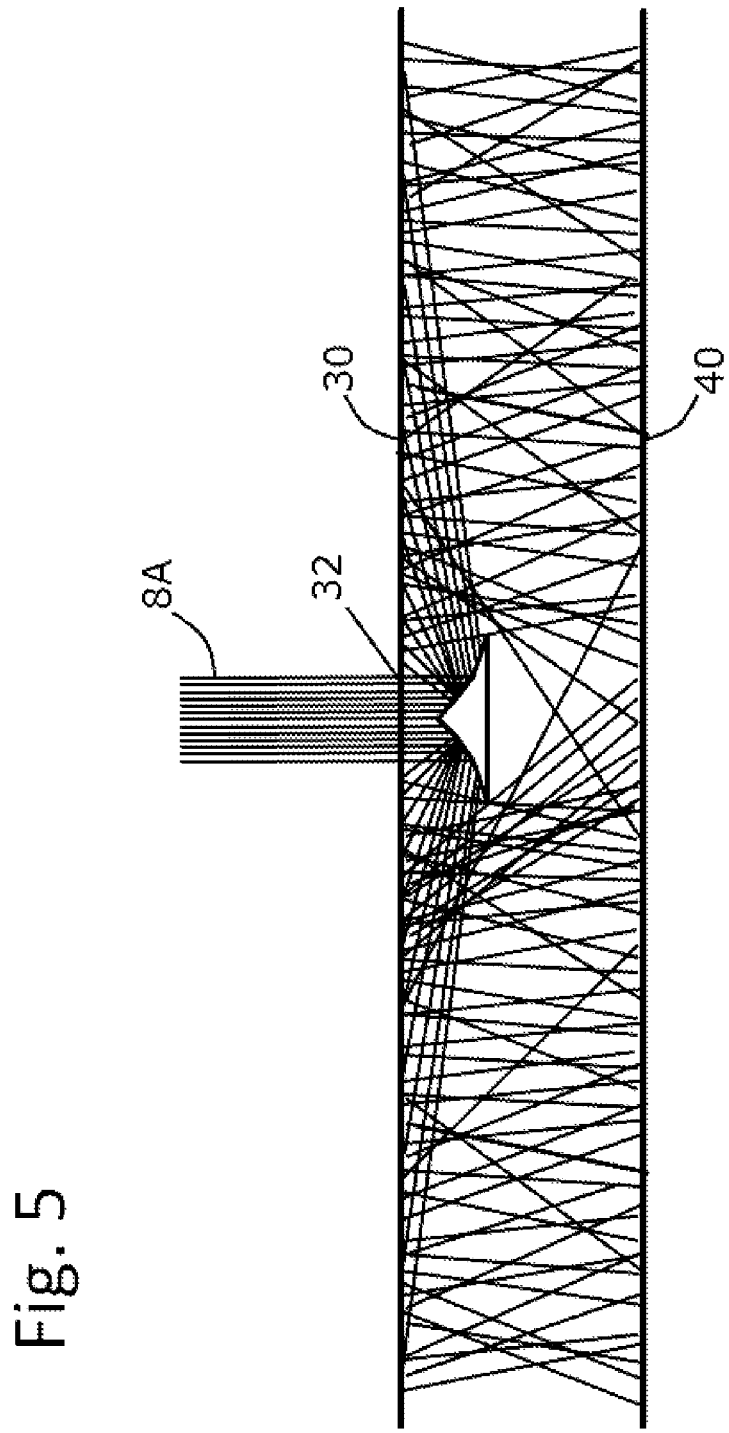
FIG. 5 is a schematic side plan view of one embodiment of an optical distributor showing the reflections of rays from a reflector 1 and secondary reflections of those rays from a first plane 3 onto a second plane 4.

FIG. 5 shows a side plan view of an optical distributor 10, and also shows the approximate additional paths followed by optical rays 8B diffusely reflected by first plane 30 propagate from the bottom surface of the first plane 30 downward onto the second plane 40. The rays depicted in FIG. 5 are distributed in an approximately uniform manner across the second plane 40.

Figure 6:
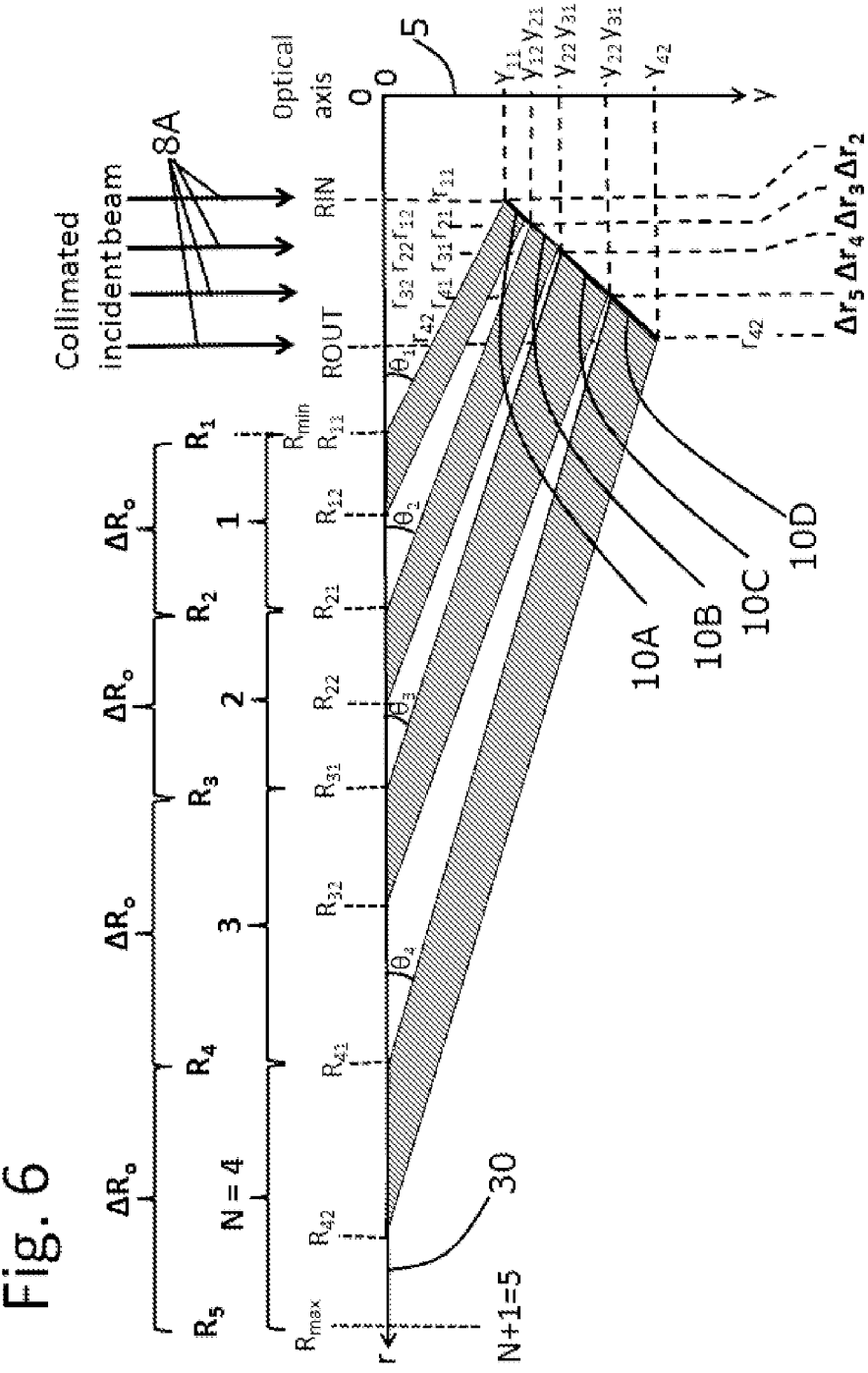
FIG. 6 is a schematic diagram of a portion of one embodiment of an optical distributor showing the geometrical relationships of components.

FIGS. 6 through 8B show schematic diagrams of portions of an optical distributor 10 with various geometrical lines, dimensions, and angles illustrated for use in explaining various mathematical steps that may be used in some embodiments to compute potential dimensions of some embodiments of the optical distributor 10. Referring to FIG. 6, the line 5 is an axis through the center of the optical distributor 10, denoted as the y-axis, and line 30 in FIG. 6 coincides with and corresponds to the first plane 30 in FIG. 1, and is denoted the r-axis in FIG. 6. The arrows 8A in FIG. 6 depict some of the downwelling light rays in the collimated incident beam propagating downward toward the faceted surfaces 10A, 10B, 10C, and 10D of the optical distributor 10. FIG. 6 also shows the radial limits of some target regions on the bottom surface of the first plane 30.

Still with reference to FIG. 6, an optical distributor 10 may be visualized by defining a set of coplanar line segments 10A, 10B, 10C, 10D, and so forth, in the r-y plane of a rectangular coordinate system, and sweeping the coplanar line segments 360 degrees around the optical axis 5 to form a three-dimensional segmented conical surface. The coplanar line segments 10A, 10B, 10C, 10D, when swept around 360 degrees, may represent the faceted surfaces 10A, 10B, 10C, 10D shown, for example, in FIG. 2. The radial widths, heights, and tilt angles of the facets or segments of the optical distributor 10 may be selected to reflect light into annular or ring areas in the first plane 30 in such a manner that the light rays diffusely reflected from the first plane 30 are approximately uniformly distributed across the second plane 40.

In FIG. 6, a downwelling flux of light rays 8A may strike the line segments, 10A, 10B, 10C, and 10D in the four-segment or four-facet optical distributor shown in FIG. 6. The flux may reflect specularly up and radially to the left of the portion of the optical distributor depicted in FIG. 6, with rays at the ends of the line segments propagating onto the first plane 30. Measuring the distance down from the first plane 30 as coordinate y and radial distances to the left from the optical axis 5 as coordinate r, line segment 10A has top right coordinates $(r_{11}, Y_{11})$ and bottom left coordinates $(r_{12}, Y_{12})$. Because this line segment 10A is connected to the second one, 10B, it may have, but is not restricted to, top right coordinates $(r_{21}, Y_{21})$ which are the same values as the coordinates $(r_{12}, Y_{12})$ of the bottom left end of the first line segment 10A. Rays reflecting from line segment 10A may propagate through the cross-hatched region on FIG. 6 until they strike the first plane 30 between radii $R_{11}$ and $R_{12}$, respectively, inside the first target annulus having inner radius $R_1$ and outer radius $R_2$. Similarly, light rays striking the second conical facet, illustrated in FIG. 6 as line segment 10B, may reflect up and to the left of the first plane 30 arriving between radii $R_{21}$ and $R_{22}$ inside the target annulus having inner and outer radii $R_2$ and $R_3$, respectively. The angle between the rays reflected from line segment 10A and plane 30 is designated $\theta_1$ and the corresponding angle for rays reflected from the next line segment, 10B, is $\theta_2$, etc. Increasing the radial widths $R_{i2}-R_{i1}$ for the $i^{th}$ reflected beam onto the first plane 30 in a certain way may produce a similar average illuminance in each of the rings of reflected light onto the first plane 30. To achieve approximately uniform flux levels and distributions across the first plane 30, the widths $\Delta r_i$ and angles of tilt $\phi_i$ of the line segments 10A, 10B, 10C, etc. used to generate the shape of the optical distributor 10 may be adjusted.

Certain mathematical operations will now be described with reference to FIGS. 6 through 8, and later, with reference to FIGS. 13 through 16. These mathematical operations may be used in designing some but not all embodiments of a radial optical distributor. Other mathematical operations may be used in place of, or in addition to those explained below. Also, the mathematical operations explained below may be modified in some instances.

The first plane 30 is divided into N circular rings or annular "target" zones of equal radial widths $\Delta R_o$ given by Equation (1).

$$\Delta R_o = (R_{N+1} - R_1)/N. \quad (1)$$

The area $A_i$ of the $i^{th}$ zone, given by $$A_i = \pi(R_{i+1}^2 - R_1^2) \quad (2)$$

increases linearly with $R_i$ because the radial widths of the target zones may all share the same value, $\Delta R_o$, as shown in equations (3) through (8) below. For the average flux density or irradiance or illuminance to be the same for each area $A_i$, the reflected beam going into each target zone on the first plane 30 may contain an amount of flux that increases linearly with respect to this area, so that the average illuminance will be the same for each area $A_i$. In general, the $i^{th}$ conical distributor segment illuminated area on the first plane 30 will not fully fill the target area $A_i$. Due to beam spreading if the sun is used as the light source and as the number N of distributor segments increases, there may be a degree of filling in of the unilluminated gaps on the first plane 30 and as N is increased, and an increasing overlap of the adjacent illuminated rings on the first plane 30.

Since each target annular area or ring may have the same radial width $\Delta R_o$, it is next shown that the area $A_i$ of each ring may generally increase linearly with respect to the inner circle circumference $C_i = 2\pi R_i$. The derivation with respect to $C_i$ results in a formula for the desired area $A_i$ of the $i^{th}$ zone as follows:

$$A_i = \pi(R_{i+1}^2 - R_i^2), \; i = 1 \text{ to } N \quad (3)$$

$$\Delta R = R_{i+1} - R_i \quad (4)$$

Then $\Delta R$ may be set to be constant so that $$R_{i+1} = R_i + \Delta R. \quad (5)$$

Square both sides $$R_{i+1}^2 = R_i^2 + 2\Delta R R_i + \Delta R^2,$$

substitute this result into (3), and rearrange the resulting equation as follows:

$$A_i = \pi(R_i^2 + 2\Delta R R_i + \Delta R^2 - R_i^2) \quad (6)$$

$$A_i = \pi(2\Delta R R_i + \Delta R^2) \quad (7)$$

$$A_i = \pi\Delta R^2 + 2\pi\Delta R R_i. \quad (8)$$

This derivation shows that areas $A_i$ increase linearly with the radii $R_i$. If $C_i = 2\pi R_i$ is the circumference of the inner circular boundary of the $i^{th}$ annulus, the changing area of each annulus of constant width depends either linearly on the circumference, $$A_i = \pi\Delta R^2 + \Delta R C_i, \quad (9)$$

or also linearly with the radius, $$A_i = \pi\Delta R^2 + \Delta R 2\pi R_i. \quad (10)$$

By increasing the radial widths $\Delta r_i$ of the $i^{th}$ frustrum-shaped segments of reflector 10 linearly with i, an increase in the quantity of flux in the incident beam 8A may be intercepted by each such segment and thereby sent to the target zones on first plane 30, causing the flux in each area $A_i$ of that plane to increase linearly as well to match the linear increase in the areas $A_i$. This results, in principle, in the ratio of flux to area of each target zone to be constant, producing the desired uniform average irradiance or illuminance of the total target area of plane 30. The derivation below leading to Equations 68-82 explains how to design the distributing reflector 10 to achieve this result.

With reference to FIGS. 6 through 8, the inner radius of the optical distributor may be called $R_{IN}$ (which may be nonzero if it is desired to have a circular or polygonal opening or aperture in the top of it) and the outer radius of the base 20 of the optical distributor may be called $R_{OUT}$. Next a designer may decide how far below the bottom surface of the first plane 30 the top of the optical distributor should be placed (i.e., the value of $y_{11}$), and this distance may in some embodiments be small enough that the bottom of the optical distributor does not protrude too far down into the space below the first plane 30. Finally, a designer may determine the length of the innermost radius of the illuminated area on the first plane 30. That is $R_{11}$, also called $R_{min}$ and may be the same as $R_1$ in FIG. 6. The target zones on the first plane 30 may be of different radial widths, or they may be designed to all be the same radial width, $\Delta R_o = R_2 - R_1 = (R_N - R_1)/N$. Next, a designer may determine that the innermost edge of the reflected flux ring on the first plane 30 from the $i^{th}$ conical distributor segment should be coincident with the innermost radial zone $R_i$ in some embodiments. In these embodiments, the outer radial edge of the $i^{th}$ reflected beam flux ring on the first plane 30 may increase with i so that the total flux in the $i^{th}$ reflected flux ring increases linearly with the inner radius $R_i$. This may result in the illuminated ring within each of the N zones on the first plane 30 not always filling the target zone area, making the illumination of the bottom surface of the first plane 30 binary in nature (a set of bright rings separated by dark spaces between them).

Various steps may be taken in some embodiments to overcome the binary illumination of the first plane 30. For example, the shape of each segment or facet of the optical distributor may be adjusted to force the reflected light from each segment to fill its target ring completely. This may be accomplished by using convex and/or concave segments or facets for the optical distributor, so as to spread the collimated light rays incident on each segment or facet fully over its target zone on the first plane 30.

As another example, in some embodiments the incident downwelling collimated beam of light rays may spread to fill a solid angle of some small size, which may be called "quasi-collimated." Such a condition may cause the reflected flux of light rays from each optical distributor segment or faceted surface to spread out radially and/or longitudinally into the dark spaces between the reflected beams, thereby softening the contrast and improving the uniformity of illumination across the first plane 30. Imperfections in the optical system delivering the beam of light rays 8A to the optical distributor may produce a degree of spreading of the downwelling beam and this may help to further spread the flux reflected from the optical distributor.

As another example, the number N of distributor facets and corresponding target zones on the first plane 30 may be increased, making the dark spaces between each reflected beam reaching the first plane 30 smaller. If there is also a slight divergence in the downwelling quasi-collimated beam, as indicated above (e.g., when the sun is the source), the dark spaces may be filled in by the spreading beams of flux due to the slight divergence.

As still another example, once the coordinates of all the line segments have been calculated as described above, a smooth curve may be fitted to the starting points $(r_{i1}, y_{i1})$ (or $r_1, y_1$ in some embodiments) of each segment while increasing N to 20 or 30 or more. Such a curve fit may be obtained using a second order polynomial. Other curve fit equations may also be employed. The resulting curve may be smooth and may produce an approximately continuous distribution of flux on the first plane 30 that is approximately uniform in irradiance or illuminance. When N is set equal to 30, a second order polynomial provides a good curve fit and a continuous surface profile for the distributor that produces uniform illumination of plane 30 using quasi-collimated concentrated solar radiation.

FIG. 7 is a schematic illustration of a cross section of an optical distributor, detailing the $i^{th}$ one of several segments or facets of the optical distributor 10 and the $i^{th}$ circular "target" ring of radial width $\Delta R_{i12}$ on the bottom surface of first plane 30 and showing several geometrical and trigonometric relationships elucidated from the diagram.

FIG. 7 may be used in some embodiments to help determine the widths and tilt angles of the optical distributor's segments or faceted surfaces, which may be conical in some embodiments. The angle of incidence of the parallel rays in the downwelling beam on the $i^{th}$ conical facet is given the symbol $\phi_i$. For specular reflection, the angle of incidence may equal the angle of reflection, both being $\phi_i$. Since $\theta_i$ is the angle the $i^{th}$ segment's reflected ray makes with the first plane 30 and $2\phi_i$ is the angle the reflected ray makes with the optical axis 5, it is known from the right triangle shown in FIG. 7 that $2\phi_i=90°-\theta_i$. From the geometry of the drawing, these additional relationships are found for angles measured in either degrees or radians:

$$\theta_i=90°-2\phi i \tag{11}$$

$$\theta_i=\pi/2-2\phi i \tag{12}$$

$$2\phi_i=90°-\theta_i \tag{13}$$

$$\phi_i=45°-\theta_i/2 \tag{14}$$

$$\theta i=90°-2\theta i \tag{15}$$

$$\theta_i=\pi/2-2\phi_i \tag{16}$$

$$\alpha_i=90°-\phi_i \tag{17}$$

$$\sin\theta_i=B_i/\Delta R_{i12} \tag{18}$$

$$\cos\phi i=B_i/\Delta h_{i+1} \tag{19}$$

$$\cos\phi_i=\Delta r_{i+1}/\Delta h_{i+1} \tag{20}$$

$$\Delta R_{i12}\sin\theta_i=B_i \tag{21}$$

$$\Delta h_{i+1}\cos\phi_i=B_i \tag{22}$$

Given that $r_{i2}$ and $r_{i1}$ are known, $$\cos\phi_i=(r_{i2}-r_{i1})/\Delta h_{i+1} \tag{23}$$

$$\Delta h_{i+1}=\Delta r_{i+1}/\cos\phi_i \tag{24}$$

$$\Delta R_{i12}\sin\theta_i=\Delta h_{i+1}\cos\phi_i \tag{25}$$

$$\Delta R_{i12}=\Delta h_{i+1}\cos\phi_i/\sin\theta_i \tag{26}$$

$$\Delta R_{i12}=\Delta r_{i+1}/\sin\theta_i \tag{27}$$

$$\tan\theta_i=y_{i1}/(R_{i1}-r_{i1}) \tag{28}$$

$$R_{i1}=r_{i1}+y_{i1}/\tan\theta_i \tag{29}$$

$$R_{i2}=R_{i1}+\Delta R_{i12} \tag{30}$$

$$B_i=\Delta r_{i+1} \tag{31}$$

FIGS. 8A and 8B show further details of the geometry of a line segment 10B inclined at an angle to the vertical, optical axis 5, used to generate the $i^{th}$ distributor segment or facet (by sweeping it at least partially around the optical axis 5 to form a truncated conical segment) and the geometrical relationship of this line segment to a corresponding radial line segment in the target ring of width $\Delta R_{i12}$ extending from $R_{i1}$ to $R_{i2}$. The shaded area of FIG. 8B may indicate the region where the downwelling incident rays 8A strike the specularly reflecting surface of 10B and are further reflected downward and to the left.

With reference to FIGS. 8A and 8B, two of the triangles from in FIG. 7 are shown with greater detail, and from these the following additional relationships may be deduced:

$$\sin\theta_i=B_i/\Delta R_{i12} \tag{32}$$

$$\cos\phi_i=B_i/\Delta h_{i+1} \tag{33}$$

$$\cos\phi_i=\Delta r_{i+1}/\Delta h_{i+1} \tag{34}$$

$$\sin\phi_i=\Delta y_{i+1}/\Delta h_{i+1} \tag{35}$$

$$\Delta R_{i12}=\Delta h_{i+1}\cos\phi_i/\sin\theta_i \tag{36}$$

$$\Delta R_{i12}=\Delta r_{i+1}\cos\phi_i/\cos\phi_i\sin\theta_i \tag{37}$$

$$\Delta R_{i12}=\Delta r_{i+1}/\sin\theta_i \tag{38}$$

$$\tan\phi_i=\Delta y_{i+1}/\Delta r_{i+1} \tag{39}$$

$$\Delta y_{i+1}=\Delta r_{i+1}\tan\phi_i \tag{40}$$

$$180°=2\phi_i+(90°-\phi_i)+\beta_i \tag{41}$$

$$\beta_i=180°-2\phi_i-90°+\phi_i \tag{42}$$

$$\beta_i=90°-\phi_i \tag{43}$$

Returning to FIG. 6, the $N^{th}$ target zone on the first plane 30 may have an inner radius equal to $R_N$ and an outer radius $R_{N+1}$. It also means that $$R_{N+1}=R_N+\Delta R_o, \tag{44}$$

where $\Delta R_o$ is the equal radial widths of the target zones on the first plane 30.

$$\Delta R_o=(R_{N+1}-R_1)/N=R_{N+1}-R_N. \tag{45}$$

The inner radii of the N contiguous target zones on the first plane 30, $R_i$, will be given by $$R_i=R_1+(i-1)\Delta R_o=R_1+(i-1)(R_{N+1}-R_1)/N, \; i=1 \text{ to } N \tag{46}$$

The (i−1) may be needed so that the value of the first $R_i$ is $R_1$. The outer radius $R_{N+1}$ of the last zone will be $$R_{N+1}=R_N+\Delta R_o. \tag{47}$$

The conical facet angle (hypotenuse) widths $\Delta h_{1+1}$ shown in FIG. 7 and their corresponding horizontal plane radial widths $\Delta r_i=(r_{i2}-r_{i1})$ may be related to the reflected beam radial widths $\Delta R_{i12}$ according to the equations below (some of which are listed in the derivation sequence presented previously, Eqs. 11-43).

$$\Delta R_{i12}=\Delta h_{1+1}\cos\phi_i/\sin\theta_i \tag{48}$$

and $$\Delta h_{i+1}=\Delta r_{i+1}/\cos\phi_i \tag{49}$$

so that $$\Delta R_{i12}=(r_{i2}-r_{i1})/\sin\theta_i=\Delta r_{i+1}/\sin\theta_i \tag{50}$$

$$R_{i+1}=R_i+\Delta R_o. \tag{51}$$

Also note that $$\tan \theta_i = y_{i1}/(R_{i1} - r_{i1}) \quad (52)$$

$$y_{i1} = (R_{i1} + r_{i1}) \tan \theta_i \quad (53)$$

and that $$\phi_i = \pi/4 - \theta_i/2 = (\pi/2 - \theta_i)/2 \quad (54)$$

with $$\tan \phi_i = \Delta y_{i+1}/\Delta r_{i+1} \quad (55)$$

so that $$\Delta y_{i+1} = \Delta r_{i+1} \tan \phi_i. \quad (56)$$

If the $\Delta y_i$ are known, the $y_{i2}$ can be computed from $$y_{i2} = y_{i1} + \Delta y_{i+1}. \quad (57)$$

Once $\phi_i$ is known the widths of the reflective segments or facets may be computed from $$\Delta h_{i+1} = \Delta r_{i+1}/\cos \phi_i; \quad (58)$$

$$B_i = \Delta h_{i+1} \cos \phi_i, \quad (59)$$

and $$\Delta R_{i12} = \Delta h_{i+1} \cos \phi_i/\sin \theta_i \quad (60)$$

or $$\Delta R_{i12} = \Delta r_{i+1}/\sin \theta_i. \quad (61)$$

Further, $$y_{(i+1)1} = y_{i1} + \Delta_{i+1} = y_{i1} + \Delta r_{i+1} \tan \phi_1 \quad (62)$$

and $$R_{i2} = R_{i1} + \Delta R_{i12}. \quad (63)$$

This makes possible an iterative computation of each of the end points of the line segments in the r-y plane used to generate the optical distributor's segments or facets (which may be conical and/or reflective in some embodiments) by sweeping the line segments 360 degrees about the optical axis 5. In other embodiments, the line segment is only partially swept about the optical axis 5 and the remainder of the 360 degrees may be left empty, filled with another distributing reflector shape, etc.

In some embodiments of the optical distributor, the diameter of the base of the optical distributor 10 may be 24 inches and the height may be less than 24 inches, although in other embodiments the diameter may be different and/or the height may be greater than 24 inches. The distance from the top of the optical distributor 10 to the first plane 30 may vary, depending upon the application, the width or diameter, or the shape of the diffusely reflecting lower surface of the first plane 30 may also vary. As mentioned above, in some embodiments the first plane 30 may be the ceiling of a room in which the optical distributor is mounted. The optical distributor 10 may include a set of two or more segments or faceted surfaces, 10A, 10B, 10C, 10D, etc., as described in detail above, which may be conical and/or may spread the reflected light rays over most or all of the whole diffusing surface of the first plane 30 bounded by two circles on that surface of radii $R_{min}$ and $R_{max}$ so that the diffusely reflected light rays reaching that portion of second plane 40 which lies beneath the illuminated area of plane 30, are approximately uniformly distributed over the second plane 40. Because the distributor will tend to shadow rays from plane 30 directly above it, preventing them from reaching plane 40, there is likely to be a significant drop in the luminance reaching plane 40 in the area directly beneath the distributor. Options for overcoming this are described further below.

The propagation of a cylindrical beam of light rays 8A through the opening 32 in the first surface 30 onto the optical distributor 10, and thence into the reflected beam 8B of spreading rays which propagate onto the bottom surface of the first plane 30 is illustrated in the ray trace diagram of FIG. 4. FIG. 5 approximates the results of a computerized optical ray tracing process applied to one embodiment of a optical distributor 10 wherein the rays propagating onto first plane 30 are diffusely reflected downward in FIG. 5 and onto second plane 40. The method described herein may provide an approximately uniform illumination of the portion of the second plane 40 below the target area of the first plane 30 bounded by a circle of radius $R_1$, also designated "$R_{min}$" and another circle of radius $R_{N+1}$ also designated "$R_{max}$" in FIG. 6.

Referring now to FIGS. 6, 7, and 8, the sizes, positions, and inclinations of the segmented portions or facets of some embodiments of an optical distributor 10 may be determined by the process described below. As mentioned above, other processes may be used in addition to or in place of the following. FIG. 6 illustrates a schematic illustration of the way that the downwelling flux in cylindrical beam of light rays 8A may be intercepted by segments or facets of the optical distributor 10 and the way that this flux is reflected into multiple rings in the first plane 30, centered on the optical axis 5. The coordinate system chosen is a planar Cartesian one, with coordinates r and y. The usual x coordinate, illustrated as r in FIG. 6, is measured outward from optical axis 5. The vertical coordinate, illustrated as y in FIG. 6, is measured vertically downward from the first plane 30. As shown in FIG. 6, each line segment 10A, 10B, etc., may be used to generate a segment or facet of the optical distributor by sweeping that line segment through 360 degrees of rotation (or less) about the y or optical axis 5, creating a conical segment or frustum. Other segments (such as a partially conical segment) may be created by sweeping the line segment through less than 360 degrees of rotation. The remainder of the 360 degrees may be left empty or filled with one or more portions of a distributor that reflects light in different directions.

The $i^{th}$ line segment may be defined by an inner radius $r_{i1}$ and an outer radius $r_{i2}$, the radial difference between these being denoted $\Delta r_i$, with i ranging from 1 to N, where N is the number of segments in the optical distributor, and by top and bottom y-coordinates, denoted $y_{i1}$ and $y_{i2}$, respectively. The vertical distance between these top and bottom y-coordinates, the vertical heights of each conical segment or sector, is denoted by $\Delta y_i$. Thus the end points of each line segment are given by the Cartesian coordinates $(r_{i1}, y_{i1})$ and $(r_{i2}, y_{i2})$. In the design shown in FIG. 6, the end point $(r_{i2}, y_{i2})$ of the $i^{th}$ line segment is the start point $(r_{(i+1)1}, y_{(i+1)1})$ of the $(i+1)^{th}$ line segment. For a collimated incident beam of light rays 8A, the rays reflected from the N conical segments or facets of the optical distributor may produce N rings of light rays on the bottom surface of the first plane 30, as illustrated with the shaded regions in FIG. 6. These rings may have inner and outer radii denoted by $R_{i1}$ and $R_{i2}$, respectively. The $i^{th}$ ring of reflected light rays having radii $R_{i1}$ and $R_{i2}$ on the first plane 30 will propagate into the $i^{th}$ target ring on the first plane 30 having inner radius $R_i$ and outer radius $R_{i+1}$, as illustrated in FIG. 6.

The reflected rays in the $i^{th}$ such ring may reach the first plane 30 making angle $\theta_i$ to the first plane 30, as illustrated in FIG. 6. Each of these rings may fall inside "target" rings on the first plane 30 having inner radii $R_1, R_2, R_3 \ldots R_N$. The outer radius of the $N^{th}$ ring may be $R_{N+1}$. The radial widths of these target rings may be the same, given by $\Delta R_o$. The inner radius $R_1$ of the first target ring may be equal to inner radius $R_{11}$ of the first ring of reflected rays. This is also designated $R_{min}$ and the outer radius of the last target ring may be equal to the outer radius $R_{N2}$. This may also be designated $R_{max}$. Similarly, $r_{11}$ may be referred to as "$R_{IN}$" and $r_{N2}$ may be referred to as "$R_{OUT}$".

The mathematical relationships between the $r_{i1}$, $r_{i2}$, $R_{i1}$, and $R_{i2}$ values may be determined with reference to FIGS. 6 and 7 and the equations presented above and below. The line segment used to generate the $(i+1)^{th}$ segment or faceted surface is illustrated in both figures, but in FIG. 6 without significant angular variation from line segment to line segment, since the figures are for illustration purposes only. Several geometric and trigonometric relationships are shown in FIG. 7, derived from the drawing shown there, and provided in equations (11) through (61) above. The symbol n with a caret (^) over it is used to denote a "normal vector," a directed line that is perpendicular or "normal" to another line. On FIG. 7 the arrow with that symbol denotes the normal or perpendicular to the $i^{th}$ line segment used to generate the $i^{th}$ cone segment. The angle of incidence of a vertical downwelling light ray incident on that cone segment may be the angle between the incident light ray and the normal to the cone surface at the point of incidence. The angle of reflection for specular or "mirror" reflection may equal the angle of incidence and is denoted (1), in FIG. 7.

Returning to FIG. 6, the radial distance $(R_{N+1} - R_{min})$ from the inner target radius $R_{min}$ to the radius $R_{N+1}$ or $R_{max}$ of the outer edge of the target area on the first plane 30 to be illuminated, may be divided into N circular zones having similar radial widths $$\Delta R_o = (R_{N+1} - R_{min})/N. \tag{64}$$

This means that the radii $R_i$ are given by Equation (65):

$$R_i = R_{min} + (i-1)\Delta R_o, \ i=1 \text{ to } N \tag{65}$$

The flux to each ring may increase linearly with radius $R_i$, in proportion to the area of each ring, given by $$A_i = \pi(R_{i+1}^2 - R_i^2). \tag{66}$$

If each ring is of the same radial width $\Delta R_o$, the area $A_i$ of each ring may increase linearly with the inner circle circumference $C_i = 2\pi R_i$ according to Equation (67):

$$A_i = \pi \Delta R_o^2 + \Delta R_o C_i = \pi((R_N + R_{min})/N)^2 + ((R_N - R_{min})/N)C_i \tag{67}$$

The N circular bands of light reflected from the N segments or facets of the optical distributor may be narrower than the $\Delta R_o$ radial width zones on the bottom surface of the first plane 30 upon reaching that plane, as illustrated for example in FIG. 6. By increasing the number N of segments or facets of the optical distributor 10 sufficiently, and when the incident beam of light rays has a small beam spread, the N circular bands of light on the first plane 30 may merge and appear more or less continuous. In a solar lighting application, the diverging rays from half degree angular diameter the solar disk, combined with scattering from the first plane 30, and the use of a moderately large value for N may result in increased uniformity of illumination on the second plane 40. The value of N may in some embodiments be 4 or greater. Generally, the greater the value of N, the greater the number of target circular annuli of illumination on the first plane 30 and the greater the uniformity of the diffusely reflected flux propagating from the first plane 30 when it arrives at the designated area of the second plane 40.

In some embodiments, the flux per unit area may be substantially constant over a horizontal section through the downwelling cylindrical beam of light rays 8A incident on the optical distributor 10. Each element of the segmented optical distributor may in some embodiments intercept a horizontal ring of area increasing linearly, i.e. proportional to $A_i$ as calculated in (67). These two conditions may enable the average irradiance or illuminance across the illuminated portion of the first plane 30 to be made substantially constant for each zone.

To achieve this goal, $\Delta r_i$ may be made to be proportional to $(i-1)$ so that it will increase linearly with i as follows:

$$\Delta r_i = K(i-1), \tag{68}$$

with K being the constant of proportionality, obtained by summing equation 68 over all values of i from 1 to N+1 and then solving for K, and setting the result equal to $R_{OUT} - R_{IN}$. Using (68), this condition is expressed as follows:

$$K \sum_{i=1}^{N+1} (i-1) = R_{OUT} - R_{IN} \tag{69}$$

In evaluating this summation, we use the sum of integers function:

$$\text{SumOfIntegers}(n) = 1 + 2 + 3 + \ldots + n = (n^2 + n)/2 \tag{70}$$

expressed as $$\sum_{i=1}^{N} (i) = \frac{N(N+1)}{2} \tag{71}$$

so that also $$\sum_{i=1}^{N} (i-1) = \frac{N(N-1)}{2} \tag{72}$$

and also $$\sum_{i=1}^{N+1} (i-1) = \frac{N(N+1)}{2} \tag{73}$$

Using these, solving (69) for K results in the formula of equation 74 results in $$K = \frac{2(R_{OUT} - R_{IN})}{N(N+1)}. \tag{74}$$

Thus, given $R_{IN}$ and $R_{OUT}$, the desired inner and outer radii of the segments or facets of the optical distributor, the radial boundaries of each segment or facet, may be given by the formulae:

$$r_{11} = R_{IN}, \tag{75}$$

$$r_{i1} = r_{(i-1)\cdot 2} \text{ for } i=2 \text{ to } N+1, \tag{76}$$

$$\Delta r_i = K(i-1) \text{ for each } I, \quad (77)$$

and $$r_{i2} = r_{i1} + \Delta r_{i+1} \quad (78)$$

for each i. These equations may in some embodiments ensure that each distributor segment or faceted surface will intercept an increasing quantity of flux in the downwelling beam, which increase may be linear with respect to i, thereby making the flux received in each target zone on first plane 30, divided by the area of that zone, approximately the same for all target zones on first plane 30.

To generate the $y_{i1}$ and $y_{i2}$ values from the above requirements, the trigonometric relationships developed in FIG. 7 and provided in equations (11) through (82) may be used. The $i^{th}$ distributor line segment width is the hypotenuse $\Delta h_{i+1}$ of the right triangle having opposing sides of lengths $\Delta r_{i+1}$ and this hypotenuse having length equal to the square root of the sum of the squares of $\Delta r_{i+1}$ and $\Delta y_{i+1}$, as illustrated in FIG. 8A. The downwelling rays onto the upper and lower ends of this line segment, due to the law of reflection, may be reflected through angle $2\phi_i$ up onto the first plane 30 at radii $R_{i1}$ and $R_{i2}$, respectively, as illustrated in FIG. 8A. Using the trigonometric derivations provided above, and since $R_{11}$ ($=R_{min}$) and $y_{11}$ may be set by the designer, and since $$\tan \phi_1 = y_{11}/R_{11}, \quad (79)$$

and since $$2\phi_i = 90° - \theta_i \quad (80)$$

for all values of i, and since we may know $\phi_1$, we may therefore calculate $$\Delta h_2 = (r_{12} - r_{11})/\cos \phi_1 \quad (81)$$

From this we obtain $\Delta y_2$ and from this we may also know that $$y_{12} = y_{11} + \Delta y_2. \quad (82)$$

Once we know these parameters we may then use the equation derived in FIG. 7 for $$\Delta R_{i12} = \Delta r_{i+1}/\sin \theta_i, \quad (83)$$

to obtain $$R_{i2} = R_{i1} + \Delta R_{i12} \quad (84)$$

And so we have mapped $(r_{11}, y_{11})$ and $(r_{12}, y_{12})$ to $R_{11}$ and $R_{12}$, using (71) for $r_{11}$, (77) for $\Delta r_i$, (78) for $r_{i2}$ (82) for $y_{12}$, (84) for $R_{12}$, and with $R_{11}$ ($=R_1=R_{min}$) and $y_{11}$ being set by a designer. The same process may be used to determine the coordinates of the remaining line segment end points.

In general, we have from FIGS. 6, 7, and 8:

$$\Delta h_{i+1} = \Delta r_{i+1}/\cos \theta_i \quad (83)$$

$$\tan \phi_i = \Delta y_{i+1}/\Delta r_{i+1} \quad (84)$$

$$R_{i1} = r_{i1} + y_{i1}/\tan \theta_i \quad (85)$$

$$R_{i2} = R_{i1} + \Delta R_{i12} \quad (86)$$

and so forth. The method used to design the reflective optical distributor 10 may include calculating the top and bottom coordinates of each segment or facet of the optical distributor, starting at the top and sequencing downward in an iterative manner to the bottommost one in some embodiments. At each step, we may also calculate the start $R_{i1}$ and end $R_{i2}$ radii of the reflected beams on the first plane 30. The equations provided above may be used to determine each $\theta_i$, $\phi_i$, and $\alpha_i$.

The slope angles $\beta_i$ of each line segment relative to the optical axis 5 may be computed with the aid of FIG. 8B, yielding $$\beta_i = 90° - \phi_i. \quad (87)$$

For aesthetic or improved performance reasons, once the contiguous segments or facets have been determined by the above sequence, the vertical spacing between them may be increased from 0 to any other value $\Delta y$, but the positions of the start and end points of the segments of width $\Delta h_{i+1}$ used to generate the faceted distributor must be recalculated with the new values for $y_{i1}$ in the above sequence of coordinate calculations, for the target zones on plane 30 to remain in the same locations. Without such recalculation, the spacing of the target zones of radial widths $\Delta R_{i12}$ will increase somewhat as the vertical spacing $\Delta y$ of the distributor faceted reflectors increases.

Figure 9:
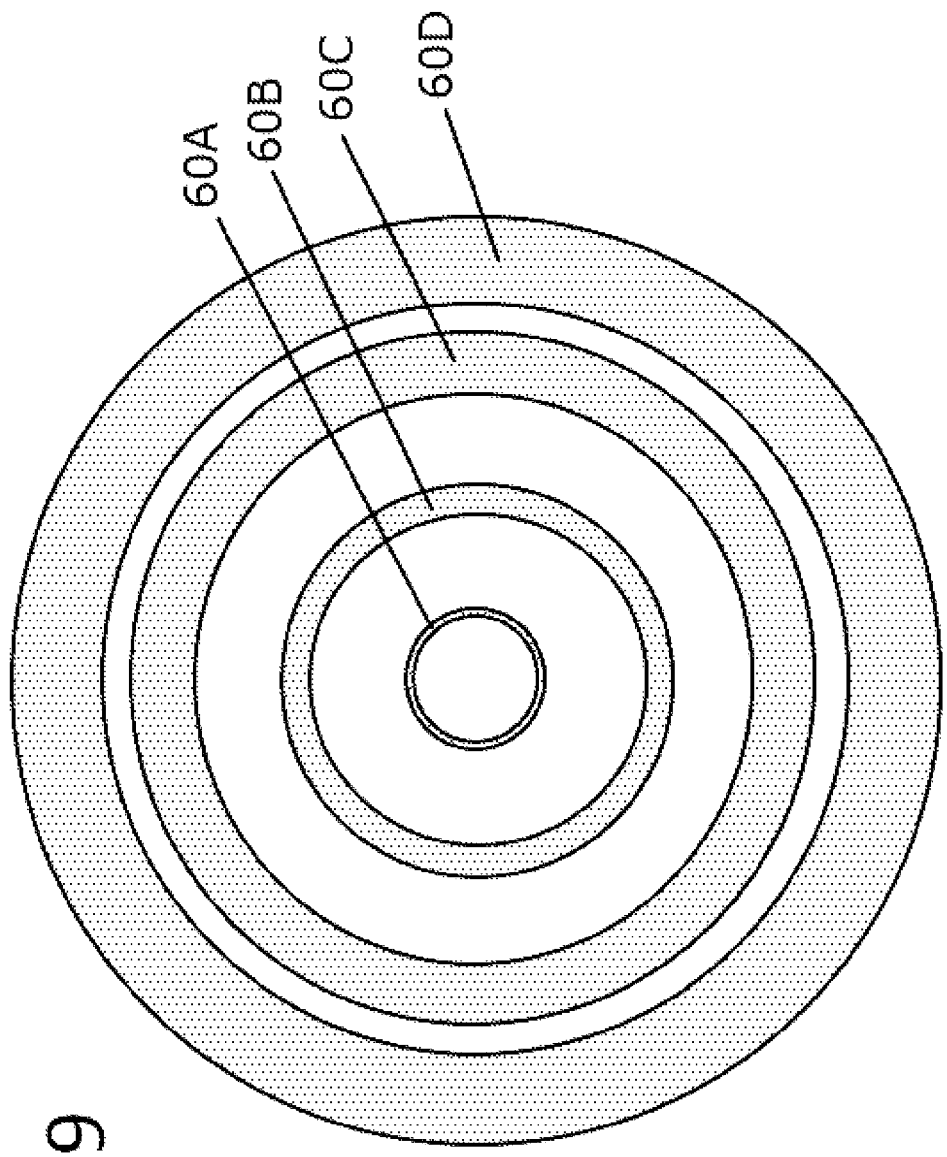
FIG. 9 is a schematic bottom plan view of a plane with optical rays reflected onto the plane by one embodiment of an optical distributor.

FIG. 9 shows a bottom plan view of the bottom surface of the first plane 30 including the ray intersection locations as small dots. FIG. 9 shows that, in the case of perfectly collimated incident rays 8, the reflected rays from segments or facets 10A, 10B, 10C, and 10D of a four-faceted optical distributor 10 (i.e., N=4) propagate to zones 60A, 60B, 60C, and 60D, respectively, on the first plane 30, as shown by the ray trace generated by optical ray tracing software. This ray intersection (or "spot") diagram of the bottom surface of the first plane 30 illustrates that the number of rays may increase with the radius of each annular zone when the optical distributor is designed according to the method described above. When the rays incident on the first plane 30 are reflected diffusely onto the second plane 40, the distribution of flux across the second plane 40 may be greatest on the second pane 40 at a radius slightly greater than the center radius of the target zone given by $R_{ceilMin} + (R_{ceilMax} - R_{ceilMin})/2$.

If the distance between planes 30 and 40 is several times greater than the distance from plane 30 to the bottom of the distributor, a portion of the flux diffusely reflected from the first zone (60A in FIG. 9), and to a decreasing extent from the remaining plane 30 zones, will tend to fill in some of the shadow produced by the distributor. By increasing the number of faceted sections or segments of the optical distributor 10, by sizing and angling them using the procedure described herein, by making the inner radius $R_{IN}$ of the first distributor segmented reflector nonzero, and by placing a lens in the resulting opening of radius $R_N$ at the top of the optical distributor and/or placing a translucent diffusing sheet at the bottom of the optical distributor to receive and diffusely transmit the flux from the hole at the top of the distributor, the luminance distribution across the second plane 40 may be made more uniform. In other embodiments, one or more of these techniques may be used alone, and/or one or more of these techniques may be modified and/or used in combination.

FIGS. 10A and 10B illustrate an embodiment of an optical distributor 10 with glare shields 70, which may in some embodiments help prevent scattered light rays from entering into the eyes of occupants of a room where an optical distributor 10 is installed. FIG. 10A shows a side plan view of several shallow conical glare shields 70 coupled to the optical distributor 10. The shallow conical glare shields 70 may be fabricated as truncated, opaque cones surrounding the faceted optical distributor 10 and inclined upward and outward at, in some embodiments, the same (or nearly the same) angles as rays reflected from the optical distributor 10. The glare shields 70 may help prevent an optical distributor from sending stray light scattered from the surface of the distributor 10 out of the reflected beam and away from the first plane 30.

This effect is greatest when second plane 40 is spaced below the first plane 30 only one to a few times greater than the distance between the bottom of distributor 10 and plane 30. In such cases, the glare stack may prove to be helpful in reducing or eliminating glare from distributor 10 diffuse reflections. The effect is least when the second plane 40 is many times lower from plane 30 than is the bottom of the distributor, in which case the glare shield stack may not be needed. The stack of glare shields 70 in FIG. 10A may be vertically aligned and may allow the specularly reflected light rays from the optical distributor 10 to pass relatively unimpeded between the conical surfaces, hence blocking little or no flux specularly reflected from distributor 10 to first plane 30. The stack of glare shields 70 may also block light rays scattered out of the specularly reflected flux beam by, for example, imperfections in the surface finish of the optical distributor 10, or by accumulated dust and dirt on the optical distributor 10. The stack of glare shields 70 may thus keep "stray" scattered light rays from propagating downward and radially outward below the bottom of the optical distributor where it might otherwise produce stray light rays or a glare condition.

The bottom surfaces of each glare shield may in some embodiments substantially absorb the light impinging on them and/or may diffusely reflect the light scattered from them. The top surfaces may be specular or diffusely reflective, in order to, for example, send light incident upon them outward and upward to the first plane 30. If imperfections in the fabrication of such a glare shield stack cause the top surfaces of these shallow cones to receive some of the bright, specularly reflected light from the optical distributor, such surfaces may be given a dark and absorbing finish, thereby helping block such light from reflecting up to the glare shield above it and thence back down into the eyes of occupants of the illuminated space below. The top such glare shield may in some embodiments, however, be given a specular or diffusely reflecting finish in order to send at least some of the light incident upon it up onto the first plane 30. Each glare shield in the stack may have an inner radius $r_{in}$ (which may be equal to the outer radius ROUT of the base of the optical distributor as in FIG. 6) and an outer radius $r_{out}$.

FIG. 10B shows an isometric view of the glare shields 70 with the inner radii of the glare shields equal to or greater than the radius of the base 20 of the optical distributor 10 and the outer radii chosen to block glare due to light scattered from the optical distributor 10.

In some applications, the first plane 30 (e.g., the ceiling) may be far enough above the second plane 40 (e.g., the task plane) that the angle between the specularly reflected light rays 8B to the first plane 30 and the rays scattered from the optical distributor 10 down and radially outward to the eyes of persons standing or seated in the space below may be fairly large, such as, for example, greater than 10 to 20 degrees. At such angles of scattering, the strength of the scattered light may be low, may not produce a serious stray light or glare condition, and, consequently, the glare shield stack may not be needed, although in other embodiments, one or more glare shields may still be used.

FIGS. 11A and 11B illustrate various angles and dimensions which may be used in computing the angles and dimensions of the glare shields 70. As shown in these figures, the vertical rise of a glare shield cone $\Delta y_b$ may be chosen to match the angle $\theta_i$ of the nearest rays reflected from the optical distributor cone 10 upward and outward toward the first plane 30. Letting $\Delta r = r_{out} - r_{in}$, the value of $\Delta y_b$ is given by $$\Delta y_b = \Delta r \tan \theta_i \qquad (88)$$

The vertical distance $\Delta y_a$ from the top of one glare shield cone to the bottom of the next one above it may be set by the glare blockage angle α shown in FIGS. 11A and 11B. Let R be the radial distance in a horizontal plane from the center of the glare shield stack and optical axis 5 to an observer whose eye 71 is no less than distance (H1+H2) below the first plane 30. Let a be the glare edge angle, e.g., the angle of a line from the horizontal below which the optical distributor 10 is not visible between the glare shields 70. If the distance (H1+H2) of a human's eyes 71 below the first plane 30 and the radial distance R from the center are the maximum distances of concern for glare to be visible by the observer, and further if H1 is the distance from the first plane 30 down to the top of the glare shield 70 of interest, then the value of angle α above which scattered light from the optical distributor 10 between the two glare shields is just visible may be given by $$\alpha = \arctan(H2/R) \qquad (89)$$

From the geometry of the space being illuminated, a designer may be able to determine a maximum value of R and may also be able to determine the distance H1 from the first plane 30 down to the outer edge of the glare shield of the calculation (repeated for each of the glare shields). The designer may also choose a representative maximum distance of an observer's eyes 71 above the second plane 40 and down from the first plane 30 of the space for avoiding a glare condition, thereby determining the value of H2, thereby also setting, through the use of (89), a value for the angle α. To avoid these multiple repeated calculations for each of the glare shields, one possible alternative may include setting the bottom of the optical distributor to be well above the maximum height of human eyes 71 in the space, so one can set H2 and hence also angle α equal to zero. For this case one may set the bottom of a glare shield to be at the same vertical distance below the first plane 30 that is the top of the next glare shield 70 below it. The radial width Δr of the glare shield 70 stack in such case may be determined by the vertical height h of the optical distributor 10 and the number of glare shields desired. The overall radius from the optical axis 5 of the glare shield stack will equal $r_{out} = r_{in} + \Delta r$, as illustrated in FIG. 11A and the stack diameter will be given by $2r_{out}$.

Figure 12:
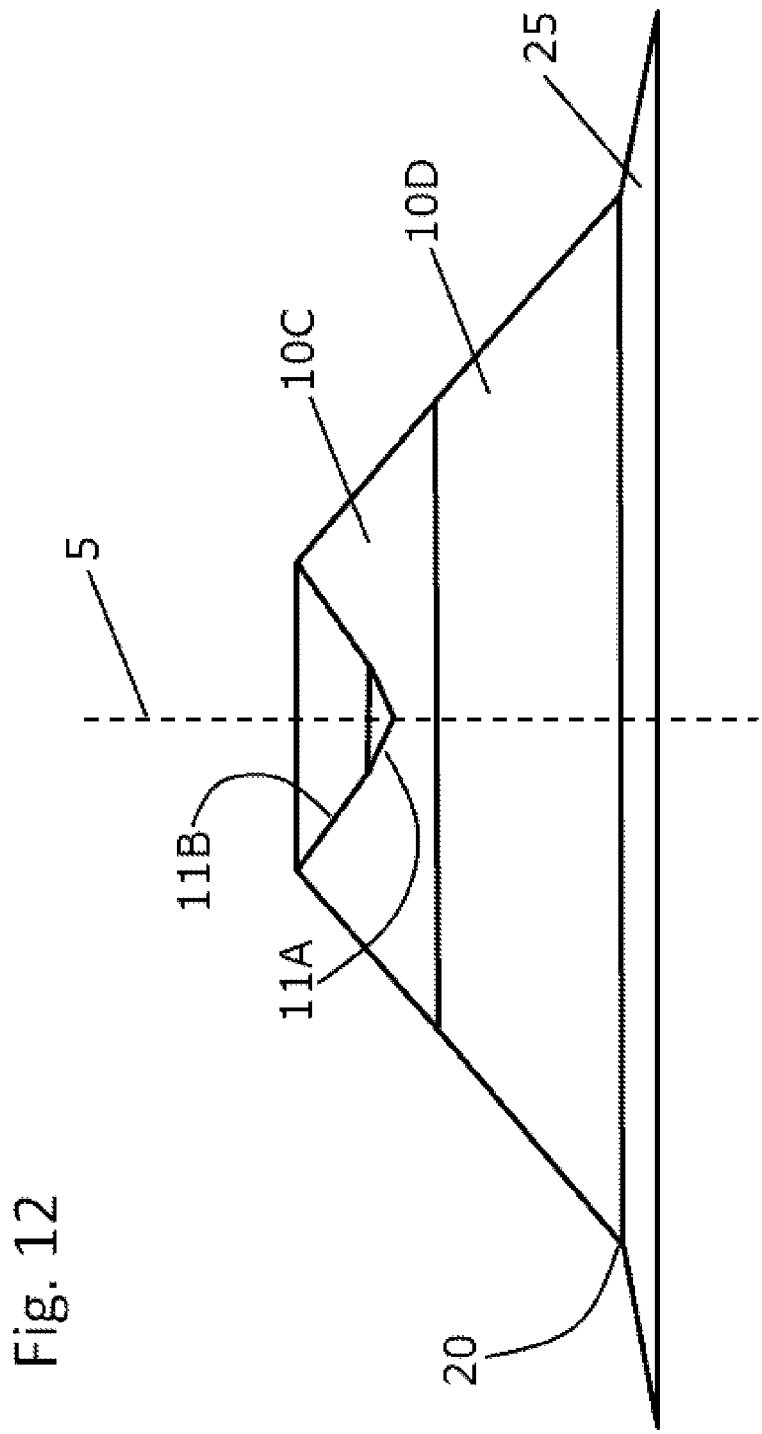
FIG. 12 is a cross-section view of one embodiment of an optical distributor.

FIG. 12 illustrates a low-profile embodiment of an optical distributor, wherein a top portion 11A and 11B of the faceted conical distributor is replaced by a concave faceted conical interior section with each new facet 11A and 11B having separately calculated sizes and slopes in some embodiments. This "crater-like" interior reflecting surface may be called the "cross-fire" section because rays reflected from it may cross through a focal line coincident with the optical axis and emerge from the "crater" on the opposite side, continuing to propagate up and out onto the first plane 30 without being reflected further by the optical distributor.

The low-profile version of such an optical distributor may have a reduced overall vertical height, allowing it to be placed closer to the first plane 30. In this embodiment, a top portion of the optical distributor may be replaced with a faceted conical reflector that is inverted (i.e., is concave), and may descend inside the center of the unaltered remainder of the design, like a crater, which concave reflecting portion may reflect incident light in the downwelling incident beam out of the "crater" without further reflection from any part of the conical reflector. The optical distributor shown in FIG. 12 may have a reduced vertical profile and may allow the visible surface of the optical distributor to be reduced, which may further reduce glare associated with diffusely reflected beams from dust or other effects and/or reduce the number and size of glare prevention shields.

Another, similar alternate embodiment truncates a portion of the concave "crater" surface descending inside the main outer surface and replaces the removed section with a modified replica of the top of the removed portion of the original faceted optical distributor (i.e. a frustum-shaped insert), this design resulting in the optical distributor shown in FIG. 19 and described below.

Returning to FIG. 12, the top of an optical distributor designed by the above method may be truncated and the removed section replaced by a concave interior reflective zone, somewhat like the crater of a volcano. This may be done in order to create a lower-profile optical distributor, enabling the placement of this optical element closer to the first plane 30 (as might be used in low-bay or low ceiling height solar illumination and other applications). However, in this embodiment of an optical distributor, it still may be useful in some instances to reflect as many rays as possible from the added "crater" or "crossfire" element up and out of the "crater" without allowing them to intersect the opposite edge of the added concave cone and still send such rays as far radially outward as possible, so that they do not, for example, propagate up through the opening 32 in the first plane 30.

Figure 13:
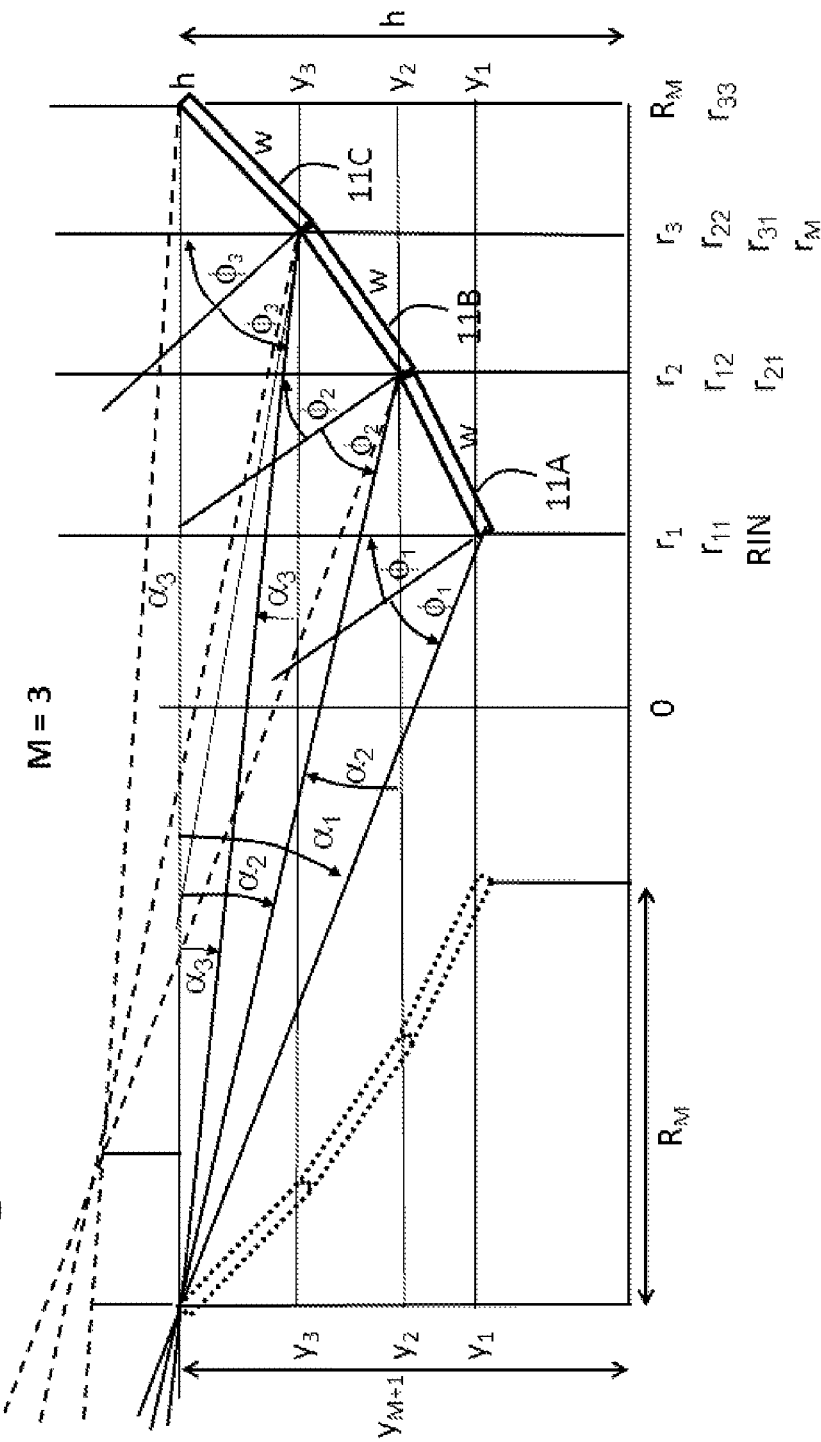
FIG. 13 is a schematic diagram of a cross-sectional portion of an optical distributor showing geometrical relationships of components.
Figure 14:
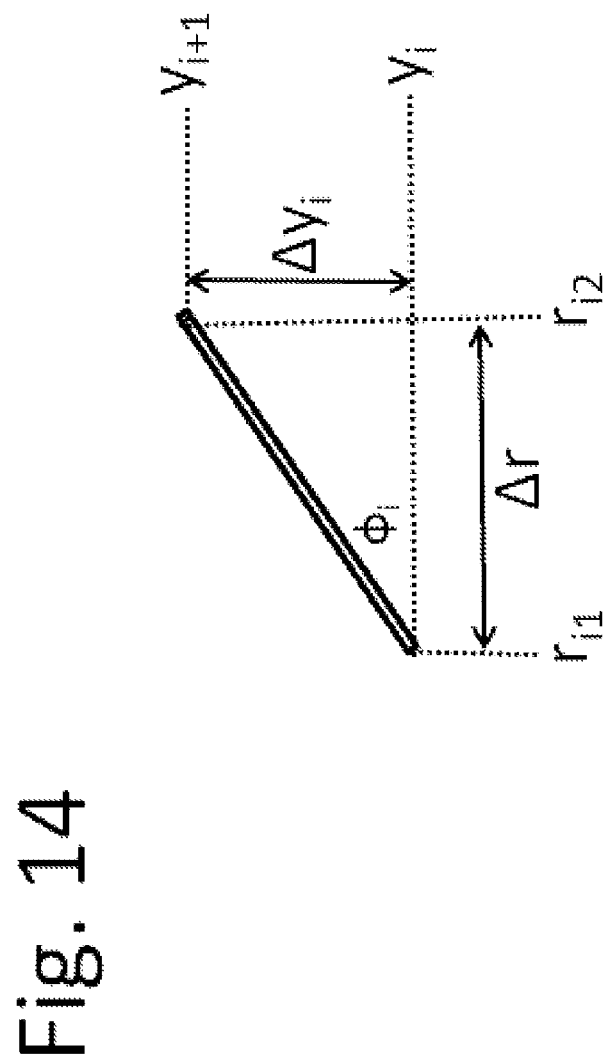
FIG. 14 is a schematic diagram of a portion of an optical distributor showing geometrical relationships of dimensions and an angle.
Figure 15:
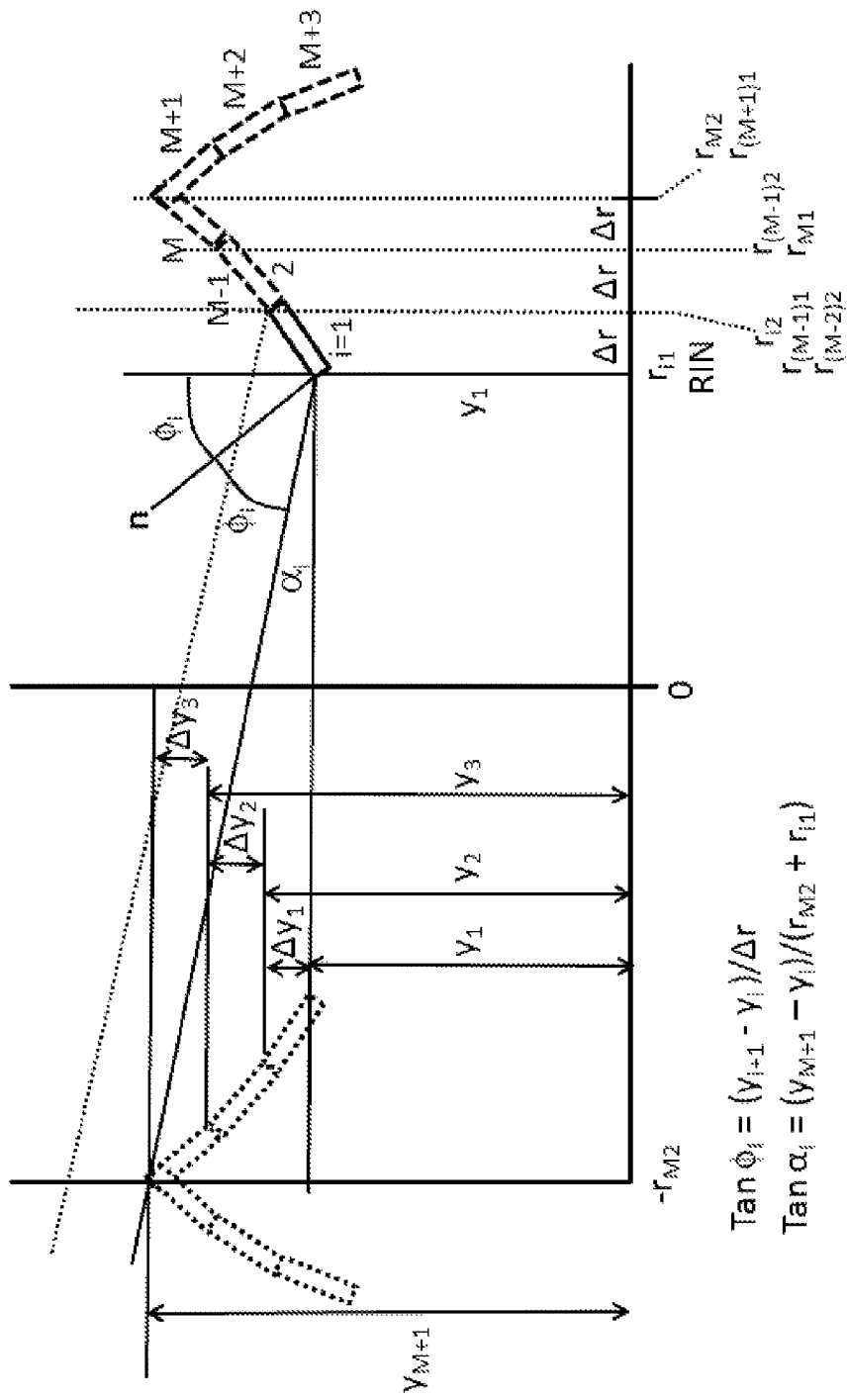
FIG. 15 is a schematic diagram of a cross-sectional portion of an optical distributor showing geometrical relationships of components.
Figure 16:
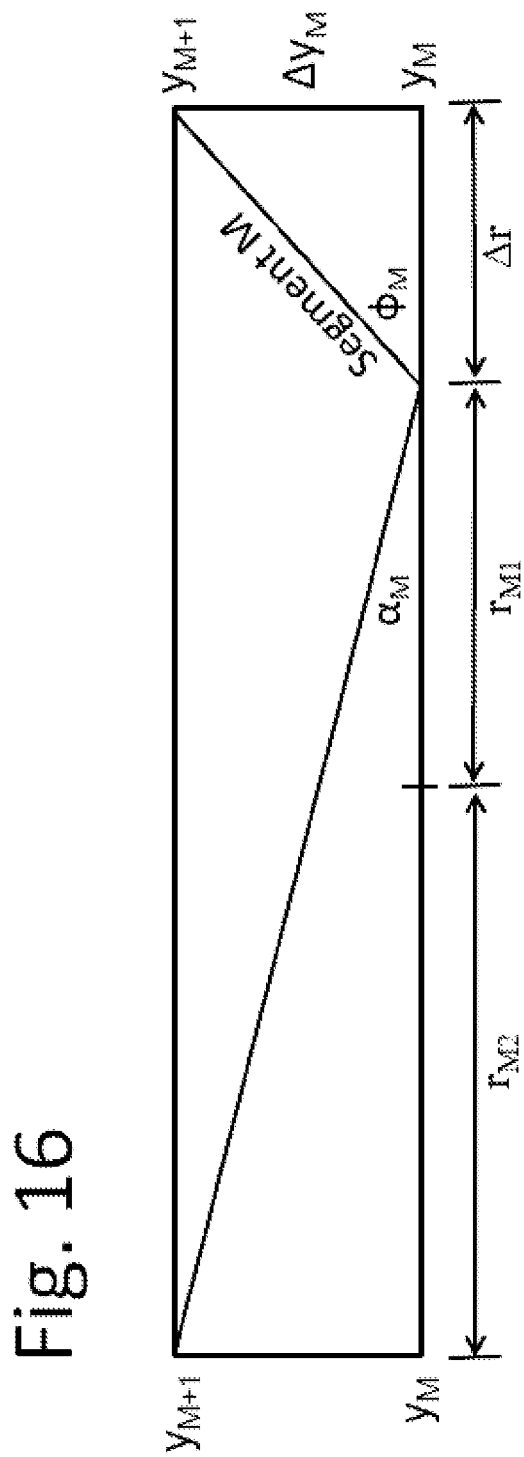
FIG. 16 is a schematic diagram of a portion of an optical distributor showing geometrical relationships of components.

FIGS. 13 through 16 show schematic diagrams of portions of a radial optical distributor with various geometrical lines, dimensions, and angles illustrated for use in explaining various mathematical steps that may be used in some embodiments to compute potential dimensions of some embodiments of an optical distributor. FIG. 13 is a schematic diagram of a cross-section of the concave portion of the truncated, low profile version of an optical distributor, detailing three interior segments of distributor 10 and the angles of inclination and inner and outer radii of each segment or facet. FIG. 14 is a schematic diagram showing the $i^{th}$ line segment of the crossfire section of the low-profile distributor, and the end point coordinates. FIG. 15 is also a schematic diagram showing an alternate geometrical diagram in support of the crossfire design method, and shows relevant angles $\alpha_i$ and $\phi_i$ and their relationships to the vertical y and horizontal r dimensions of the concave crossfire or "crater" section of the optical distributor. FIG. 16 is also a schematic diagram, and may be used to isolate the $M^{th}$ line segment, the first one of the crater, and use the geometry of it to determine the value of $y_{M+1}$ based on $\Delta r$.

With reference now to FIGS. 12 through 16, a four segment optical distributor may be designed. The method of designing this distributor may begin by generating an optical distributor as explained above, with N segments. A designer may then determine how many of the top segments to remove and replace with the concave "crossfire" or crater section. Let the segments to be removed number 1 to M, counting from the top downward, with M being less than N. The replacement crater section may begin at the top edge of the $(M+1)^{st}$ segment (which remains in place) and descend inward and downward into the interior of the truncated distributor, counting backward from M to 1. In order for the innermost crater line segment, number 1, to terminate at the design radius of $R_{IN}$, the radial widths of line segments 1 through M may all be the same. The crater section line segments may therefore each have radial width $\Delta r$ given by Eq. 90.

$$\Delta r = (r_{M2} - R_{IN})/M = (r_{(M+1)1} - R_{IN})/M \tag{90}$$

With reference to FIG. 13, the figure illustrates that the lowest (solid line) rays from the bottom of each conical facet may converge to the top of the opposite "crater edge" and then diverge upward and radially outward from there; (dashed line) rays from the top of each conical facet converge to a position in space above the "crater" and thence diverge upward and radially outward from it, which may be onto the first plane 30 and not back up and through the opening 32.

In some embodiments, the start and end points of the crossfire crater segments are designed so that all rays reflected from each of them clear the top edge of the opposite crater rim, as illustrated in FIGS. 13 and 15. For these crossfire calculations, the y-coordinates are measured differently than for the main distributor derivation, from the base 20 of the untruncated distributor, designed using the procedure described above, upward to the highest point of the new truncated distributor, at $y=y_{M+1}$, as illustrated in FIG. 13. Using this new coordinate convention, each line segment, with end point coordinates $(r_{i1}, Y_i)$ and $(r_{i2}, y_{i+i})$, may obey the right triangle relationships shown in the sketch in FIGS. 13, 14, and 15:

$$\text{Tan } \phi_i = (y_{i+1} - y_i)/(r_{i2} - r_{i1}) = \Delta y_i / \Delta r \tag{91}$$

$$\text{Tan } \alpha_i = (y_{M+1} - y_i)/(r_{M2} - r_{i1}) \tag{92}$$

where angles $\alpha_i$ and $\phi_i$ are as illustrated in the drawing of FIGS. 13 and 15. Equation (92) is the crossfire clearance condition, rewritten as:

$$\tan\alpha_i = \frac{y_{M+1} - y_i}{r_{M2} + r_{i1}}. \tag{92}$$

From FIG. 15 we know that $$\alpha_i = 90° - 2\phi_i \tag{93}$$

and from FIG. 14 we see that $$\Delta y_i = y_{i+1} - y_i. \tag{94}$$

Next we use (92) and (93) to write $\phi_i$ as a function of $y_{M+1}$ (equal to $y_{M2}$), $r_{M2}$, $y_i$, and $r_{i1}$:

$$\phi_i = \{90° - \tan^{-1}[(y_{M+1} - y_i)/(r_{M2} + r_{i1})]\}/2. \tag{95}$$

From FIG. 16, the tilt angle of the $M^{th}$ mirror facet up from the horizontal is $\phi_M$ and $\Delta r$ is the same for all crater line segments and is given by (90). Since $\phi_i$ is given by (95), we can determine $y_i$ from (91)

$$y_i = y_{i+1} - \Delta r \tan \phi_i, \tag{96}$$

but to get $\phi_i$ from (95) we may need to know $y_{i+1}$ and $y_i$. The value of $y_{M+1}$ may already be known, since it may be part of the original untruncated distributor.

FIG. 16 isolates the Mth line segment and the ray from its bottom end to the top rim of the crater opposite this line segment. Using (92)

$$\tan\alpha_M = \frac{y_{M+1} - y_M}{r_{M2} + r_{M1}} = \frac{\Delta y_M}{r_{M2} + r_{M1}} \tag{92}$$

and noting that $$\tan\phi_M = \frac{\Delta y_m}{\Delta r}, \tag{97}$$

one can solve (97) for $\Delta y_M$ and substitute the solution into (92) to arrive at the following equation for determining $\alpha_M$ from known parameters:

$$\tan\alpha_M = \frac{\Delta r \tan\varphi_M}{(r_{M2} + r_{M1})}. \tag{98}$$

Replacing $\alpha_M$ in (98) with its equal, $(90°-2\phi_M)$ from (93), two equations in two unknowns ($y_M$ and $\phi_M$) result:

$$\tan(90°-2\phi_M)=\Delta r \tan \phi_M/(r_{M2}+r_{M1}) \quad (99)$$

$$\tan \phi_M=\Delta y_M/\Delta r=(y_{M+1}-y_M)/(r_{M2}-r_{M1}). \quad (100)$$

Three useful trigonometric identities are $$\tan(90-u)=\cot u \quad (101)$$

$$\cot 2u=(1-\tan^2 u)/2 \tan u \quad (102)$$

$$\tan 2u=2\tan u/(1-\tan^2 u), \quad (103)$$

so that (99) can be written and transformed as follows:

$$\cot 2\phi_M=\Delta r \tan \phi_M/(r_{M2}+r_{M1})$$

$$(1-\tan^2\phi_M)/(2\tan\phi_M)=\Delta r \tan \phi_M/(r_{M2}+r_{M1})$$

$$(r_{M2}+r_{M1})(1-\tan^2\phi_M)=2\Delta r \tan^2 \phi_M$$

$$(r_{M2}+r_{M1})-(r_{M2}+r_{M1})\tan^2\phi_M=2\Delta r \tan^2 \phi_M$$

$$(2\Delta r+r_{M2}+r_{M1})\tan^2\phi_M=r_{M2}+r_{M1}, \quad (104)$$

Which is solved for $$\tan^2\phi_M = \frac{r_{M2}+r_{M1}}{2\Delta r+r_{M2}+r_{M1}} \quad (105)$$

$$\tan\phi_M = \sqrt{\frac{r_{M2}+r_{M1}}{2\Delta r+r_{M2}+r_{M1}}}. \quad (106)$$

Solving (100) for $\Delta y_M$ yields $$\Delta y_M=\Delta r \tan \phi_M \quad (107)$$

so that $$y_M=y_{M+1}-\Delta y_M=y_{M+1}-\Delta r \tan \phi_M. \quad (108)$$

Since $\phi_M$ and $y_M$ may be known, the foregoing illustrates one possible procedure for calculating the coordinates of the inner (and lower) end of the first crossfire crater line segment, the $M^{th}$ one, and then using the same approach to determine the $i=(M-1)^{th}$ one and the remaining ones down to $i=1$. Other procedures may also be used in addition to or in place of the foregoing.

The compacted iteration sequence described above may therefore be as follows.

Start with the known value of $\Delta r$:

$$\Delta r=(r_{M2}-R_{IN})/M=(r_{(M+1)1}-R_{IN})/M \quad (109)$$

and $y_{M+1}$ being known from the $(M+1)^{st}$ regular cone bottom y-value, corrected for the new convention on the y coordinates for the crossfire section. Let $$B=(r_{M2}+r_{M1}), \quad (110)$$

calculate $$\tan \phi_M=[B/(2\Delta r+B)]^{1/2} \text{ and} \quad (111)$$

$$\phi m=\arctan [B/(2\Delta r+B)]^{1/2} \quad (112)$$

and then calculate $$\Delta y_M=\Delta r \tan \phi_M \text{ and} \quad (113)$$

$$y_M=y_{M+1}-\Delta y_M=y_{M+1}-\Delta r \tan \phi_M. \quad (114)$$

Then begin a looped iterative calculation sequence from $i=M-1$ counting down to $i=1$, and at each value of i, do the following calculation sequence. (Note that $\Delta r$, $y_{M+1}$, $\phi_M$ and $\Delta y_M$ are known from above.) Let $$B=(r_{M2}+r_{(i)1}), \quad (115)$$

then calculate $$\tan \phi_i=[B/(2\Delta r+B)]^{1/2} \quad (116)$$

$$\Delta y_i=y_{M+1}-B \tan \phi_i \quad (117)$$

$$y_i=y_{M+1}-\Delta y_i \quad (118)$$

until $i-1=1$. Once the end points of the main cone and the replacement segments making up the crossfire crater have been calculated and used to draw the line segments, the set of line segments may be spun (extruded or swept) through 360 degrees around the vertical optical axis 5 to create the three-dimensional distributor having a low-profile crossfire crater section.

Figure 17:
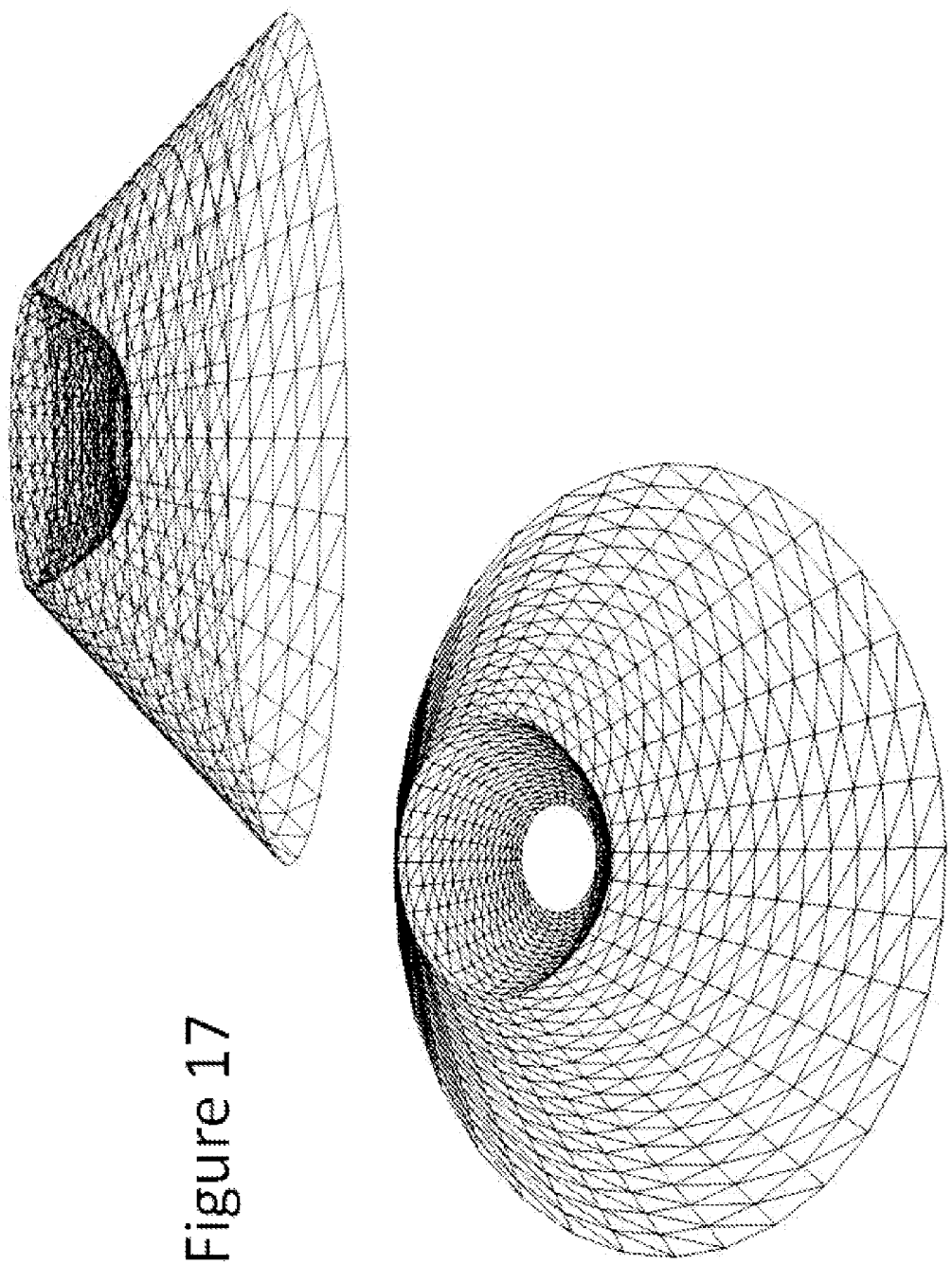
FIG. 17 depicts two wire frame isometric views of one embodiment of an optical distributor.

FIG. 17 shows isometric views of a wire-frame design of a low-profile optical distributor designed according to the above description. A moderately large value for N was used and the crossfire distributor shape was calculated for a representative set of initial design values.

The optical distributor embodiment illustrated in FIG. 17 has two sections, and as described below, another embodiment may have three sections (see FIG. 19). These embodiments with multiple surfaces may reduce the height profile of the optical distributor while still maintaining approximately the same reflection as in the embodiment shown in FIG. 1. This may be done in order to place the optical distributor closer to the first plane 30 so that the optical distributor does not extend as far down into the space below that plane. This low-profile design may be useful in a variety of locations, including use in, for example, "low bay" building spaces having ceiling heights lower than 12 feet above the floor. Another purpose may be to reduce the area of the optical distributor visible from the side (thereby reducing the amount of glare-producing flux that could be scattered out and thereby also reducing the number and sizes of any glare shields that might be needed).

By increasing the number N of line segments used to generate the reflective distributor shown in FIG. 17 and by fitting a smooth curve to the end points of those line segments, a smooth curve may be produced that may have the same inner and outer radial positions $R_{IN}$ and $R_{OUT}$ and the same height and vertical position as the segmented distributor. The result may be similar, especially if N is equal to 20 or more, and may produce a smoother distribution of flux across the target area of the first plane 30. Fitting a typical design to a quadratic equation and to a trigonometric equation may produce acceptable results (as illustrated in FIG. 17 for the crossfire crater embodiment).

Figure 18:
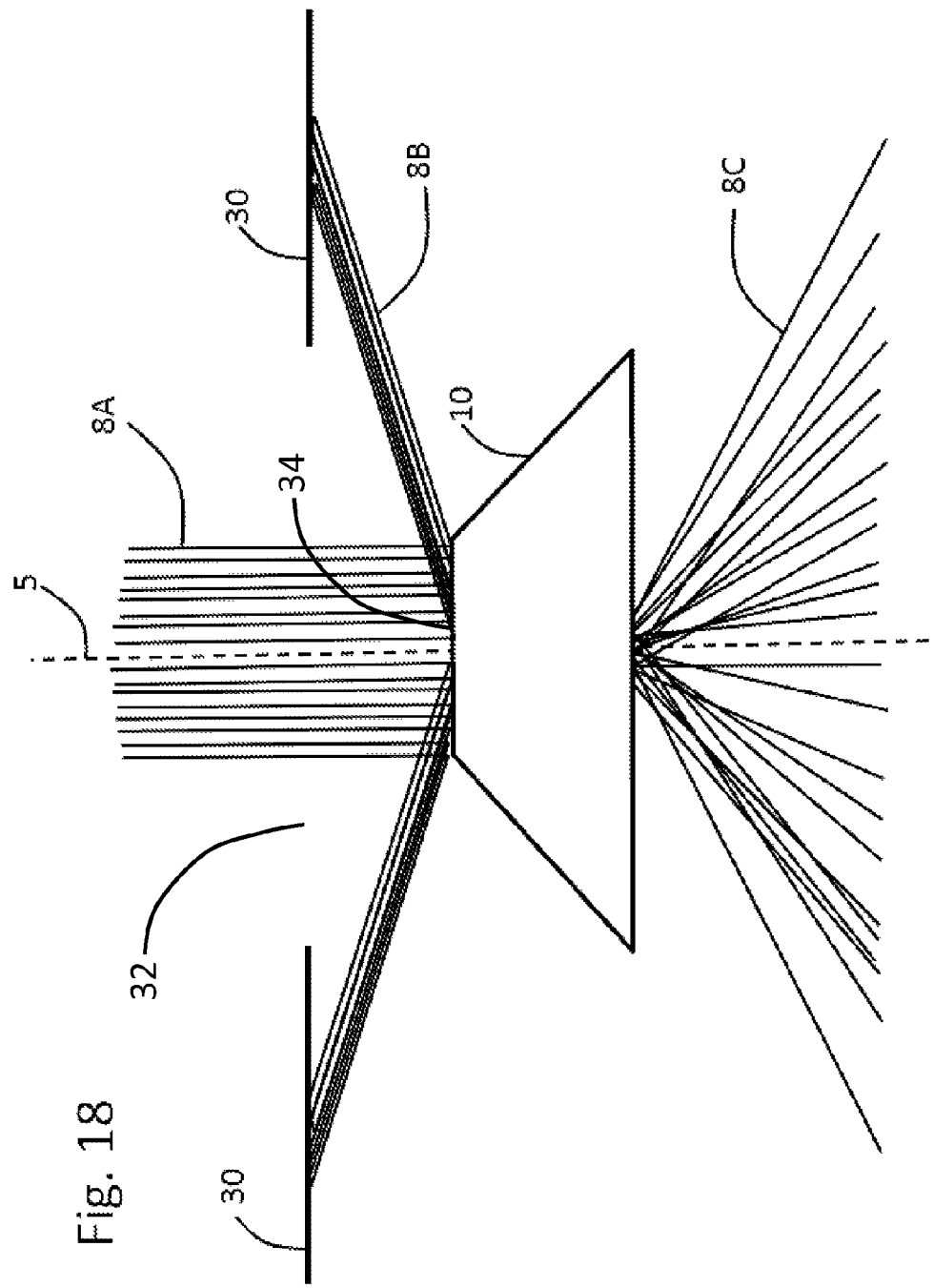
FIG. 18 is a schematic side plan view of one embodiment of an optical distributor showing the directions of propagation of some optical rays incident on that distributor.

FIG. 18 illustrates a side plan view of the results of a computerized optical ray trace of the crossfire section of the low-profile distributor design of FIG. 17. In FIG. 18, the incident parallel light rays 8A are confined to a reduced width vertical plane (for the purposes of this illustration only) may enter the "crater" crossfire section and may be reflected up and out over the opposite lip of the crater section and thence onto the first plane 30 as light rays 8B. Incident rays passing through an opening 34 in the bottom of the crater may in some embodiments reach an optical diffusing sheet 26 (as shown, for example, in FIGS. 18 and 30) and may be scattered by it laterally into the space below as light rays 8C as illustrated in FIG. 18.

Figure 19:
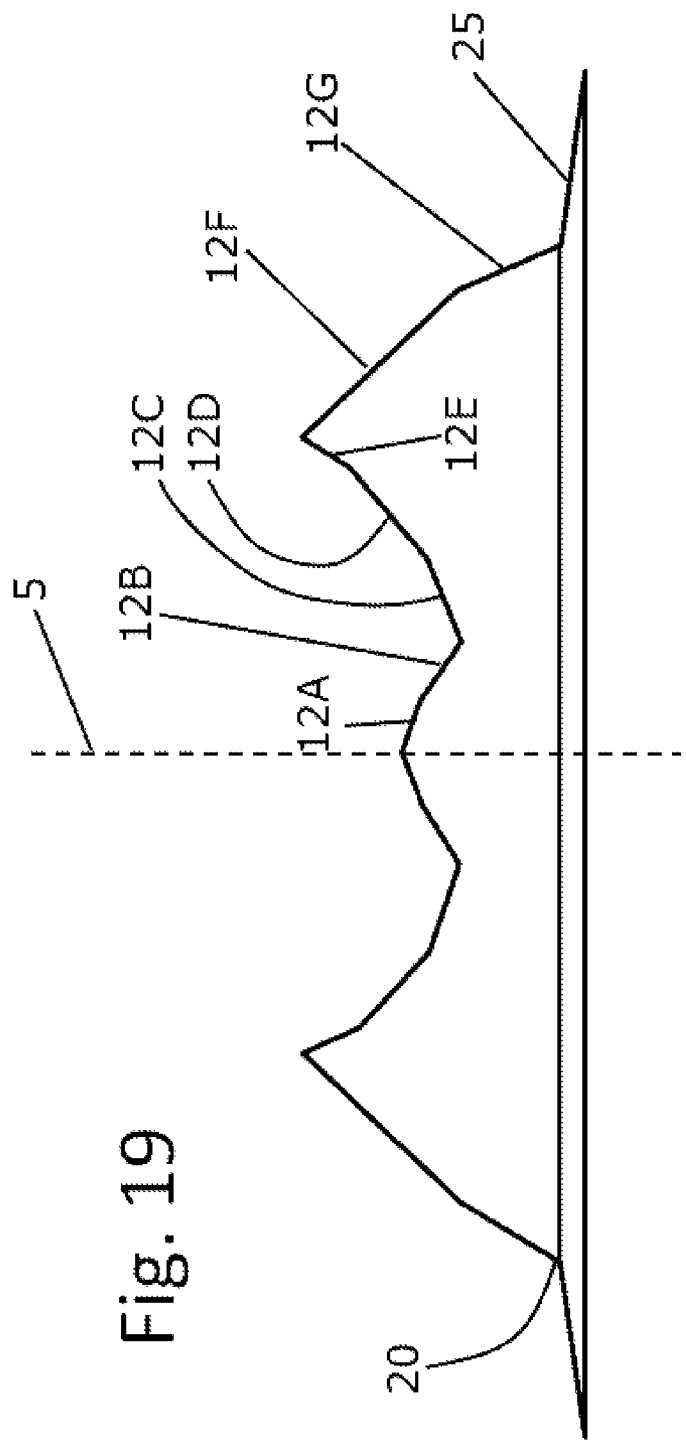
FIG. 19 is a schematic cross-section view of one embodiment of an optical distributor.

FIG. 19 is a cross-section view of another alternate, exemplary, embodiment of an optical distributor whereby the concave interior faceted conical "crater" sections 12C, 12D, and 12E (three in number for this illustration) of an optical distributor contain inside them a two-segment (for this illustration) convex interior reflector portion 12A and 12B. In order to create a still lower-profile optical distributor, enabling the placement of it closer to first plane 30 in low-bay solar illumination and other applications, the crossfire or "crater" portion of the embodiment shown in FIG. 17 may itself be truncated and replaced by a new set of segments similar to the first few line segments of the original untruncated distributor design as illustrated by the cross-section view in FIG. 19. The convex mini cone in the center has new line segments 12A and 12B, which are designed to be shallower than the original untruncated distributor top, so as to help make sure the reflected rays propagate up and out of the central concave crater section. The revised cross-fire section has segments or facets 12C, 12D, and 12E in the design shown schematically in FIG. 119. The main portion of the optical distributor has segments 12F and 12G. When these are swept through 360 degrees about the vertical optical axis 5, the result may be a three-dimensional faceted optical distributor. A cross-section of this object in a vertical plane containing the optical axis 5 is illustrated in FIG. 19.

Figure 20:
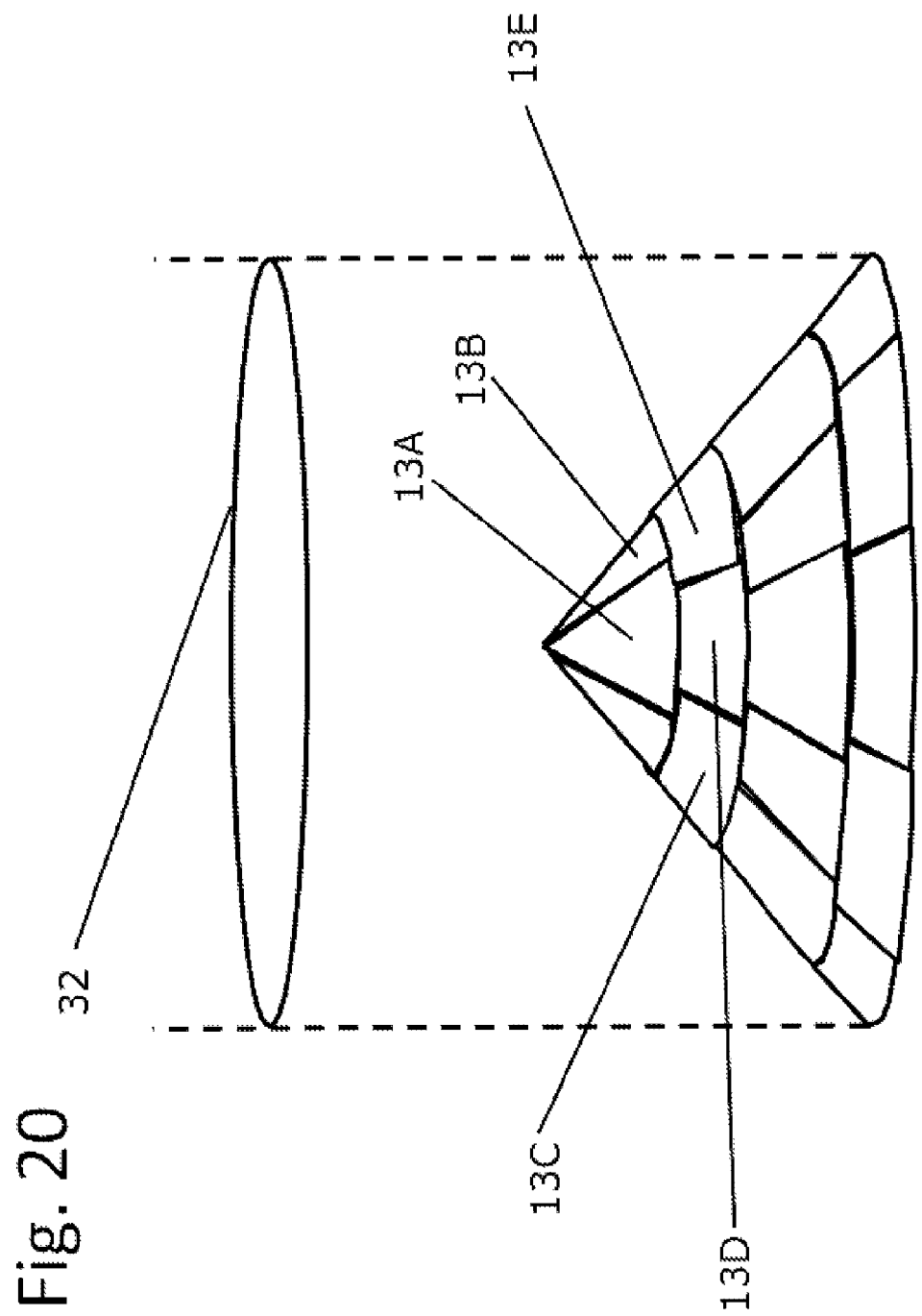
FIG. 20 is a schematic isometric view of one embodiment of an optical distributor.

FIG. 20 illustrates another embodiment of an optical distributor. The optical distributor shown in FIG. 20 may include several planar or slightly curved segments or facets 13A, 13B, 13C, 13D, 13E, etc., each sending its reflected light radially outward and/or upward towards several different target areas to be illuminated. The optical distributor shown in FIG. 20 may also redirect and slightly spread multiple portions of the light from a cylindrical collimated beam onto one or more selected areas of either the first or the second planes 30, 40 described above, and/or onto vertical planes or other areas in order to, for example, illuminate or irradiate all or selected portions of these areas with relatively high irradiance or illuminance.

The optical distributor shown in FIG. 20 may be a more generally faceted, approximately conical, configuration that may send mini-beams of directed illumination in different directions across the space below the first plane 30. The optical distributor may include several individual triangular and/or approximately trapezoidal or other polygonal shaped facets arranged around the nominally conical envelope. Each facet may reflect a mini-beam of light upward and outward into the space. Each facet may be planar, cylindrical, spherical, convex, concave, etc., in surface shape, or they may be more generally curved to suit a number of planned and specialized targeting directions.

FIG. 21 illustrates another embodiment of an optical distributor 10, with the optical distributor 10 including, directly beneath a hole or aperture 34 in the center of its top, a single specularly or diffusely reflective reflector 50 having an elliptical perimeter, the surface of which is planar, convex, or concave shaped, and which reflects the collimated incident beam of light rays 8A that passes through the opening 34 in the center of the optical distributor 10 radially outward and upward, downward, or laterally in either a slightly spreading or slightly converging manner toward a targeted task area to be illuminated. Vertically incident light rays 8A reflect from reflector 50 and may then propagate as reflected light rays 8B.

In some embodiments two independently targetable reflectors may be made by cutting reflector 50 along a horizontal line through its center, rotating the upper half about the cut line and thereby sending the reflected light rays in two separate directions, approximately opposite each other. This distributor design may be useful, for example, in illuminating the ceiling of a narrow aisle or corridor from a distributor at one end of that corridor or from the center of the corridor using the rooftop configuration. This embodiment, known herein as a linear optical distributor design, to distinguish it from the previous radial designs, may also be used for large area illumination, wherein multiple incident beams and distributors are placed side-by-side to cover a large area, essentially as if that area were composed of multiple long aisles to be illuminated.

The optical distributor illustrated in FIG. 21, multiples of this design, or multiple "split" embodiments producing two or more reflected beams may also be used to spread one or more portions of the incident collimated beam 8A in a controlled manner to send the reflected beam or beams toward one or several specified directions, such as for task lighting, or to illuminate one or more portions of one or more walls of a room for various purposes, rather than reflect it up onto the first plane 30 (e.g., a ceiling) or other horizontal diffusely reflecting surface. The version of this embodiment depicted in FIG. 21, illustrates a collimated cylindrical downwelling beam of light rays 8A passing through a circular or polygonal opening 34 in the optical distributor 10 and onto a specularly reflecting elliptical perimeter reflector 50 which may be planar, cylindrical, spherical, or with a more complex surface shape. FIG. 21 depicts a slightly convex design, so that the reflected rays 8B diverge slightly from being parallel as they propagate away from reflector 50 and toward a target area, which may be a task area in need of stronger illumination for fine or precision work, or may be an area needing some solar heating for thermal processing purposes.

Still another embodiment, as described below, may include multiple reflectors each having perimeter shapes that are elliptical, sections of an ellipse, circular, or polygonal, thereby compacting the reflectors and offering the possibility of aiming each one in a different or similar direction to send the light rays toward one or more targets in the space. FIG. 20 is one example of this embodiment of an optical distributor.

Figure 22:
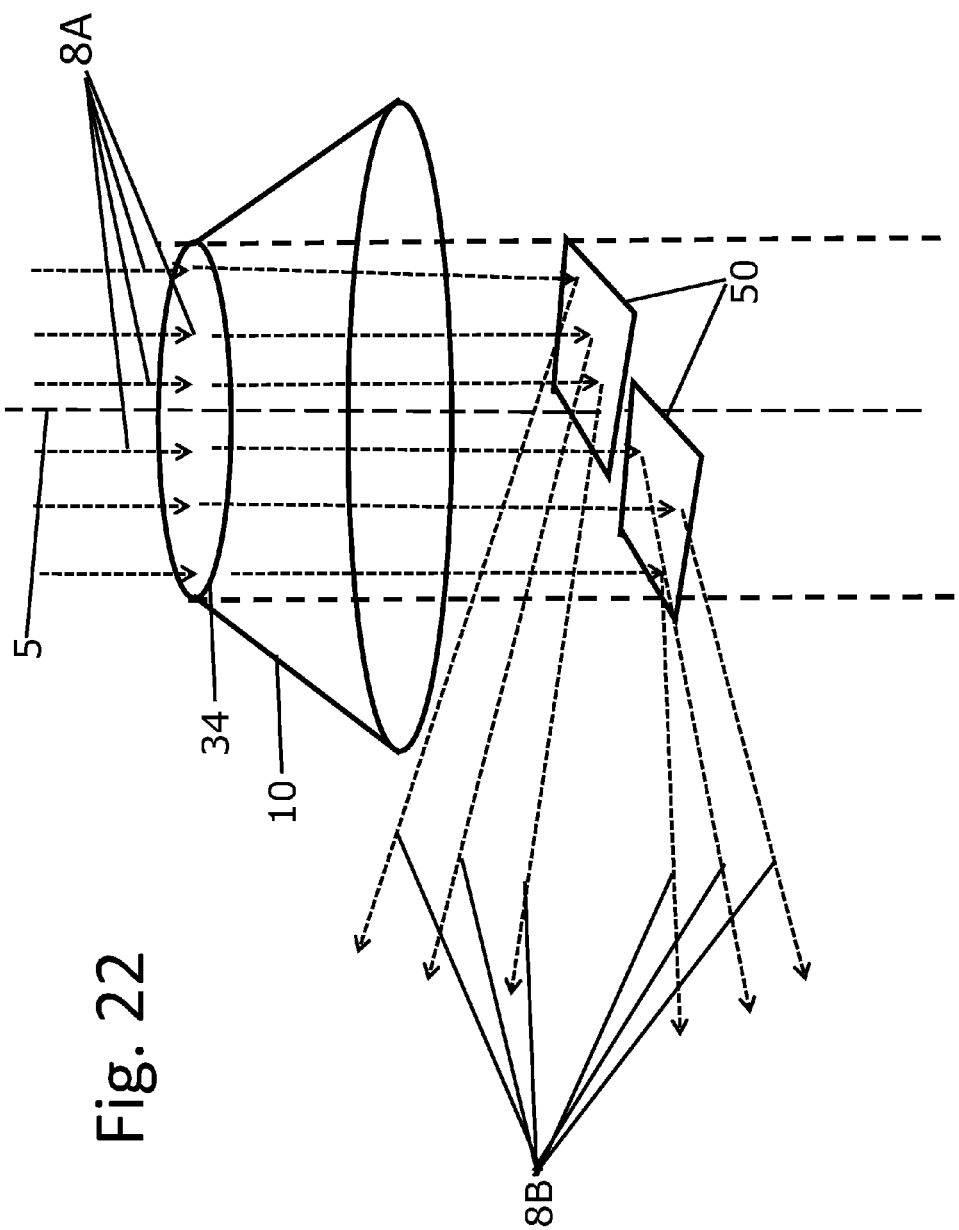
FIG. 22 is a schematic view of portions of one embodiment of an optical distributor.

FIG. 22 shows another example of a multiple reflector embodiment of an optical distributor. In FIG. 22, the single reflector 50 shown in FIG. 21 is replaced with two or more reflectors 50, each relatively parallel to each other or not, each having perimeter shapes that are elliptical, sections of an ellipse, circular, or polygonal. The multiple reflectors of the optical distributor shown in FIG. 22 may allow the flexibility of aiming each reflector in a different direction to send the light rays toward multiple targets.

Figure 23:
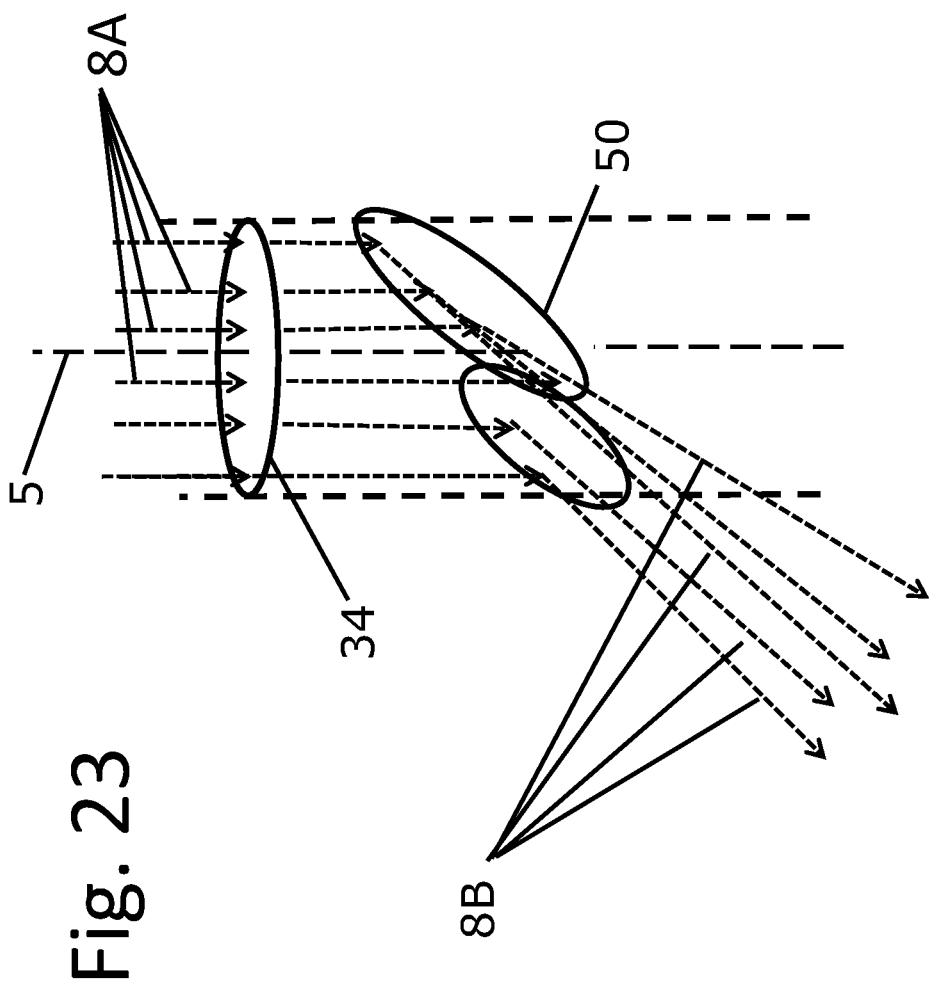
FIG. 23 is a schematic view of portions of one embodiment of an optical distributor.

FIG. 23 shows another multiple reflector embodiment of an optical distributor, in which the rectangular reflectors 50 of the optical distributor shown in FIG. 22 are replaced by elliptical reflectors 50, with the elliptical reflectors also angled differently.

FIGS. 24A and 24B show isometric views of still yet other embodiments of an optical distributor. The optical distributor shown in FIGS. 24A and 24B may generally be a pyramidal shape. This embodiment of the optical distributor may be used, for example, in implementations needing light sent in two or four orthogonal opposing directions. Two opposite faces of the pyramid are larger and angled differently than the orthogonal ones. In this manner the larger faces may send more light, and send the light further into an elongated space while the smaller orthogonal ones send less light into a narrower portion of the illuminated space, such as the intersection of perpendicular short and long hallways in a building. These faces may be segmented or curved, but are designed according to the general principles described above in order, for example, to illuminate the first plane 30 more fully and in a relatively uniform manner.

FIG. 24B illustrates a more curved version of the optical distributor shown in FIG. 24A. The four side surfaces (or faceted surfaces) of the optical distributor shown in FIG. 24B may be curved or convex in order, for example, to control the reflected light rays better, and/or to spread a reflected beam over the first plane 30 and possibly the walls of the illuminated space in some embodiments. The optical distributors shown in FIGS. 24A and 24B may be used to illuminate spaces on either side of a wall separating those spaces, as shown and described below with reference to FIGS. 25 and 26.

Figure 25:
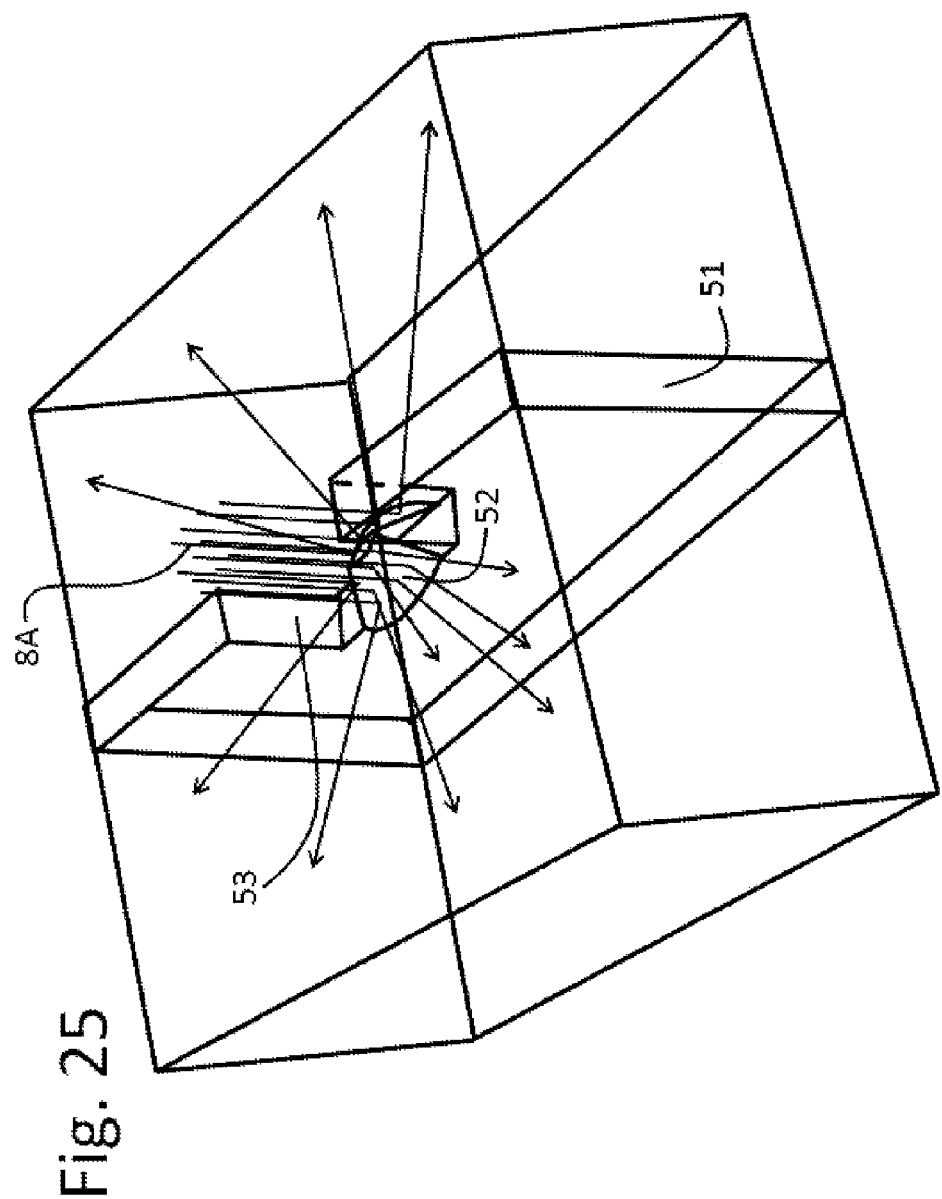
FIG. 25 is a schematic view of one embodiment of an optical distributor used to illuminate two rooms from a cut-away wall.

FIG. 25 shows an isometric view of an implementation of the curved pyramid design of FIG. 24B in a slot 53 in a wall 51 between two rooms. In this case, a pyramidal shaped optical distributor is placed in a slot 53 at the top of the wall between the two spaces, so that some of the light 8A coming through the opening 32 in the ceiling plane 30 may be reflected and spread across the ceilings and walls of the two spaces on either side of the separating wall 51. If the wall does not extend all the way from the floor to the ceiling, then the narrow ends of the pyramid distributor shown in FIG. 24B may be used to illuminate the ceiling above the wall. Otherwise, these narrow ends of the optical distributor may be small or nonexistent, in order to send most of the light reflected from the optical distributor into the two spaces on either side of the wall.

Figure 26:
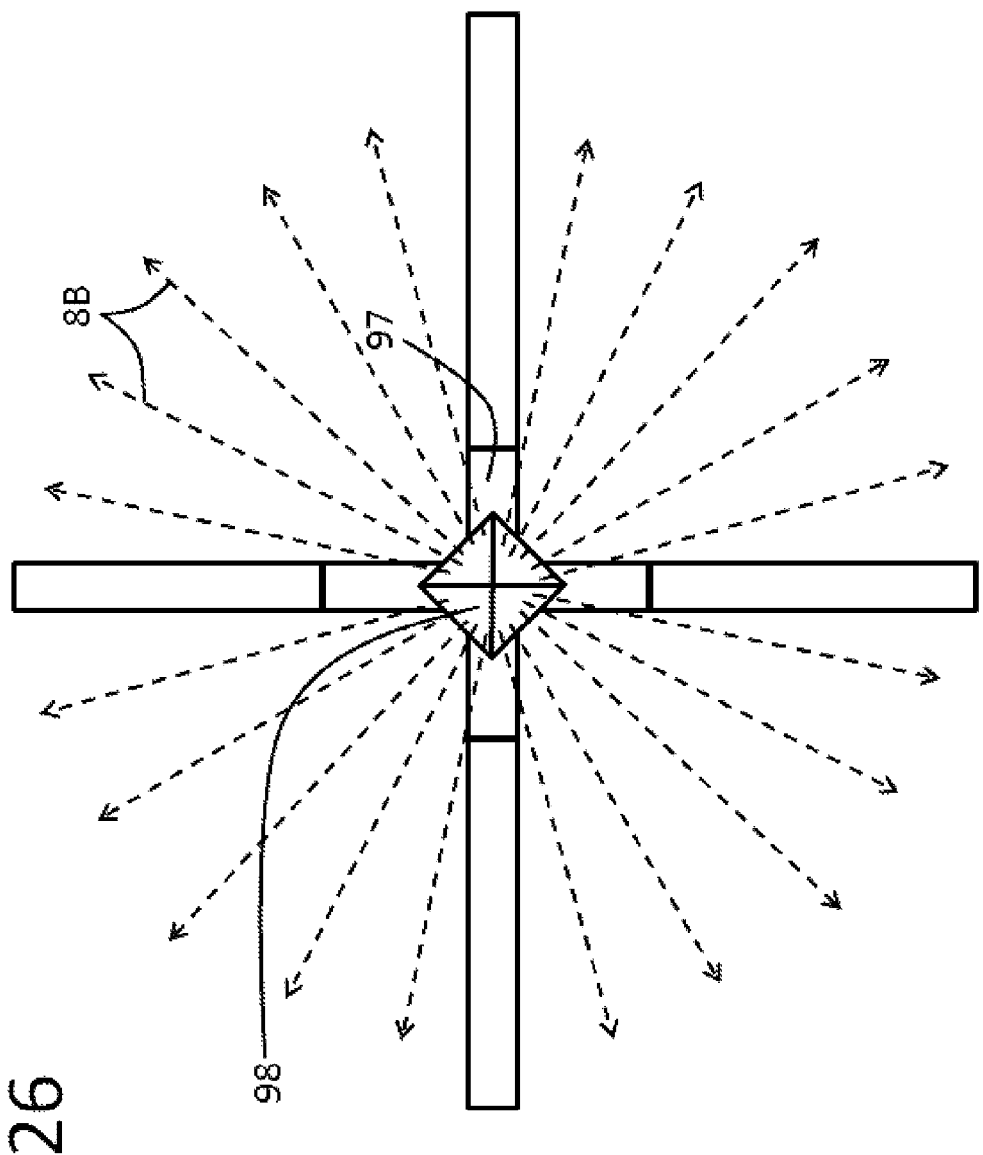
FIG. 26 is a schematic top plan view of one embodiment of an optical distributor similar to that shown in FIG. 25, but designed to illuminate four rooms with cut-away walls.

FIG. 26 shows a top plan view of an implementation of the curved pyramid optical distributor of FIG. 24B, similar to that shown in FIG. 25 except that the optical distributor in FIG. 26 may be used to illuminate four different rooms instead of only two. The optical distributor 98 in FIG. 26 may be a square pyramidal shape (i.e. with four sides that are approximately the same width) and may be placed in a slot at the top of four intersecting walls. The opening 32 in the first plane 30 through which the downwelling collimated beam passes may be placed in the common corner of the four adjacent rooms and the approximately equal-sided optical distributor may be placed in a slot 97 where the four rooms come together in a common corner. The optical distributor may be positioned similarly to the schematic illustrated in FIG. 25, except that the four sides of the optical distributor may face toward the centers of each of the four rooms and the curvatures of these four sides may be adjusted to send the reflected light upward and radially outward onto the ceilings of those rooms, as illustrated with the dashed line arrows 8B simulating reflected light rays in FIG. 26. This design may be thought of as a hybrid of several other embodiments of optical distributors, such as the optical distributor 10 in FIG. 1 and the optical distributor 100 in FIG. 37. If the four rooms being illuminated by the design in FIG. 26 are differently sized, each quadrant of the distributor 98 may be designed slightly differently, to optimize the light distribution in each room.

Figure 27:
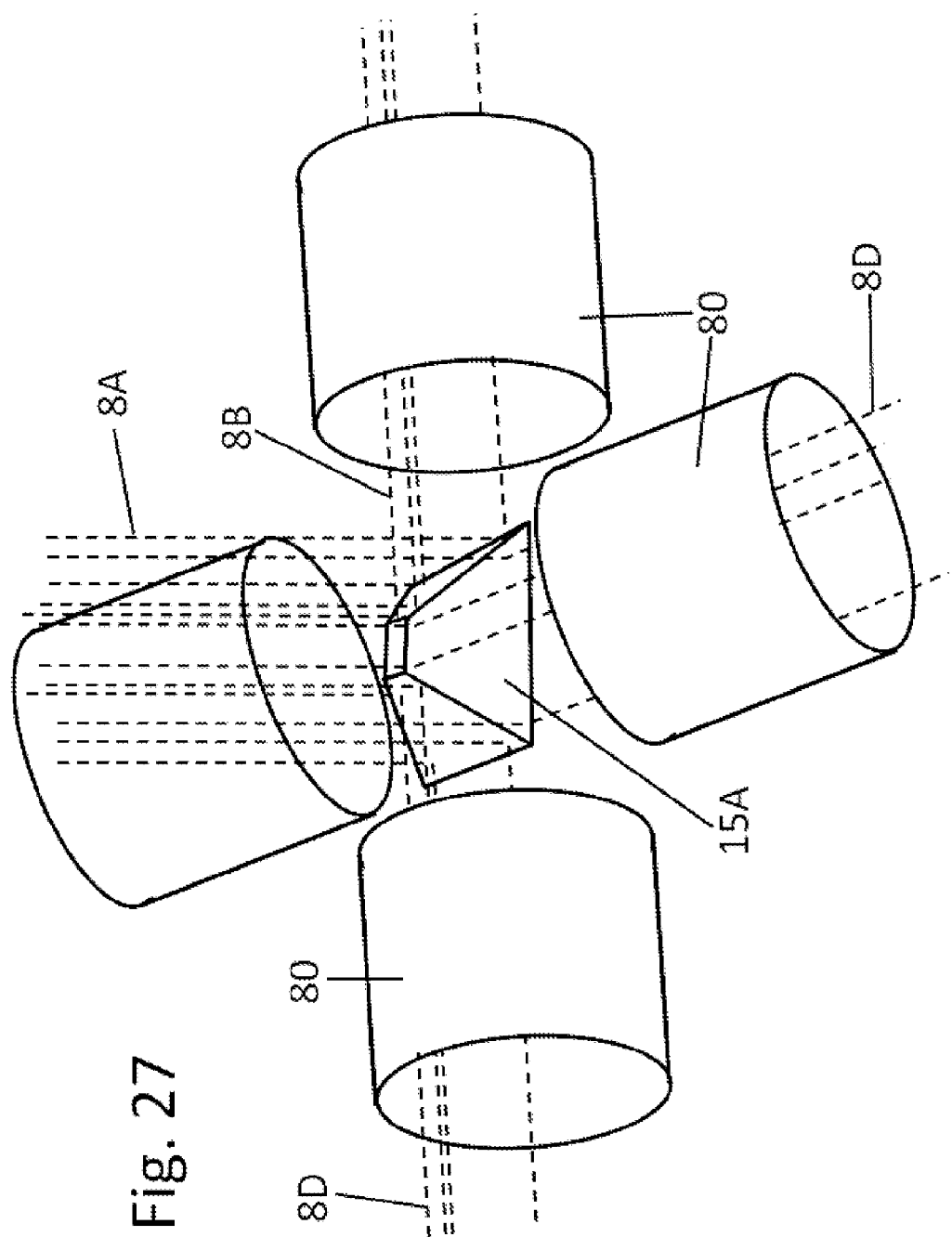
FIG. 27 is a schematic isometric view of one embodiment of an optical distributor shaped as a pyramidal frustum.

FIG. 27 shows an isometric view of cylindrical light pipes 80 that may be used in conjunction with an optical distributor composed of four trapezoidal perimeter planar reflectors arranged in a pyramidal shape, a pyramidal frustum. The light pipes shown in FIG. 27 may be cylindrical and specularly or diffusely reflective in some embodiments, and may receive light rays reflected from the optical distributor (which may be, for example, the pyramidal optical distributor shown in FIG. 24A having four planar faces) and transport the received light rays through the light pipes shown to somewhat remote areas where the light rays may be extracted and/or distributed to illuminate a task area or space. In FIG. 27, the incident light rays 8A are reflected from the four facets of the pyramidal distributor and propagate into and through the light pipes 80. In other embodiments, the cylindrical light pipes 80 may be replaced by light pipes having elliptical, rectangular, trapezoidal, or other cross-sectional shapes.

The light pipes 80 may in some embodiments be large enough to accept all the light rays reflected from a face of the optical distributor and/or large enough to minimize the number of reflections from the light pipe's interior surface. In some of such embodiments, the interiors may not be reflective, in which case the light pipes mainly serve to protect the possibly concentrated beams propagating within them. Although FIG. 27 shows the light rays being distributed into four light pipes 80, more or fewer light pipes 80 may be used in other embodiments. For example, by making two opposite sides of the distributor very small, most of the light rays incident on the other two sides of the optical distributor may be directed into two oppositely directed light pipes.

Figure 28:
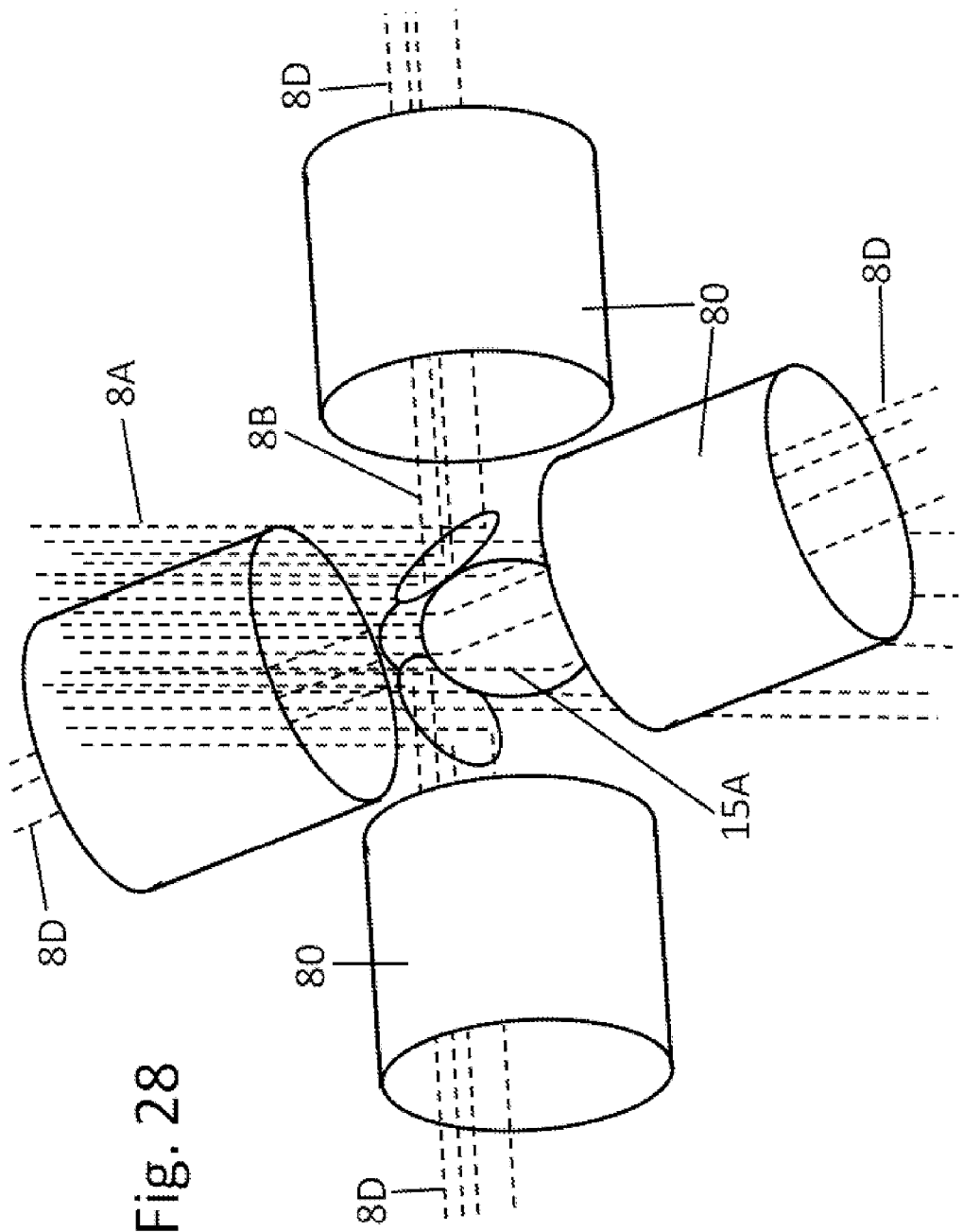
FIG. 28 is a schematic isometric view of one embodiment of an optical distributor.

FIG. 28 shows an isometric view of cylindrical light pipes similar to FIG. 27, except that a different optical distributor is used in FIG. 28, one with planar elliptical perimeter faces replacing the trapezoidal perimeter ones in FIG. 27. The light pipes in FIG. 28 may receive light rays reflected from the four planar elliptical reflectors and transport the received light rays to somewhat remote areas where the piped light rays are extracted and further distributed as desired. The light rays passing downward between the elliptical reflectors may be further distributed into the space below by means of a translucent diffusing sheet to spread the downward propagating beam, optical distributors similar to those described above, or through the use of Fresnel lens sheets to spread the rays passing between the elliptical reflectors that are not reflected by them.

FIGS. 29A through 29C illustrate the use of three different optical assembly designs, to redirect the quasi-collimated light rays 8D emerging from the light pipes 80 shown in FIGS. 27 and 28 in order to spread that light in a controlled manner as diverging rays 8E into a particular space.

The optical assembly designs illustrated in FIGS. 29A through C may be reflective and/or transmissive luminaries and may receive light rays 8D emanating from light pipes 80, redirect that light downward or laterally by means of a convex specular-only or a combination of specular and diffuse elliptical reflector 91, and into the space below, as illustrated in FIG. 29A. The optical assembly designs may redirect the light downward by means of an elliptical planar specular reflector 93 as illustrated in FIG. 29B and from that reflector thence onto and through a translucent beam-spreading optical element 95 (which may be a convex Fresnel or other lens, a lenticular diffusing sheet, a translucent opal-like diffuser, etc.) thereby spreading the transmitted light into the illuminated space below. The optical assembly designs may receive the light rays 8D emanating from a light pipe and pass them through a translucent beam-spreading optical element 95, thereby spreading the transmitted light and sending it onto portions of the nearby ceiling and/or a vertical surface, which may illuminate the ceiling and/or the vertical surface or area or some object toward which such light rays are directed, as illustrated in FIG. 29C.

FIG. 30 illustrates the use of an optical element 17 (such as a Fresnel lens, a negative lens, or any type of diffusing optical element) to spread light incident upon it as it passes through element 17 placed in an opening in the center of an optical distributor, in this case, for example only, that distributor containing a crossfire section 11. FIG. 30 also illustrates the use of an optical diffusing sheet 26, which diffusely transmits light rays incident upon it, with the emerging light rays 8C spread angularly over the illuminated space below. If the diffusing sheet 20 is made larger than the distributor 10, it may serve also to receive stray light from the incident beam that fails to reach the distributor 10 (or 100) and transmit that light diffusely to the space below, thereby serving also as the stray rays blocking or redirecting ring 25 illustrated in FIG. 12.

The optical element 17 may spread the light rays 8A in the downwelling incident beam laterally over the optical diffusing sheet 26. The optical diffusing sheet 26 may be flat or curved, may be translucent, and may be placed across the bottom 20 of distributor 10 in some embodiments. The optical diffusing sheet 26 may accept light rays 8B from the lens 17 and then retransmit the light rays 8B as light rays 8C to diffusely illuminate the area immediately below the optical distributor.

In some embodiments, the optical element 17 may be a flexible bundle of glass or plastic fiber optics. The fibers in the bundle may be fully or partially separated into individual or groups of fibers and each of these individual or groups may be routed inside the optical distributor down onto the optical diffusing sheet 26. The individual fibers or groups of fibers may in some embodiments be arranged in customized geometric patterns to symbolize logos or textual information, while still providing additional illumination to the space immediately below the optical distributor, or the fibers may be arranged uniformly above diffusely transmitting sheet 26 so as to illuminate it more uniformly.

Figure 31:
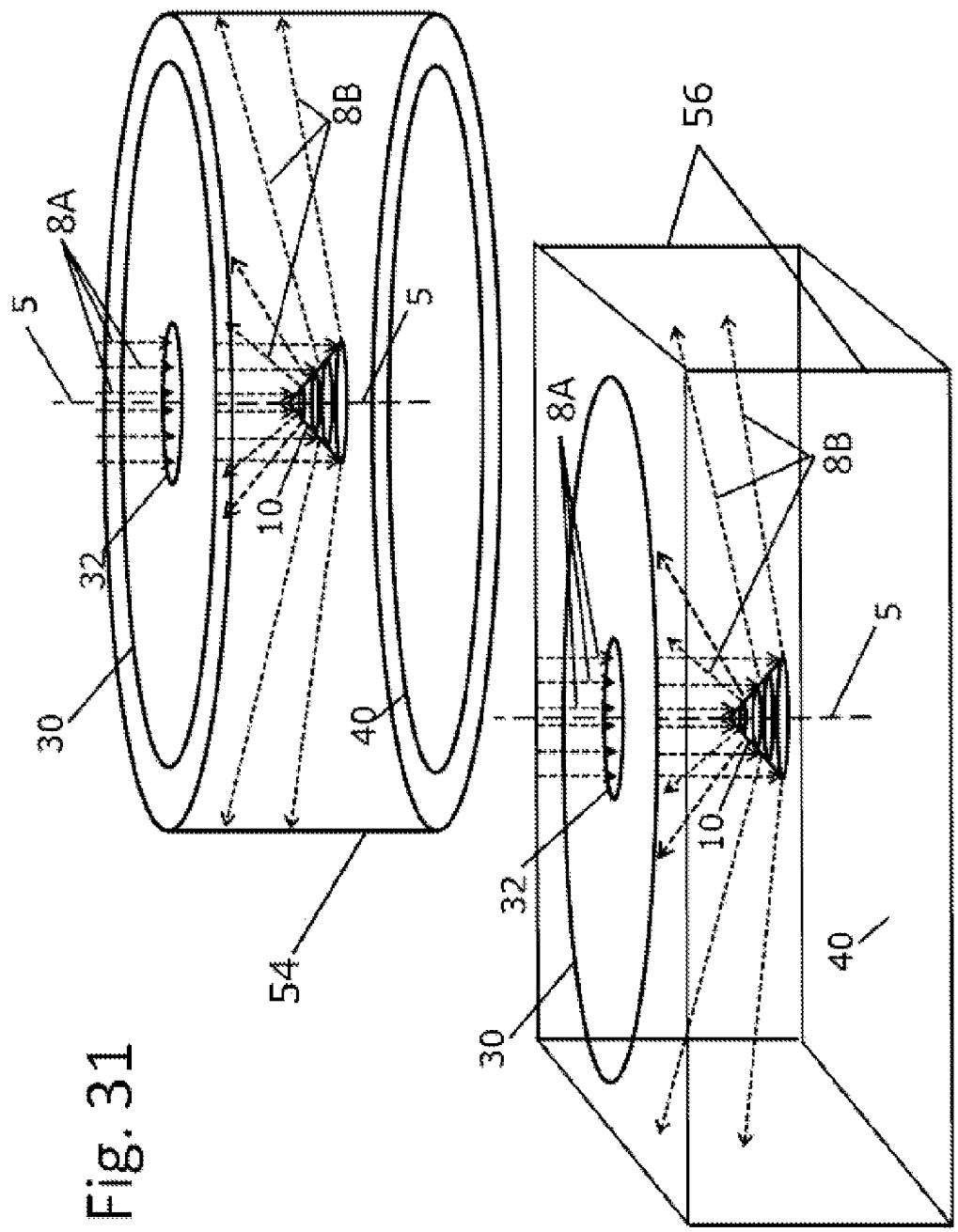
FIG. 31 depicts two isometric views of embodiments of an optical distributor, one installed in a room with a circular perimeter and the other installed in a room with a rectangular perimeter.

FIG. 31 illustrates the use of optical distributors to illuminate one or more walls 54 and 56 surrounding a space to be illuminated in addition to the ceiling (i.e. the first plane 30). The optical distributor 10 shown in FIG. 31 may be slightly changed in shape so that the light rays in the cylindrically collimated beam are redirected by the optical distributor at least partially onto a receiving area 54 or 56 (such as one or more walls). The receiving area 54 or 56 may in some embodiments be parallel to the optical axis 5 but may be much larger in diameter than the incident beam 8A surrounding the optical axis 5. The receiving areas may be, for example, the cylindrical wall 54 of a cylindrically shaped foyer or stairwell entrance to a building, with an overhead ceiling, or other geometries intended for other purposes, such as a rectangular-walled 56 room. In this manner, the optical distributor may illuminate both the ceiling and wall or walls of the space surrounding the optical distributor. The light reflected diffusely from these surfaces may further illuminate the second plane 40 (such as the task plane or the floor) of the space.

Figure 32:
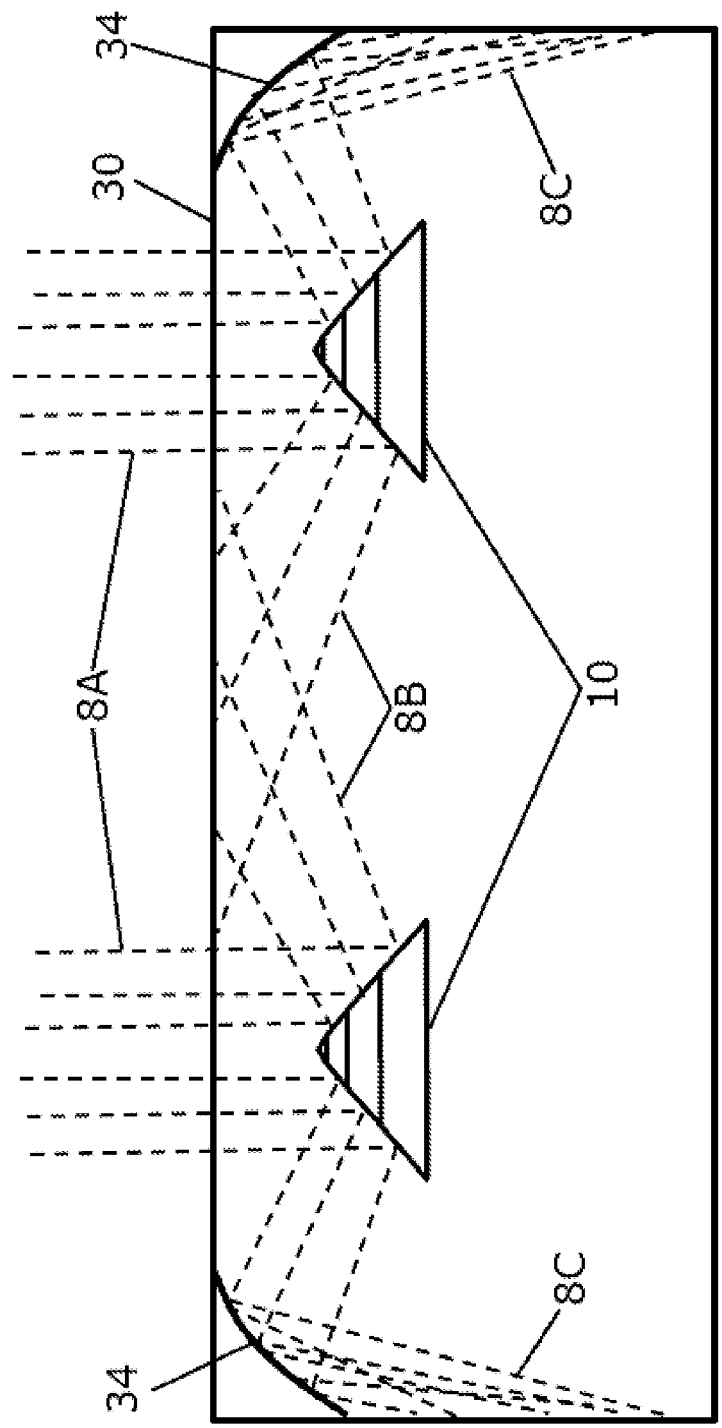
FIG. 32 is a schematic side plan view of two optical distributors installed in a single room.

FIG. 32 illustrates the use of curved reflectors 34 placed along portions of one or more walls and/or ceiling edge areas of a room to reflect rays 8C downward and radially outward as rays 8C onto the wall areas below them. The optical distributors 10 illustrated in FIG. 32 may illuminate the first plane 30 within a room, and may also reflect some light rays onto one or more specular reflectors 34, which may be placed in the space where a wall and ceiling are joined. The optical distributor 10 may in some embodiments be placed near the wall of the space that is to be illuminated indirectly by reflector 34. The reflector 34 may be curved such that it is designed to reflect rays 8B from the optical distributor 10 down and radially outward from the optical distributor and onto the wall below the reflector 34, as illustrated schematically in FIG. 32. The Incident beam of rays 8A may reflect from the optical distributor 10 upward onto the first plane 30 of the space. A portion of the reflected rays 8B may also propagate to the one or more reflectors 34 which reflect the rays downward and onto the wall below the reflector 34. This may illuminate the wall and the space adjacent to the wall without producing glare.

FIG. 33 illustrates the use of an optical element 21 (such as a positive Fresnel or other lens) which may accept light rays 8B from the downwelling beam of light rays 8A passing through aperture 34 in the optical distributor 10 and concentrate those light rays of flux onto a horizontal target surface area 41 below the optical element 21. The optical element 21 may in some embodiments manipulate and/or direct the downwelling beam of light rays 8A to better meet the needs of transport and additional concentration of the light rays. In some embodiments, the optical element 21 may be used in addition to or in place of an optical distributor.

In FIG. 33, an optical element 21 such as a Fresnel lens, may be placed in the downwelling beam 8A passing through aperture 32 in plane 30, which further passes through an aperture 34 in the optical distributor 10 and then onto the optical element 21, which concentrates and focuses the transmitted flux onto a target plane 41. The optical element 21 may be used in order to irradiate a sample of material with concentrated solar radiation for chemical purposes or to provide heat for a manufacturing process. By placing the target 41 at various distances below lens 21, various degrees of concentration may be achieved.

Figure 34:
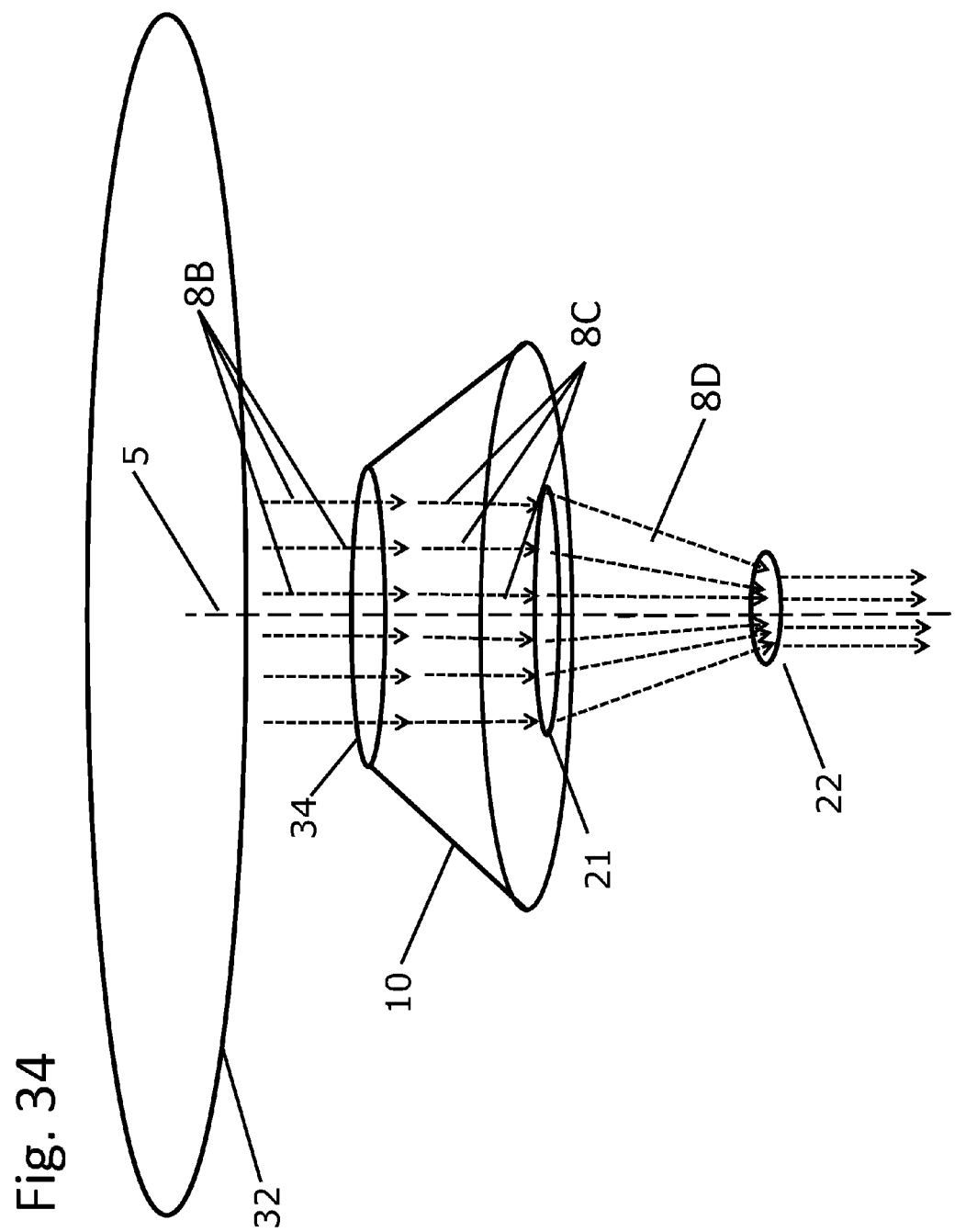
FIG. 34 is a schematic view of portions of one embodiment of an optical distributor.
Figure 35:
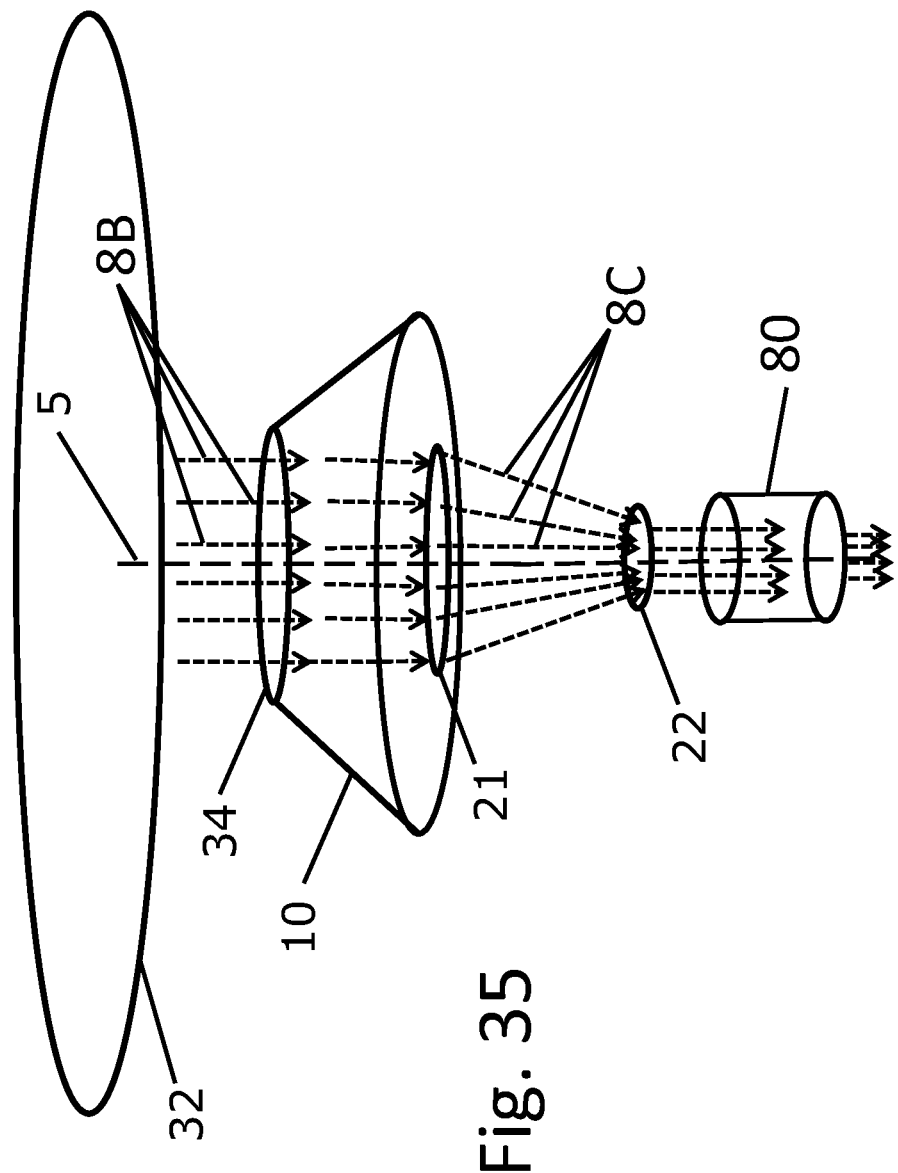
FIG. 35 is a schematic view of portions of one embodiment of an optical distributor.

FIG. 34 is similar to FIG. 33 except that an optical element 22 (such as a negative or diverging Fresnel or other lens) is added in order to, for example, re-collimate the light rays. In some embodiments, the optical elements 21 and 22 may be placed using confocal positioning, such that the quasicollimated, nearly parallel rays in the original beam of light rays 8B, 8C are focused by the optical element 21 into a converging beam of light rays 8D which is intercepted by lens 22. The rays emerging from the optical element 22, for some distances between the optical elements 21 and 22, may be approximately parallel, recollimating the original beam. Such an arrangement may be used in several implementations, such as, for example, providing a smaller, more concentrated beam that can be sent into a light pipe 80 for transport over some distance, as illustrated in FIG. 35 and described below. The embodiment shown in FIG. 3 35 may be useful if there is limited space for the light beams to pass through, in which case, the smaller beam diameter may allow for easier routing of the light pipe, or for a flexible means of providing task lighting.

FIG. 35 is similar to FIG. 34 except that a light pipe 80 is added in order to, for example, transport the re-collimated light to a different location. The light pipe 80 may be a cylindrical reflective light pipe as shown or it may be square, elliptical, or any other polygonal cross section), and it may further be a total internal reflection light pipe, or any other suitable light pipe, including a prismatic-walled hollow light guide.

It is here noted that for fairly well-collimated incident beams, a cylindrical specularly reflective light pipe may exhibit a degree of focusing of the flux that varies in degree and location of focus along the length of the pipe. Altering the cross-sectional shape of the pipe may in some cases reduce or eliminate such focusing characteristics. Non-circular light pipes may also have advantages in lowering fabrication costs for some design applications.

Figure 36:
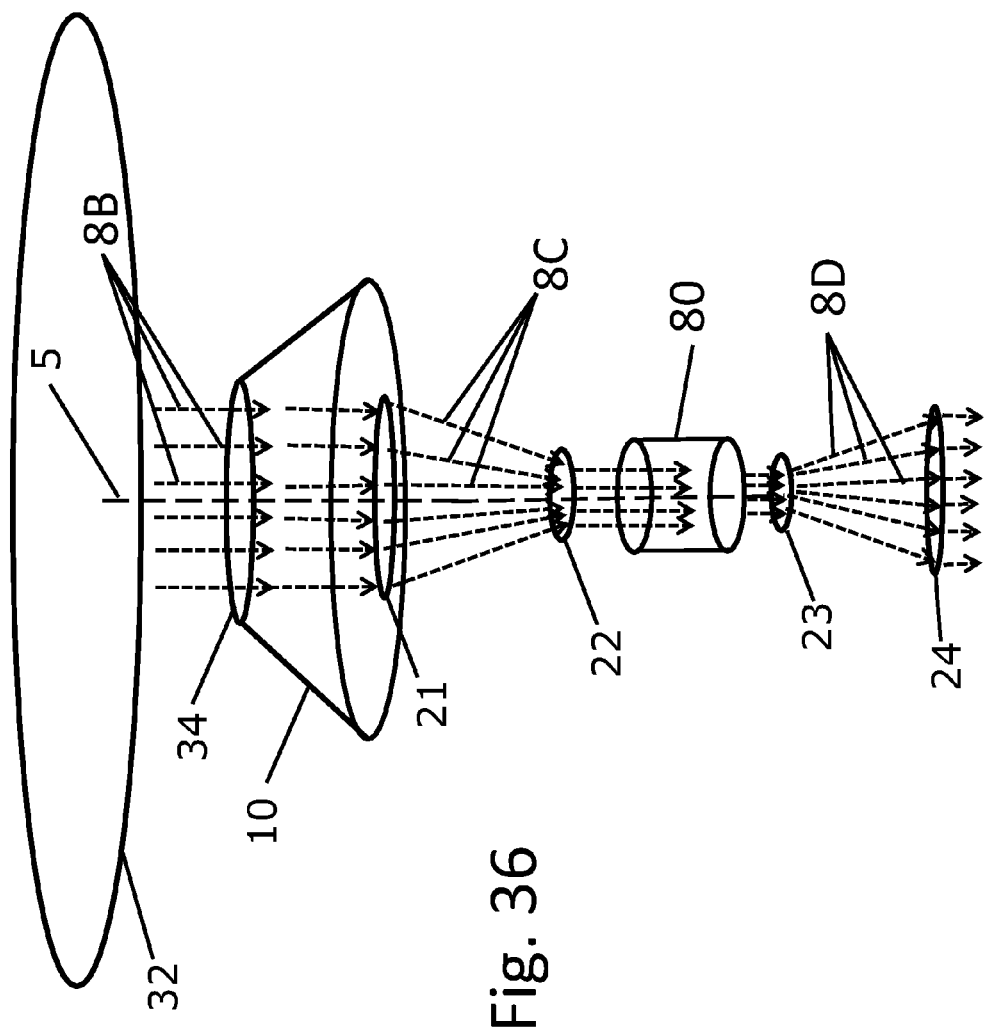
FIG. 36 is a schematic view of portions of one embodiment of an optical distributor.

FIG. 36 is similar to FIG. 35, except that an optical element 23 and an optical element 24 are added. The optical element 23 may be a negative or diverging lens, or other type of optical element, and the optical element 24 may be a positive or converging Fresnel lens, or other type of optical element. 3 2 2 2 The light pipe 80 may transport a compact, concentrated beam of light rays, which, upon emerging from the light pipe, may pass through optical element 23. The optical element 23 may spread the beam of light rays, which beam may then pass through the optical element 24 in order to, for example, re-collimate the beam with a larger diameter beam that is less concentrated and may be further used elsewhere. The embodiment illustrated in FIG. 36 may be used, for example, to transport a concentrated version of the original beam compactly through a reduced-diameter light pipe 80 or a flexible fiber optics bundle to a nearby location and then to spread the beam emerging from the light pipe to a less concentrated form, the less concentrated form being perhaps less likely to cause damage, and be useful for local task lighting with high intensity. The embodiment shown in FIG. 36 may also help reduce material costs and make a more compact design.

Referring now to FIGS. 37, 38, 39, 40, and 41, the sizes, positions, and inclinations of the segmented portions or facets of various embodiments of a narrow optical distributor 100, described previously in connection with FIG. 21 and following, may be determined by the process described below. As mentioned above, other processes may be used in addition to or in place of the following. A narrow optical distributor 100 may be used in some instances when the desired spreading of the downwelling beam is not desired to fill a complete 360-degree horizontal circular zone radiating outward from the beam, but instead is desired to propagate only in two opposite directions, with perhaps a small amount of lateral (horizontal) spreading of the two opposing beams. This may be the desirable, for example, to illuminate a narrow aisle. The narrow optical distributor 100 may be shaped like a "rooftop" in some embodiments and may include two intersecting faceted planar reflectors joined at the common line where their top edges are joined and which are nominally angled near to 45 degrees either side of the vertical.

Figure 38:
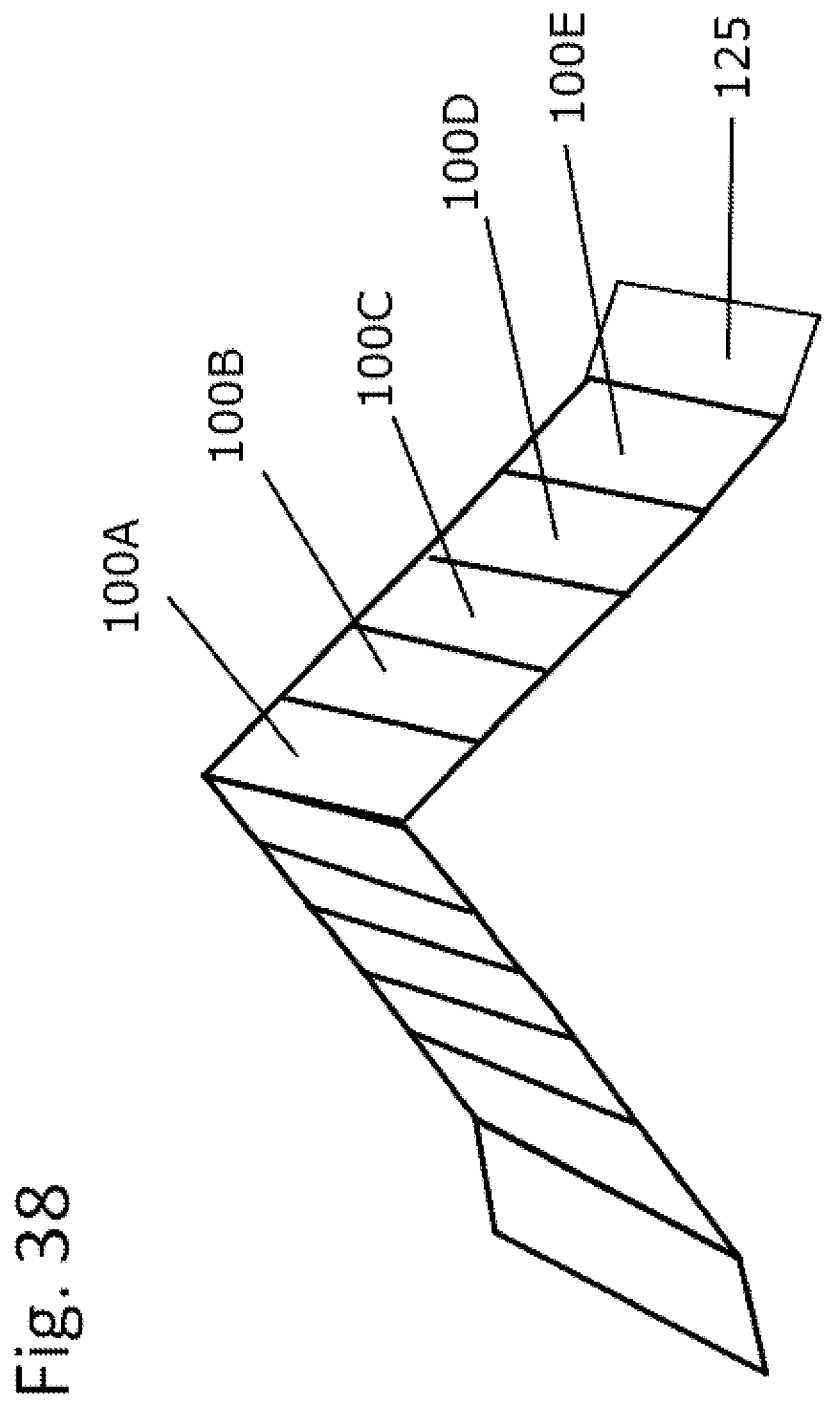
FIG. 38 is a schematic view of a portion of one embodiment of an optical distributor.
Figure 39:
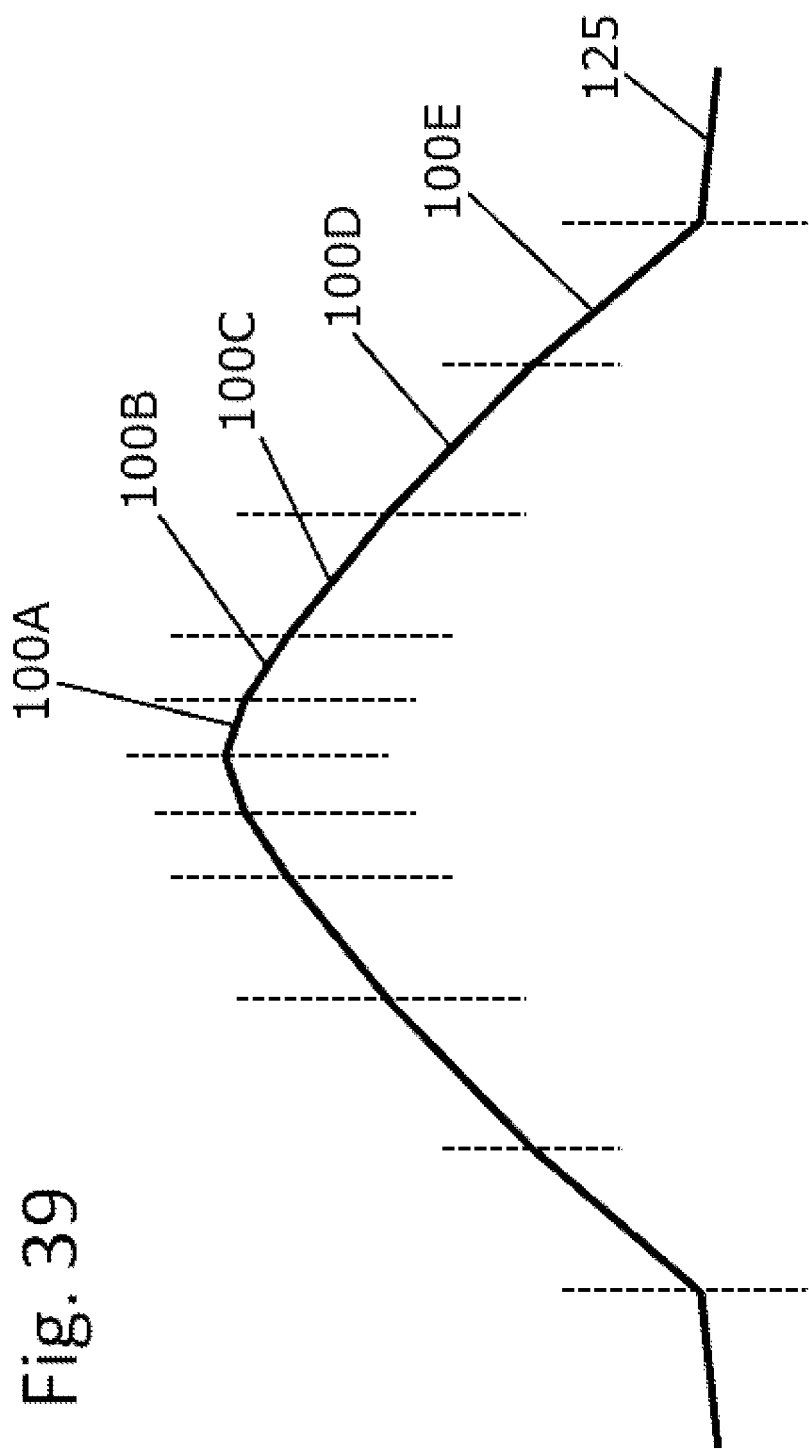
FIG. 39 is a side plan view of one embodiment of a portion of an optical distributor.
Figure 40:
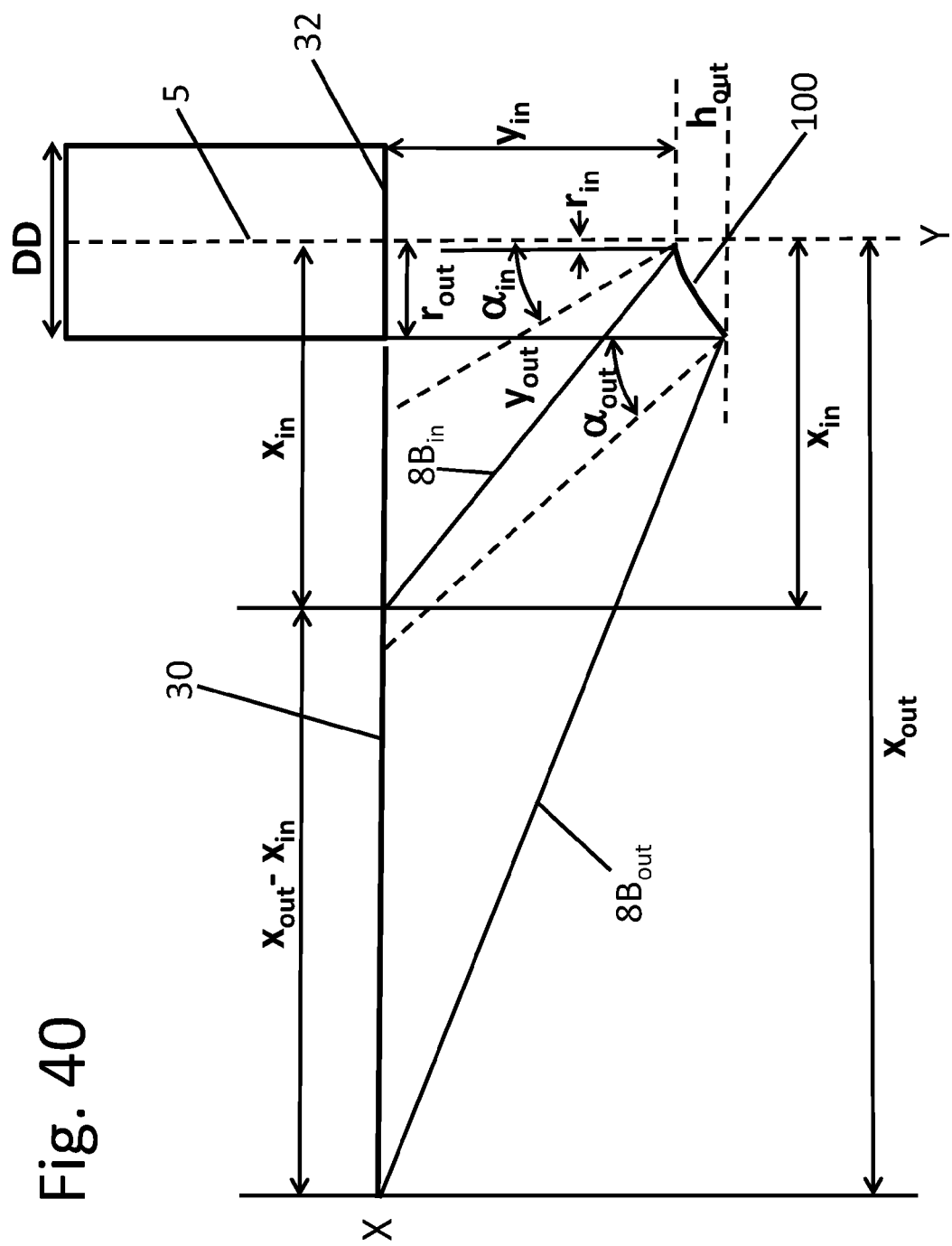
FIG. 40 is a schematic diagram of a portion of one embodiment of an optical distributor showing the geometrical relationships of components.

FIG. 37 illustrates a schematic illustration of the way that the downwelling flux in a rectangular beam of light rays 8A passing through rectangular aperture 32 in first plane 30 may be intercepted by segments or facets of the narrow optical distributor 100 and the way that this flux is reflected by the distributor 100 into multiple rectangular bands of radiant flux in the first plane 30, centered on the optical axis 5. One possible faceting of the two sides of distributor 100 is shown in FIGS. 38 and 39, which show also a stray rays intercepting segment 125. The coordinate system chosen is a planar Cartesian one, with coordinates r and y. The usual x coordinate, illustrated as x and simultaneously as r in FIG. 40, is measured outward from optical axis 5. When the measurement is made in the first plane 30 the coordinate may be designated x. When it is made from the optical axis to the distributor 100 it may be designated r. The vertical coordinate, illustrated as y in FIG. 40, is measured vertically downward from the first plane 30.

Figure 41:
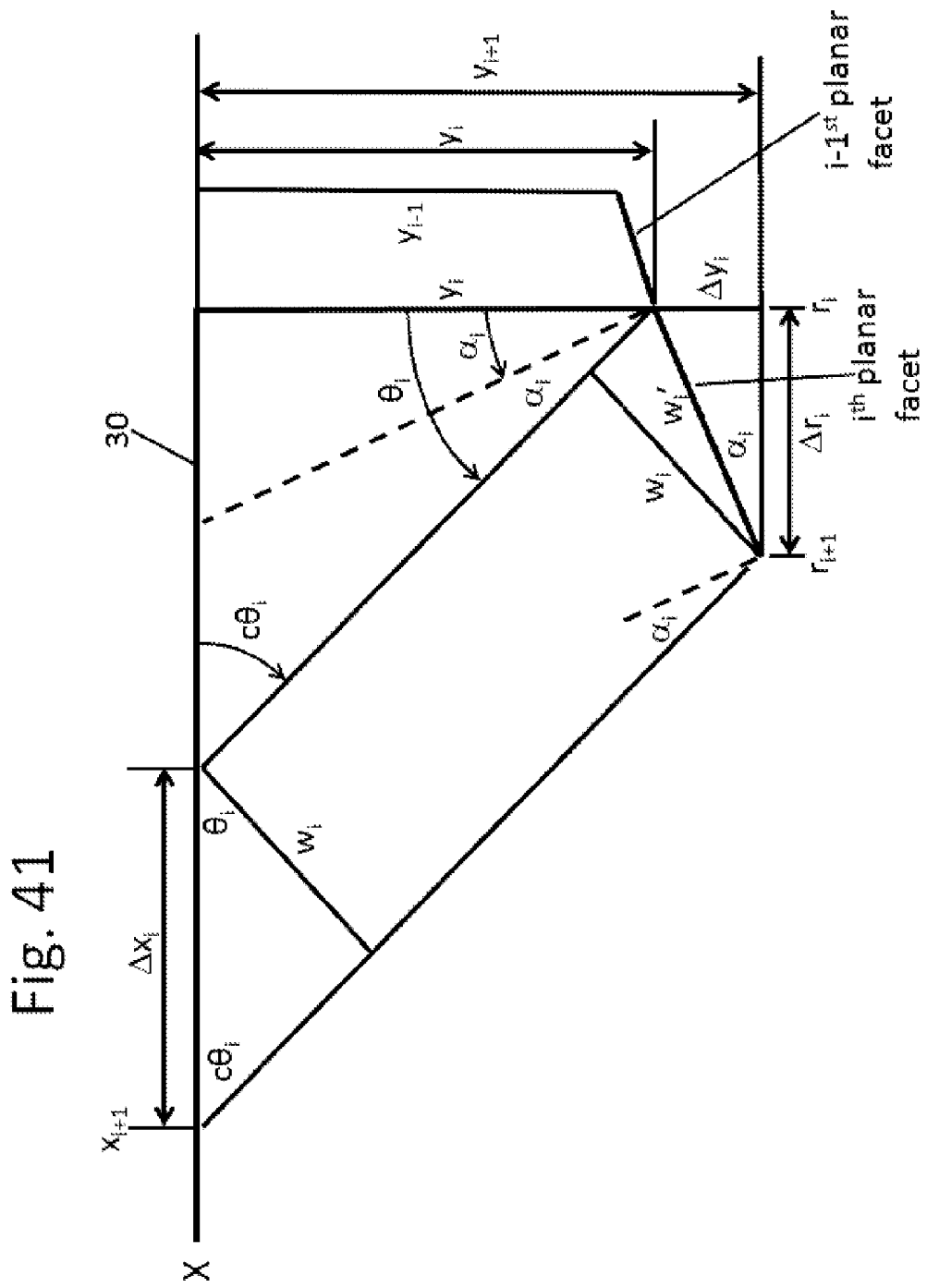
FIG. 41 is a schematic diagram of a portion of one embodiment of an optical distributor showing the geometrical relationships of components.

As shown in FIGS. 39, 40, and 41, each line segment 100A, 100B, etc., may be used to generate a segment or facet of the optical distributor by sweeping that line segment in one direction, along the Z direction that is perpendicular to the plane of the drawing of FIG. 40, by a distance equal to the desired width of distributor in that Z direction, or sweeping line segments in a plane passing through the optical axis 5 equally in opposite directions from that plane. The $i^{th}$ line segment may be defined by an inner x-coordinate $r_i$ and an x-increment being denoted $\Delta r_i$, with i ranging from 1 to N, where N is the number of segments in the optical distributor, and by a top y-coordinate, denoted $y_i$ and a y-increment being denoted $\Delta y_i$, respectively. (Unlike the case of the other embodiments of optical distributors, facets of distributor 100 shown in FIGS. 37-41 may be contiguous and/or connected to each other by common edges.) Note that FIGS. 40 and 41 illustrate only one half of the linear distributor 100. The other half is a duplicate of the first half following rotation about the optical axis 5 through an angle of 180 degrees.

FIG. 37 shows an isometric view of an embodiment of a linear optical distributor 100 that may distribute radiation initially propagating in a collimated beam of light rays 8A, which, following passage from the source through rectangular, elliptical, circular, or polygonal aperture 32 in a first plane 30, is incident on the linear optical distributor and thence reflected by that distributor as reflected rays 8B towards a bottom surface of the first plane 30 (which may in some embodiments be a nominally rectangular diffusing plane). The linear optical distributor may also be referred to as a narrow beam optical distributor, a narrow distributing reflector, a reflective wedge, a rooftop-shaped reflector, a reflector, a distributor, and so forth, but here may be referred to simply as a linear optical distributor to distinguish it from the radial optical distributor described previously.

The linear optical distributor 100 may in some embodiments be faceted, reflective, rectangular, elliptical, etc., and the incident beam of light rays 8A propagated to the linear optical distributor may be reflected toward two opposing directions as rays 8B. The linear optical distributor 100 may be comprised of two duplicate, mirror imaged, intersecting faceted planar reflectors. The rectangular facets illustrated in FIG. 37 may reflect light from beam 8A upward and onto the bottom side of first plane 30, where that light may be reflected onto a second, parallel plane 40 perpendicular to the optical axis 5 of the system. In an alternate embodiment of distributor 100, the nominally rectangular planar facets of distributor 100 may be bent along their lengths so as to spread the beams reflected from each one laterally, spreading the reflected beam left and right as it propagates toward the left and right in FIG. 37, down a narrow hallway or aisle, for example. The tilts of the facets of distributor 100 about the horizontal common edges between them may in some embodiments distribute a modest amount of radiant flux to the bottom of plane 30 in the region close to the aperture 32 and increasing quantities of this flux at increasing distances left and right from aperture 32. The collimated beam of rays 8A may come from an electric light source system or from a solar collecting and concentrating system. In both cases, the rays 8A in the beam may be well-collimated (varying little from being parallel to optical axis 5) or they may be "quasi-collimated" (meaning that they vary from a small angle, e.g., 0.5 degree up to approximately 5 or 10 degrees from the direction of the optical axis 5). The embodiments described herein may function less well if the incident beam 8A is less collimated, or they may not, depending upon the intended application of this invention. However, the embodiments presented herein are intended for use with collimated and quasi-collimated incident beams.

The radiant flux reflected from the first plane 30 shown in FIG. 37 may subsequently be approximately uniformly distributed (e.g., with approximately constant irradiance or illuminance) across a second plane 40, with the second plane 40 being not far below the first plane 30 in some embodiments, or the illumination distribution following reflection from plane 30 may be substantially varying, with higher flux sent by each facet or segment at increasing distances from aperture 32 to compensate for increasing light spreading with distance. In other embodiments, the second plane 40 may be far below the first plane 30. The second plane 40 may be parallel, and may be, for example, the floor or task plane of a space to be illuminated, but it may alternatively be any target plane or area to be illuminated or irradiated. The nominally elongated first and second planes 30 and 40 for the linear distributor 100 may be much longer than they are wide, as with aisles between storage racks or a hallway in a building, but the applications are not confined to these. For example, the linear distributor 100 may be used for large area lighting in an open plan office, warehouse, or other large open space in a building, through the use of multiple beams 8A and distributors 100 beneath them, each arranged, side by side, to illuminate the space in one direction by means of the distributors 100 and in the other perpendicular direction by means of the multiple side-by-side beams and distributors.

The optical distributor 100 in FIG. 37 may thus redirect or distribute light from the collimated beam into other directions in a controlled manner. By increasing the number of vertically spreading beams of reflected flux, and when used with a source such as a solar disk that may have a small natural angular spread, the individual beams of light on the first plane 30 may be broadened by the slight vertical angular spreading and fill the target area of the first plane 30 more uniformly. As such, the linear optical distributor 100 may illuminate some, most, or all of the second plane 40 in an approximately uniform manner. Also, the illumination of the first plane 30 is desired in most but not all possible embodiments not to be overly discontinuous or too bright at any particular location as a result of the optical distributor 100 redirecting the light rays. By making the number N of facets or segments of the linear optical distributor 100 larger than, for example, 10 or more, the discontinuous appearance of the reflected flux reaching plane 30 can be ameliorated somewhat. Other means of producing a more uniform, less discontinuous illumination of plane 30 are described subsequently.

It may be desirable in some but not all embodiments to prevent the smaller area of plane 30 immediately above and hence closer to distributor 100 from being excessively brighter than areas of plane 30 further outward, which may then be too dim, by varying the quantity of flux distributed to plane 30 so that most of the flux fills the greater areas at the outer ends of plane 30.

In some embodiments, the optical distributor 100 may include one or more segments of one or more rectangular reflective facets (rectangles or sections), some or all of which may have a slightly different angle from a vertical line through the center of the optical distributor, which may be the axis 5 of optical distributor 100. The facets or faceted surfaces (or the segments thereof) of the optical distributor 100 may further have slightly altered widths and tilts so that the illuminance or irradiance along the two beams of light reaching the first plane 30 from distributor 100 may be, on average, approximately uniform, thereby distributing the light across the second plane 40 somewhat evenly.

In this and other embodiments, the optical distributor 100 may include smooth and continually sloping, rectangular optical distributor surfaces that also may re-direct or distribute a portion of a downwelling collimated beam of light rays 8A back upward and outward onto a first plane 30 in such a manner that the light from the optical distributor that is subsequently reflected diffusely from the first plane 30 may thereafter be generally uniformly distributed over a second plane 40 below the optical distributor 100.

Many variations of the radial optical distributor 100 shown in FIG. 37 are possible. For example, the first plane 30 may have a lower surface that is diffusely reflecting, and the surface may have any perimeter, shape, width, etc. The first plane 30 may have an elliptical or polygonal opening 32 in its center, may be centered around the optical axis 5 of the optical distributor 100 (as illustrated in FIG. 37). Furthermore, the top or peak of the linear optical distributor 100 may be located at any distance below the first plane 30. As described below in more detail, some embodiments of the linear optical distributor 100 may be low-profile in order to reduce the distance that the optical distributor 100 extends below the first plane 30. In other embodiments, a stack of shallow rectangular glare shields may be placed on either side (left and right in FIG. 37) and above at least a portion of the optical distributor. Still other embodiments, as described below, include one or more tilted reflective mirrors that may be circular or rectangular and which may reflect a portion of the vertical downwelling collimated beam of light rays laterally and upwardly outward from the central axis of the beam, while spreading the light rays laterally and optionally in the two perpendicular direction as well, to illuminate one or more limited portions of the surrounding space with controlled levels of illumination.

Although the nominal shape of the incident beam of light rays 8A shown in FIG. 37 is approximately rectangular and may result in approximately uniform irradiance or illuminance in the reflected light when used with a linear optical distributor 100, other shapes of incident light beams and/or other shapes of optical distributors are possible. Incident light rays may form beams with circular, polygonal, or elliptical cross-sections, or any other type of beam, including a beam with an irregular cross section. The optical distributor 100 may be appropriately modified for differing incident beam shapes. For example, in the case of an elliptical light beam, the optical distributor may have a perimeter, when projected onto plane 30 that is elliptical, to match the envelope of the incident beam.

The optical distributor 100 may in some cases be used to illuminate a room or a portion thereof using solar light collected by a light gathering system. In some embodiments, the system may be located on a rooftop, and may deliver a generally fixed, nominally cylindrical beam of light downward through the roof and ceiling and onto the optical distributor using a single roof penetration.

FIG. 38 shows an isometric view of the linear optical distributor 100, and the rectangular reflective facets 100A, 100B, 100C, 100D, and 100E of a five-faceted version and a stray light blocking or reflecting additional reflector 125 that is just outside the nominal envelope of the incident beam of rays 8A. FIG. 39 shows side plan view of an optical distributor 100 with five faceted surfaces (100A, 100B, 100C, 100D, and 100E) and a stray rays blocking edge 125. The blocking edge 125 may, in some embodiments, be opaque, absorbing, reflecting, and/or diffusing, and may be located adjacent to the left and right bases of the optical distributor 100 and extend some distance laterally (left and right in FIG. 39) outward beyond the left and right base edges of the optical distributor 100. The blocking edge 125 may redirect flux from the incident beam of light rays 8A and cause that flux to propagate laterally outward beyond the perimeter of the base of the optical distributor 100 and thence upward onto first plane 30, which flux might otherwise cause a glare or stray light condition if allowed to continue down into the occupied space. Many variations on the blocking component 125 shown in FIGS. 38 and 39 are possible. In some embodiments an optical diffusing sheet may be used in conjunction with or in place of the blocking edge 125 to capture and/or absorb or diffuse stray light from the source that misses the segmented distributor 100.

FIGS. 40-41 present schematic diagrams of portions of an optical distributor 100, the first plane 30, and aperture 32 in plane 30, with various geometrical lines, dimensions, and angles illustrated for use in explaining various mathematical steps that may be used in some embodiments to compute potential dimensions of some embodiments of the optical distributor 100. Both FIGS. 40 and 41 illustrate only portions of the left half of linear optical distributing reflector 100. Referring to FIG. 40, the line 5 may be an axis through the center of the optical distributor 100, denoted as the y-axis, and line 30 in FIG. 40 coincides with and corresponds to the first plane 30 in FIG. 37, and is denoted the X-axis in FIG. 40. The left half of the full distributor 100 is depicted in FIG. 40 as a slightly curved line. For the purposes of this geometrical discussion, it may be composed of several straight line segments. The X distance from line 5 to the inner edge of the distributor 100 closest to line 5 is denoted $r_{in}$ and the X distance to the outer edge of distributor 100 farthest from line 5 is denoted $r_{out}$.

Still with reference to FIG. 40, an optical distributor 100 may be realized by defining a set of coplanar line segments 10A, 10B, 10C, 10D, and so forth, in the x-y plane of the rectangular coordinate system used in FIGS. 40 and 41, these line segments also depicted in FIG. 39, and then sweeping these coplanar line segments in a linear manner along the Z direction perpendicular to the x-y plane of the drawing in FIG. 40, equal distances on either side (in and out) of that plane, to form a two-dimensional rectangular segmented surface perpendicular to the x-y plane of the drawings in FIGS. 39 and 40. Such an operation will generate one half of the linear optical distributor. The other half is generated by duplicating the half just created, then rotating it about the optical axis 5 through an angle of 180 degrees. The x widths, y lengths, and tilt angles of the facets or segments of the optical distributor 100 may be selected to reflect light into rectangular areas in the first plane 30 in such a manner that the light rays diffusely reflected from the first plane 30 are approximately uniformly distributed across the second plane 40.

In FIG. 40, a downwelling flux of light rays parallel to line 5 and striking distributor 100 may strike the line segments, 100A, 100B, 100C, 100D, and 100E in the five-segment or five-facet optical distributor 100 shown in FIG. 38. The flux may reflect specularly up and horizontally to the left of the left half of optical distributor shown in FIG. 40, with rays at the ends of the half-distributor 100 propagating onto the first plane 30, shown as lines $8B_{in}$ and $8B_{out}$ on FIG. 40. The angles of incidence of these rays on the inner and outer segments of this half-distributor are shown as $\alpha_{in}$ and $\alpha_{out}$ in FIG. 40. Measuring the distance down from the first plane 30 as coordinate y and radial distances to the left from the optical axis 5 as coordinate r, line segment 100A has top right coordinates $(r_1, y_1)$. Because in this design method, it is assumed that the bottom left of the first line segment 100A is connected to and has the same coordinates as the top right of the second line segment 100B, the bottom left coordinates of the first line segment are here designated $(r_2, y_2)$.

As with the radial optical distributor 10 described previously, there is no inherent restriction that the segments to be connected in this manner. As before, for aesthetic or other reasons, the vertical separation between each facet or segment of optical distributor 100 can be greater than zero, but this method for calculating the coordinates of the end points of each generating line needs to be modified accordingly. Rays reflecting from the distributor 100 may propagate until they strike the first plane 30 between coordinates $x_{in}$ and $x_{out}$, respectively. Referring to FIG. 40, the corresponding distances down from plane 30 to where these rays may strike the inner and outer edges of distributor 100 are designated $y_{in}$ and $y_{out}$, respectively 4. The angle between the rays reflected from the inner and outer edges of the distributor 100 and the vertical are $2\alpha_{in}$ and $2\alpha_{out}$, respectively, since the angles of incidence $\alpha_{in}$ and $\alpha_{out}$ relative to the dashed line perpendiculars to the distributor reflecting surface at its inner and outer limits, respectively, equal the same-sized angles of reflection.

Certain mathematical operations will now be described with reference to FIGS. 40 and 41. These mathematical operations may be used in designing some but not all embodiments of a linear optical distributor. Other mathematical operations may be used in place of, or in addition to those explained below. Also, the mathematical operations explained below may be modified in some instances.

FIG. 41 illustrates the geometrical relationships involved when incident rays 8A are incident on the inner and outer edges of the $i^{th}$ planar reflector facet, counting from 1 at x-coordinate $r_1 = r_{in}$ to the $N^{th}$ facet inner edge at $r_N = r_{out}$ in a linear optical distributor. As just mentioned, in the currently considered embodiment, the facets of distributor 100 are all connected at their adjacent edges. The dashed lines in FIG. 41 are normal or perpendicular to the $i^{th}$ facet surface. The angles of incidence and reflection may be equal and designated as $\alpha_i$. The angle $\theta_i$ between a vertical line in FIG. 41 and rays reflected from the ith facet may equal twice the angle of incidence $\alpha_i$.

$$\theta_i = 2\alpha_i \qquad (119)$$

The complement of $\theta_i$ is designated $c\theta_i$ and may be equal to $90° - \theta_i$.

$$c\theta_i = 90° - \theta_i \qquad (120)$$

Rays incident in the inner and outer edges of the $i^{th}$ facet at x-coordinates $r_i$ and $r_{i+1}$, respectively, and at corresponding y-coordinates, $y_i$ and $y_{i+1}$, respectively, intersect the first plane 30 at x-coordinates, $x_i$ and $x_{i+1}$, respectively. To solve the geometry shown in FIG. 41, a line of length $w_i$ may be constructed from the intersection point of the ray reflected from the inner edge of the $i^{th}$ facet to the point on the ray reflected from the outer edge that makes the two lines perpendicular. The two angles inside the triangle formed by the reflected ray, the perpendicular line and the line segment of width $\Delta x_i$ on plane 30 are designated $c\theta_i$ and $\theta_i$ on FIG. 41. Next, another such line may be constructed from the outer edge of the $i^{th}$ facet to the ray reflected from the inner edge of that facet. Since the two rays are parallel, these two lines have the same length, $w_i$, as illustrated in FIG. 41. The width of the $i^{th}$ facet may be denoted $w_i'$.

The inputs to the calculation sequence may be the known design parameters for the distributor shown in FIG. 40: $y_{in}$, $r_{in}$, $r_{out}$, $x_{in}$, and $x_{out}$. The missing design parameters which have to be calculated are: $y_{out}$, $h_{out}$, and all the $r_i$ and $y_i$. An iterative sequence may be used in some embodiments to determine the missing coordinates of the edges of each of the N facets of the distributor. The inner edge of the distributor may be at $x = r_{in} = r_1$ and $y = y_{in} = y_1$. The outer (and lower) edge may be at $r_{out}$, which the designer should set to be approximately equal to or slightly greater than the half-width of the incident downwelling beam for the distributor to be large enough to intercept all the rays in the incident beam.

Since the x width of the distributor may be fixed by the size of the incident beam, a design parameter, the values of the end points of the x range may be known, i.e. $r_{in}$ and $r_{out}$. If the distributor is to have N facets, the x widths of all of them may be equal and may be given by Or using equation 121:

$$\Delta_r = (r_N - r_1)/N \qquad (121)$$

where $r_N$ is equal to the half width or radius of the distributor. Thus the value of the $i^{th}$ x-coordinate for the inner edge of the $i^{th}$ facet may be given by $r_i$ in equation 122:

$$r_i = r_1 + (i-1)\Delta r \qquad (122)$$

From the geometry of FIG. 41, it follows that $$\tan \alpha_i = \Delta y_i / \Delta r \quad (123)$$

$$\cos \alpha_i = \Delta r / w_i' \quad (124)$$

$$\Delta y_i = w_i' \sin \alpha_i \quad (125)$$

$$\cos \phi_i = w_i / \Delta x \quad (126)$$

$$\sin \alpha_i = \Delta y_i / w_i' \quad (127)$$

$$\alpha_i = \theta_i / 2 \quad (128)$$

The calculation sequence is therefore as follows:
From the design inputs, we know that $r_1 = r_{in}$, $x_1 = x_{in}$, $\theta_1 = \arctan(x_1/y_1)$, $\alpha_1 = \theta_1/2$, $w_1 = \Delta x \cos \theta_1$, $w_1' = \Delta r / \cos \alpha_1$ and $r_i = r_1 + (i-1)\Delta r$ for any i.

For values of i from 1 to N, the remaining values of $r_i$ and $y_i$ may be calculated as follows:

$$r_i = i\Delta r; \ \theta_i = \arctan(x_i/y_i); \ w_i = \Delta x \cos \theta_i \quad (129)$$

$$\alpha_i = \theta_i / 2; \ w_i' = \Delta r / \cos \alpha_i; \ \Delta y_i = w_i' \sin \alpha_1 \quad (130)$$

$$y_i = +\Delta y_{i-1} + \Delta y_{i-1} r_i = r_1 + (i-1)\Delta r \quad (131)$$

until the end when i=N. This gives the coordinates $r_i$ and $y_i$ for the starting ends of each of the line segments used to generate distributor 100 by this method. The coordinates for the starting end of the i+1 line equal those of the ending end of the i line.

Once the set of generating facets for half the distributor has been calculated, half the distributor may be extruded by sweeping these lines in directions in and out of the plane of their existence. The set of reflecting facets generated for the first half-distributor may be mirrored and used on the other side of the optical axis 5 for the other half-distributor, thereby completing the design of the linear distributor. The above embodiment may be based on a constant value of $\Delta r$ for all facets, meaning that each one may intercept the same portion of a substantially uniform rectangular downwelling beam. If the downwelling beam is elliptical in nature, then the equal Or x-widths of each facet may intercept a decreasing quantity of flux, declining to near zero for the last facet at the outer limit of the beam. To produce more uniform illumination of plane 30, one may replace (121) with a substitute formula that increases $\Delta r$ by some exponent as the value of i increases from 1 to N, while still leaving the sum equal to $r_{max}$ at i=N. If $\Delta r$ is increased with increasing values of i, this may put more light further away from the optical axis than otherwise, and vice versa.

To achieve this while still having the individual $\Delta r_i$ sum to $r_N - r_1$, as described in Eq. 132, $$\Sigma \Delta r_i = r_N - r_1, \quad (132)$$

one design choice may be to increase $\Delta r_i$ linearly with i as in (133), using the proportionality constant k.

$$\Delta r_i = ik \quad (133)$$

Substituting (133) for $\Delta r_i$ into (132) and solving for k yields $$k = (r_N - r_1)/\Sigma i \quad (134)$$

To evaluate this equation, the Sum Of Integers function (70) may be used, resulting in the following:

$$k = 2(r_N - r_1)/(N(N+1)) \quad (135)$$

Using this in Eq. (133) results in the following formula for the $\Delta r_i$ that meets the constraints of this approach:

$$\Delta r_i = 2i(r_N - r_1)/(N(N+1)) \quad (136)$$

Since the sum of the $\Delta r_{j-1}$ from j=1 to i must equal $r_i$, we can express the $r_i$ values as follows:

$$r_i = \sum_{j=1}^{i} \Delta r_{i-1} = \sum_{j=1}^{i} (i-1)k = \sum_{j=1}^{i} (i-1)\frac{2i(r_n - r_1)}{N(N+1)} \quad (137)$$

The above formula may result in a linear increase in $\Delta r_i$ with i, according to the constant k of proportionality as indicated in (133). Alternatively, the exponent of i in that equation may be changed from the implied value of 1.0 to a value slightly higher or slightly lower, as illustrated in Eq. 138, $$r_i = i^n \Delta r, \quad (138)$$

where n is any real value somewhat larger or smaller than 1.0. Such a change may increase or decrease the rate at which $\Delta r_i$ changes with increasing i. This approach may provide control over the distribution of reflected radiation from the optical distributor onto the first plane 30 and to some extent also onto plane 40. The use of an exponential variation of $\Delta r_i$ with i as indicated in Eq. 138, is only one choice. Many other choices may be made to suit the particular application for which the invention is intended.

The embodiment of a linear distributor described above may be susceptible, when used for illumination of spaces in buildings with low ceilings, to a glare condition. The glare may be produced by excessive quantities of light flux reflecting from distributor 100 in a diffusely scattered manner directly down into the space below the height of that distributor due to dust, dirt, surface roughness or other optical imperfections, rather than being specularly reflected upward and outward onto the first plane 30. This condition may in some embodiments be alleviated through the use of glare shields 170 such as those illustrated in FIG. 42. These shields may be made of thin planar sheets 170 of opaque material positioned just beyond either longitudinal end of distributor 100, so as not to impede rays 8A in the downwelling quasi-collimated beam from reaching the distributor 100. Said sheets may then be angled in such a way as to be approximately parallel to the reflected rays 8A emanating from the distributor 100 toward the first plane 30 while blocking a view of the distributor 100 from any location in the space below the bottom of the distributor.

Figure 42:
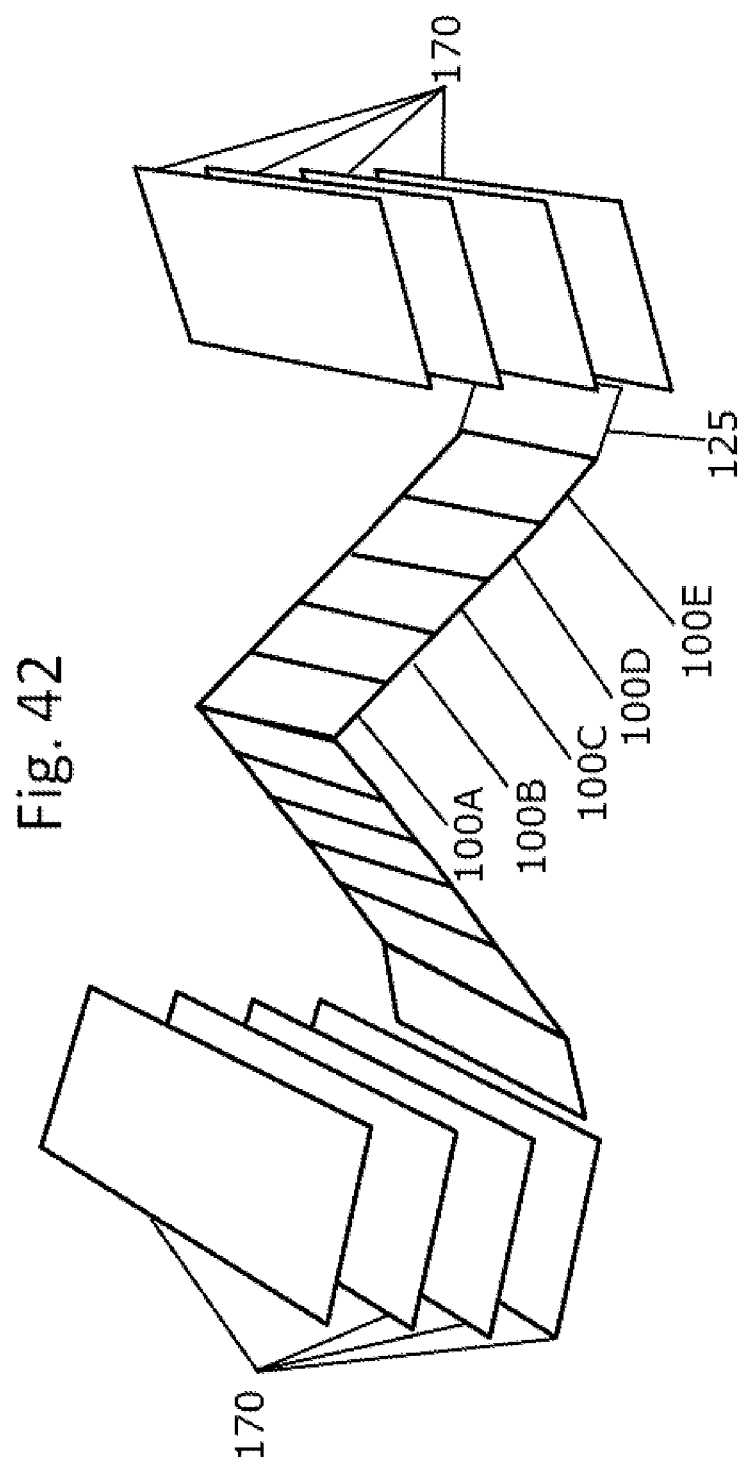
FIG. 42 is a schematic isometric view of one embodiment of a linear optical distributor.

Since some light may scatter laterally away from the distributor 100 shown in FIG. 42 (in and out of the plane of the drawing), around the ends of the glare shields 170, two additional vertical opaque or diffusely transmitting sheets (not shown on FIG. 42) may be placed on either side of distributor 100, the front and back sides of distributor 100 illustrated in FIG. 42. These additional vertical glare shields may be particularly useful for illumination of a large area. Other embodiments of these additional glare shields are possible, such as angled louvered sheets to replace the vertical monolithic ones, or a continuation of the two stacks of glare shields depicted in FIG. 42 around the whole distributor 100.

Figure 43:
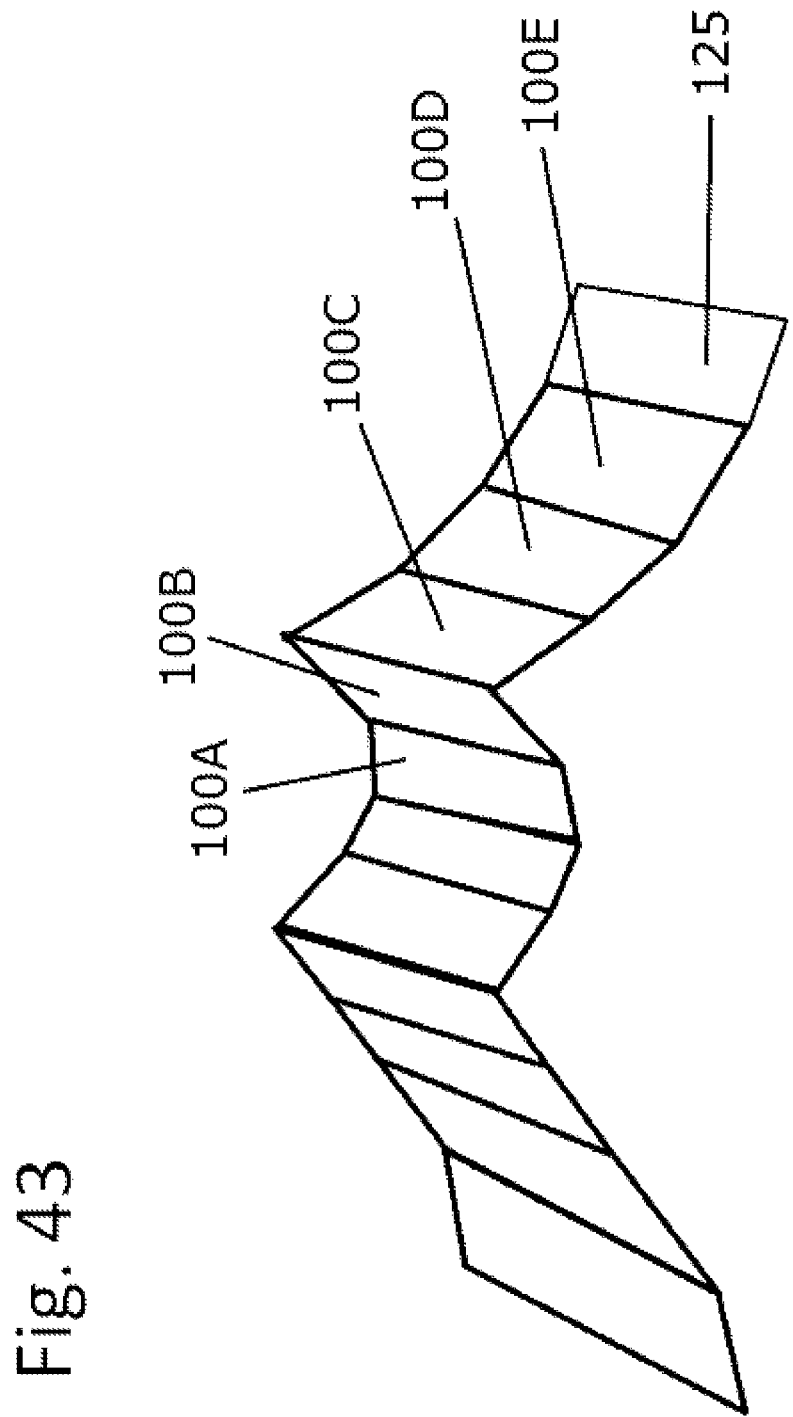
FIG. 43 is a schematic isometric view of one embodiment of a linear optical distributor with a center well.

For low-bay applications of the linear distributor design, it may be desirable to reduce the overall height of the distributor 100, to reduce the penetration of the distributor downward from the ceiling plane 30 into the occupied space below. Accordingly, the optical distributor 100 design depicted in FIG. 38 may be truncated in some embodiments, removing, for example, sections 100A and 100B and then filling the hole thereby created with new versions of 100A and 100B, and their mirrored counterparts on the other half of distributor 100, the newly sized and positioned 100A and 100B descending downward into the hole, as illustrated in FIG. 43. This altered design may create a crater or a "crossfire" section of the distributor. The crossfire section of distributor 100 depicted in FIG. 43 may reclaim the downwelling rays 8A in the incident beam that might otherwise be lost through the hole in distributor 100 (created by removing sections 100A and 100B from it) and reflecting said rays upward and laterally outward, over the top edge of the opposite half of the new distributor 100. The angular orientation of the new descending sections of the distributor may reflect rays incident upon them over the ridge opposite them and thence upward and outward onto first plane 30. As in previous embodiments, this "crossfire" low-profile embodiment can be given a small slot in the center by setting to something greater than zero. As with the radial distributor 10 described previously, the incident radiation passing through this center slot or hole in distributor 100 may be spread by one or more lenses and diffusing sheets to control the spread of that radiation below the distributor.

As described in detail above in connection with the optical distributor 10, various steps may be taken in some embodiments to overcome the binary illumination of the first plane 30 by the optical distributor 100. These include the use of a large number N of facets in the construction of the distributor and, in another embodiment, fitting a mathematical curve to the end points having coordinates ($r_i$, $y_i$) and using the fitted curve to generate a smooth linear optical distributor 100 without facets.

An exemplary computer system 400 for implementing the processes described above for generating the size, angle, and form of an optical distributor is depicted in FIG. 44. The computer system 400 of a designer may be a personal computer (PC), a workstation, a notebook or portable computer, a tablet PC, a handheld media player (e.g., an MP3 player), a smart phone device, a video gaming device, or a set top box, with internal processing and memory components as well as interface components for connection with external input, output, storage, network, and other types of peripheral devices. Internal components of the computer system in FIG. 44 are shown within the dashed line and external components are shown outside of the dashed line. Components that may be internal or external are shown straddling the dashed line. Alternatively to a PC, the computer system 400, for example, for running the optical distributor form generation application, may be in the form of any of a server, a mainframe computer, a distributed computer, an Internet appliance, or other computer devices, or combinations thereof.

In any embodiment or component of the system described herein, the computer system 400 includes a processor 402 and a system memory 406 connected by a system bus 404 that also operatively couples various system components. There may be one or more processors 402, e.g., a single central processing unit (CPU), or a plurality of processing units, commonly referred to as a parallel processing environment (for example, a dualcore, quadcore, or other multicore processing device). The system bus 404 may be any of several types of bus structures including a memory bus or memory controller, a peripheral bus, a switched-fabric, point-to-point connection, and a local bus using any of a variety of bus architectures. The system memory 406 includes read only memory (ROM) 408 and random access memory (RAM) 410. A basic input/output system (BIOS) 412, containing the basic routines that help to transfer information between elements within the computer system 400, such as during start-up, is stored in ROM 408. A cache 414 may be set aside in RAM 410 to provide a high speed memory store for frequently accessed data.

A hard disk drive interface 416 may be connected with the system bus 404 to provide read and write access to a data storage device, e.g., a hard disk drive 418, for nonvolatile storage of applications, files, and data. A number of program modules and other data may be stored on the hard disk 418, including an operating system 420, one or more application programs 422, and data files 424. In an exemplary implementation, the hard disk drive 418 may store the optical distributor form generation application 466, the input data repository 426 for storage of various input dimensions described above for use by the optical distributor form generation application to design an optical distributor, and an output data repository 466 for storing designs of optical distributors created according to the exemplary processes described herein above. Note that the hard disk drive 418 may be either an internal component or an external component of the computer system 400 as indicated by the hard disk drive 418 straddling the dashed line in FIG. 44. In some configurations, there may be both an internal and an external hard disk drive 418.

The computer system 400 may further include a magnetic disk drive 430 for reading from or writing to a removable magnetic disk 432, tape, or other magnetic media. The magnetic disk drive 430 may be connected with the system bus 404 via a magnetic drive interface 428 to provide read and write access to the magnetic disk drive 430 initiated by other components or applications within the computer system 400. The magnetic disk drive 430 and the associated computer-readable media may be used to provide nonvolatile storage of computer-readable instructions, data structures, program modules, and other data for the computer system 400.

The computer system 400 may additionally include an optical disk drive 436 for reading from or writing to a removable optical disk 438 such as a CD ROM or other optical media. The optical disk drive 436 may be connected with the system bus 404 via an optical drive interface 434 to provide read and write access to the optical disk drive 436 initiated by other components or applications within the computer system 400. The optical disk drive 430 and the associated computer-readable optical media may be used to provide nonvolatile storage of computer-readable instructions, data structures, program modules, and other data for the computer system 400.

A display device 442, e.g., a monitor, a television, or a projector, or other type of presentation device may also be connected to the system bus 404 via an interface, such as a video adapter 440 or video card. Similarly, audio devices, for example, external speakers or a microphone (not shown), may be connected to the system bus 404 through an audio card or other audio interface (not shown).

In addition to the monitor 442, the computer system 400 may include other peripheral input and output devices, which are often connected to the processor 402 and memory 406 through the serial port interface 444 that is coupled to the system bus 406. Input and output devices may also or alternately be connected with the system bus 404 by other interfaces, for example, a universal serial bus (USB), an IEEE 1394 interface ("Firewire"), a parallel port, or a game port. A user may enter commands and information into the computer system 400 through various input devices including, for example, a keyboard 446 and pointing device 448, for example, a mouse. Other input devices (not shown) may include, for example, a joystick, a game pad, a tablet, a touch screen device, a satellite dish, a scanner, a facsimile machine, a microphone, a digital camera, and a digital video camera.

Output devices may include a printer 450 and one or more loudspeakers 470 for presenting the audio performance of the sender. Other output devices (not shown) may include, for example, a plotter, a photocopier, a photo printer, a facsimile machine, and a press. In some implementations, several of these input and output devices may be combined into single devices, for example, a printer/scanner/fax/photocopier. It should also be appreciated that other types of computer-readable media and associated drives for storing data, for example, magnetic cassettes or flash memory drives, may be accessed by the computer system 400 via the serial port interface 444 (e.g., USB) or similar port interface.

The computer system 400 may operate in a networked environment using logical connections through a network interface 452 coupled with the system bus 404 to communicate with one or more remote devices. The logical connections depicted in FIG. 44 include a local-area network (LAN) 454 and a wide-area network (WAN) 460. Such networking environments are commonplace in home networks, office networks, enterprise-wide computer networks, and intranets. These logical connections may be achieved by a communication device coupled to or integral with the computer system 400. As depicted in FIG. 44, the LAN 454 may use a router 456 or hub, either wired or wireless, internal or external, to connect with remote devices, e.g., a remote computer 458, similarly connected on the LAN 454. The remote computer 458 may be another personal computer, a server, a client, a peer device, or other common network node, and typically includes many or all of the elements described above relative to the computer system 400.

To connect with a WAN 460, the computer system 400 typically includes a modem 462 for establishing communications over the WAN 460. Typically the WAN 460 may be the Internet. However, in some instances the WAN 460 may be a large private network spread among multiple locations, or a virtual private network (VPN). The modem 462 may be a telephone modem, a high speed modem (e.g., a digital subscriber line (DSL) modem), a cable modem, or similar type of communications device. The modem 462, which may be internal or external, is connected to the system bus 418 via the network interface 452. In alternate embodiments the modem 462 may be connected via the serial port interface 444. It should be appreciated that the network connections shown are exemplary and other means of and communications devices for establishing a network communications link between the computer system and other devices or networks may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the invention. One implementation of a computer program product provides a computer program storage medium readable by a computer system and encoding a computer program. Another implementation of a computer program product may be provided in a computer data signal embodied in a carrier wave by a computing system and encoding the computer program. It should further be understood that the described technology may be employed in special purpose devices independent of a personal computer.

A variety of embodiments and variations of structures and methods are disclosed herein. Where appropriate, common reference numbers and words were used for common structure and method features. However, unique reference numbers and words were sometimes used for similar or the same structure or method elements for descriptive purposes. As such, the use of common or different reference numbers or words for similar or the same structural or method elements is not intended to imply a similarity or difference beyond that described herein.

All directional and relative references (e.g., upper, lower, left, center, right, side, lateral, front, middle, back, rear, top, bottom, above, below, vertical, horizontal, and so forth) are given by way of example to aid the reader's understanding of the particular embodiments described. They should not be read to be requirements or limitations, particularly as to the position, orientation, or use of the invention unless specifically set forth in the claims. Connection references (e.g., attached, coupled, connected, and joined, etc.) are to be construed broadly and may include intermediate members between a connection of elements and relative movement between elements unless otherwise indicated. As such, connection references do not necessarily infer that two elements are directly connected and in fixed relation to each other, unless specifically set forth in the claims. The exemplary drawings are for purposes of illustration only and the dimensions, positions, order and relative sizes reflected in the drawings attached hereto may vary.

The above specification, examples, and data provide a complete description of the structure and use of exemplary embodiments of the invention as claimed below. Although various embodiments have been described above with a certain degree of particularity, or with reference to one or more individual embodiments, those skilled in the art could make numerous alterations to the disclosed embodiments without departing from the spirit or scope of the claims. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claim.

What is claimed is:

1. A method for designing a pyramidal or conical frustrum-shaped optical distributor, comprising
    receiving a first spatial dimension representing an installation distance below a first plane for the optical distributor;
    receiving a second spatial dimension representing a diameter of incident light through an opening in the first plane;
    receiving a third spatial dimension representing a starting point on the first plane to which light from the optical distributor is to be reflected;
    receiving a fourth spatial dimension representing an ending point on the first plane to which light from the optical distributor is to be reflected;
    receiving a fifth dimension representing a diameter or width of a bottom edge of the optical distributor to accept radiation from the incident light passing through the opening in the first plane to be spread to a diameter greater than the diameter of the opening in the first plane;

receiving a number for how many faceted surfaces for the optical distributor are desired; and determining a width and an angle of inclination for each of the faceted surfaces that will reflect light to between the starting point and the ending point in a substantially uniform distribution.

\* \* \* \* \*